(12) United States Patent
Hinestrosa Salazar et al.

(10) Patent No.: US 11,883,833 B2
(45) Date of Patent: Jan. 30, 2024

(54) DIELECTRIC MATERIALS

(71) Applicant: Biological Dynamics, Inc., San Diego, CA (US)

(72) Inventors: Juan Pablo Hinestrosa Salazar, San Diego, CA (US); Rajaram Krishnan, San Diego, CA (US); Scott Conradson, San Diego, CA (US); Tyler Lee Harris, San Diego, CA (US); Robert Paul Turner, San Diego, CA (US); George Maroor Thomas, San Diego, CA (US)

(73) Assignee: BIOLOGICAL DYNAMICS, INC., San Diego, CA (US)

( * ) Notice: Subject to any disclaimer, the term of this patent is extended or adjusted under 35 U.S.C. 154(b) by 579 days.

(21) Appl. No.: 17/045,146

(22) PCT Filed: Apr. 1, 2019

(86) PCT No.: PCT/US2019/025242
§ 371 (c)(1),
(2) Date: Oct. 2, 2020

(87) PCT Pub. No.: WO2019/195196
PCT Pub. Date: Oct. 10, 2019

(65) Prior Publication Data
US 2021/0146378 A1 May 20, 2021

Related U.S. Application Data

(60) Provisional application No. 62/651,659, filed on Apr. 2, 2018.

(51) Int. Cl.
*B03C 5/00* (2006.01)
*B03C 5/02* (2006.01)

(52) U.S. Cl.
CPC ............ *B03C 5/005* (2013.01); *B03C 5/026* (2013.01); *B03C 2201/26* (2013.01)

(58) Field of Classification Search
None
See application file for complete search history.

(56) References Cited

U.S. PATENT DOCUMENTS

| 5,632,957 A | 5/1997 | Heller et al. |
| 5,958,791 A | 9/1999 | Roberts et al. |
| (Continued) | | |

FOREIGN PATENT DOCUMENTS

| CA | 2870160 A1 | 10/2013 |
| CN | 1337580 A | 2/2002 |
| (Continued) | | |

OTHER PUBLICATIONS

U.S. Appl. No. 16/955,707 Non-Final Office Action dated Jan. 19, 2023.

(Continued)

*Primary Examiner* — J. Christopher Ball
(74) *Attorney, Agent, or Firm* — Wilson Sonsini Goodrich & Rosati

(57) ABSTRACT

The present disclosure describes methods, devices and systems comprising materials comprising dielectrics. In various aspects, electrodes layered or imbedded with these dielectrics provide enhanced properties for a wide range of applications, such as the enhanced separation of analytes, such as biological molecules or particles (nucleic acids, viruses) with an electrokinetic field.

17 Claims, 5 Drawing Sheets

(56) References Cited

U.S. PATENT DOCUMENTS

| | | | |
|---|---|---|---|
| 6,149,789 A | 11/2000 | Benecke et al. | |
| 6,203,683 B1 | 3/2001 | Austin et al. | |
| 6,280,590 B1 | 8/2001 | Cheng et al. | |
| 6,289,590 B1 | 9/2001 | McDonald | |
| 6,294,063 B1 | 9/2001 | Becker et al. | |
| 6,335,167 B1 | 1/2002 | Pinkel et al. | |
| 6,352,838 B1* | 3/2002 | Krulevitch | C12N 15/101 435/34 |
| 6,403,367 B1 | 6/2002 | Cheng et al. | |
| 6,557,575 B1 | 5/2003 | Gerhardt et al. | |
| 6,749,736 B1 | 6/2004 | Fuhr et al. | |
| 6,824,664 B1 | 11/2004 | Austin et al. | |
| 6,887,362 B2 | 5/2005 | Huang et al. | |
| 7,081,189 B2 | 7/2006 | Squires et al. | |
| 7,105,081 B2 | 9/2006 | Gascoyne et al. | |
| 7,447,922 B1 | 11/2008 | Asbury et al. | |
| 7,611,908 B2 | 11/2009 | Miller et al. | |
| 7,615,381 B2 | 11/2009 | Masters et al. | |
| 7,648,844 B2 | 1/2010 | Srivastava et al. | |
| 7,709,262 B2 | 5/2010 | Cantor et al. | |
| 8,372,657 B2 | 2/2013 | Reboud et al. | |
| 8,383,061 B2 | 2/2013 | Prakash et al. | |
| 8,425,750 B2 | 4/2013 | Sugioka | |
| 8,603,791 B2 | 12/2013 | Krishnan et al. | |
| 8,815,554 B2 | 8/2014 | Krishnan et al. | |
| 8,815,555 B2 | 8/2014 | Krishnan et al. | |
| 8,871,481 B2 | 10/2014 | Krishnan et al. | |
| 8,877,470 B2 | 11/2014 | Krishnan et al. | |
| 8,932,447 B2 | 1/2015 | Heller et al. | |
| 8,932,815 B2 | 1/2015 | Krishnan et al. | |
| 8,969,059 B2 | 3/2015 | Krishnan et al. | |
| 9,005,941 B2 | 4/2015 | Krishnan et al. | |
| 9,034,578 B2 | 5/2015 | Krishnan et al. | |
| 9,034,579 B2 | 5/2015 | Krishnan et al. | |
| 9,169,521 B1 | 10/2015 | Rajagopal et al. | |
| 9,206,416 B2 | 12/2015 | Krishnan et al. | |
| 9,387,489 B2 | 7/2016 | Charlot et al. | |
| 9,499,812 B2 | 11/2016 | Krishnan et al. | |
| 9,682,385 B2 | 6/2017 | Charlot et al. | |
| 9,827,565 B2 | 11/2017 | Krishnan et al. | |
| 9,918,702 B2 | 3/2018 | Tariyal et al. | |
| 10,006,083 B2 | 6/2018 | Krishnan et al. | |
| 10,151,755 B2 | 12/2018 | Krek et al. | |
| 10,232,369 B2 | 3/2019 | Turner et al. | |
| 10,262,761 B1 | 4/2019 | Weintraub | |
| 10,818,379 B2 | 10/2020 | Krishnan et al. | |
| 2001/0045359 A1 | 11/2001 | Cheng et al. | |
| 2002/0036142 A1 | 3/2002 | Gascoyne et al. | |
| 2003/0146100 A1 | 8/2003 | Huang et al. | |
| 2004/0011650 A1 | 1/2004 | Zenhausern et al. | |
| 2004/0011651 A1 | 1/2004 | Becker et al. | |
| 2004/0052689 A1 | 3/2004 | Yao | |
| 2004/0086872 A1 | 5/2004 | Childers et al. | |
| 2004/0178068 A1 | 9/2004 | Gascoyne et al. | |
| 2004/0238052 A1 | 12/2004 | Karp et al. | |
| 2006/0063183 A1 | 3/2006 | Segawa et al. | |
| 2006/0096367 A1 | 5/2006 | Meyer et al. | |
| 2006/0102482 A1 | 5/2006 | Auerswald et al. | |
| 2006/0228749 A1 | 10/2006 | Wang et al. | |
| 2006/0257993 A1 | 11/2006 | McDevitt et al. | |
| 2006/0289341 A1 | 12/2006 | Muller et al. | |
| 2007/0080062 A1 | 4/2007 | Harnett et al. | |
| 2007/0095669 A1 | 5/2007 | Lau et al. | |
| 2007/0107910 A1 | 5/2007 | McGuire et al. | |
| 2007/0125650 A1 | 6/2007 | Scurati et al. | |
| 2007/0131554 A1 | 6/2007 | Yu et al. | |
| 2007/0141605 A1 | 6/2007 | Vann et al. | |
| 2007/0152206 A1 | 7/2007 | Cho et al. | |
| 2007/0240495 A1 | 10/2007 | Hirahara | |
| 2007/0284254 A1 | 12/2007 | Cho et al. | |
| 2007/0289341 A1 | 12/2007 | Hollenhorst et al. | |
| 2008/0120278 A1 | 5/2008 | Roe et al. | |
| 2009/0061450 A1 | 3/2009 | Hunter | |
| 2009/0314644 A1 | 12/2009 | Golan et al. | |
| 2009/0325813 A1 | 12/2009 | Wang et al. | |
| 2010/0090178 A1 | 4/2010 | Kosowsky et al. | |
| 2010/0155246 A1 | 6/2010 | Schnelle et al. | |
| 2010/0167072 A1 | 7/2010 | Chouai et al. | |
| 2010/0211407 A1 | 8/2010 | Duke et al. | |
| 2011/0009724 A1 | 1/2011 | Hill et al. | |
| 2011/0020785 A1 | 1/2011 | Lowery, Jr. et al. | |
| 2011/0100820 A1 | 5/2011 | Bachmann et al. | |
| 2011/0108422 A1 | 5/2011 | Heller et al. | |
| 2011/0139620 A1 | 6/2011 | Stumber et al. | |
| 2011/0192726 A1 | 8/2011 | Chen et al. | |
| 2012/0048403 A1 | 3/2012 | Chappel et al. | |
| 2012/0110620 A1 | 5/2012 | Kilar et al. | |
| 2012/0270207 A1 | 10/2012 | Sheehan et al. | |
| 2013/0052748 A1 | 2/2013 | Campbell et al. | |
| 2013/0189794 A1 | 7/2013 | Emeric et al. | |
| 2013/0237431 A1 | 9/2013 | Lo et al. | |
| 2013/0260372 A1 | 10/2013 | Buermann et al. | |
| 2013/0273640 A1 | 10/2013 | Krishnan et al. | |
| 2013/0274148 A1 | 10/2013 | Kain et al. | |
| 2014/0038222 A1 | 2/2014 | Alt et al. | |
| 2014/0054172 A1 | 2/2014 | Jonsson et al. | |
| 2014/0093871 A1 | 4/2014 | Shieh et al. | |
| 2014/0127697 A1 | 5/2014 | Krishnan et al. | |
| 2014/0138260 A1 | 5/2014 | Briman | |
| 2014/0170679 A1 | 6/2014 | Aitchison et al. | |
| 2014/0206412 A1 | 7/2014 | Dejohn et al. | |
| 2014/0296089 A1 | 10/2014 | Holmes et al. | |
| 2014/0367260 A1 | 12/2014 | Dickerson et al. | |
| 2015/0004077 A1 | 1/2015 | Wikswo et al. | |
| 2015/0037786 A1 | 2/2015 | Salsman | |
| 2015/0083595 A1 | 3/2015 | Krishnan et al. | |
| 2015/0136604 A1 | 5/2015 | Nielsen et al. | |
| 2015/0197784 A1 | 7/2015 | Williams et al. | |
| 2015/0219618 A1 | 8/2015 | Krishnan et al. | |
| 2015/0266022 A1 | 9/2015 | Eltoukhy et al. | |
| 2015/0283553 A1 | 10/2015 | Charlot et al. | |
| 2015/0301031 A1 | 10/2015 | Zin et al. | |
| 2016/0011115 A1 | 1/2016 | Chen et al. | |
| 2016/0175840 A1 | 6/2016 | Ingber et al. | |
| 2016/0232562 A1 | 8/2016 | Esayian et al. | |
| 2016/0256870 A1 | 9/2016 | Ismagilov et al. | |
| 2016/0271622 A1* | 9/2016 | Charlot | B03C 5/026 |
| 2016/0327549 A1 | 11/2016 | Charlot et al. | |
| 2017/0039344 A1 | 2/2017 | Bitran et al. | |
| 2017/0072395 A1 | 3/2017 | Krishnan et al. | |
| 2017/0146509 A1* | 5/2017 | Yu | B01L 3/50273 |
| 2017/0161452 A1 | 6/2017 | Bain | |
| 2017/0184545 A1 | 6/2017 | Azpiroz et al. | |
| 2017/0189904 A1 | 7/2017 | Aravanis et al. | |
| 2017/0220736 A1 | 8/2017 | Lo et al. | |
| 2017/0229149 A1 | 8/2017 | Rothschild et al. | |
| 2017/0292064 A1 | 10/2017 | Monroe et al. | |
| 2017/0370836 A1 | 12/2017 | Gerion et al. | |
| 2018/0052093 A1 | 2/2018 | Shi et al. | |
| 2018/0274014 A1 | 9/2018 | Krishnan et al. | |
| 2018/0345284 A1 | 12/2018 | Charlot et al. | |
| 2019/0017107 A1 | 1/2019 | Light et al. | |
| 2019/0210023 A1 | 7/2019 | Turner et al. | |
| 2021/0020275 A1 | 1/2021 | Krishnan et al. | |
| 2021/0101150 A1 | 4/2021 | Krishnan et al. | |
| 2021/0214798 A1 | 7/2021 | Krishnan et al. | |
| 2022/0228193 A1 | 7/2022 | Jones et al. | |

FOREIGN PATENT DOCUMENTS

| | | |
|---|---|---|
| CN | 1348100 A | 5/2002 |
| CN | 101208593 A | 6/2008 |
| CN | 100417936 C | 9/2008 |
| CN | 102037351 A | 4/2011 |
| CN | 102320559 A | 1/2012 |
| EP | 1775589 A1 | 4/2007 |
| GB | 2516666 A | 2/2015 |
| JP | H0663360 A | 3/1994 |
| JP | H11514087 A | 11/1999 |
| JP | 2001500252 A | 1/2001 |
| JP | 2002502047 A | 1/2002 |
| JP | 2004532968 A | 10/2004 |
| JP | 2005501251 A | 1/2005 |
| JP | 2006135191 A | 5/2006 |

(56) References Cited

FOREIGN PATENT DOCUMENTS

| | | | |
|---|---|---|---|
| JP | 2008298575 A | 12/2008 | |
| JP | 2011516867 A | 5/2011 | |
| JP | 2011522219 A | 7/2011 | |
| JP | 2013232627 A | 11/2013 | |
| JP | 2014521954 A | 8/2014 | |
| JP | 2017512483 A | 5/2017 | |
| TW | 201726540 A | 8/2017 | |
| WO | WO-9804355 A1 | 2/1998 | |
| WO | WO-9938612 A1 | 8/1999 | |
| WO | WO-0196025 A2 | 12/2001 | |
| WO | WO-2005012872 A2 | 2/2005 | |
| WO | WO-2005031300 A2 | 4/2005 | |
| WO | WO-2005121767 A1 | 12/2005 | |
| WO | WO-2006018981 A1 | 2/2006 | |
| WO | WO-2006120656 A1 | 11/2006 | |
| WO | WO-2007106552 A2 | 9/2007 | |
| WO | WO-2007107910 A1 | 9/2007 | |
| WO | WO-2009146143 A2 | 12/2009 | |
| WO | WO-2012028746 A1 | 3/2012 | |
| WO | WO-2013060762 A1 | 5/2013 | |
| WO | WO-2013112425 A1 | 8/2013 | |
| WO | WO-2013158686 A1 | 10/2013 | |
| WO | WO-2014011740 A1 | 1/2014 | |
| WO | WO-2014015187 A1 | 1/2014 | |
| WO | WO-2014028222 A1 | 2/2014 | |
| WO | WO-2014207731 A1 | 12/2014 | |
| WO | WO-2015038797 A1 | 3/2015 | |
| WO | WO-2015097858 A1 | 7/2015 | |
| WO | WO-2015148808 A1 | 10/2015 | |
| WO | WO-2015157217 A1 | 10/2015 | |
| WO | WO-2015196141 A1 | 12/2015 | |
| WO | WO-2016025698 A1 | 2/2016 | |
| WO | WO-2016179308 A1 | 11/2016 | |
| WO | WO-2017125475 A1 | 7/2017 | |
| WO | WO-2017165852 A1 | 9/2017 | |
| WO | WO-2017181030 A2 | 10/2017 | |
| WO | WO-2018208820 A1 | 11/2018 | |
| WO | WO-2019126388 A1 | 6/2019 | |
| WO | WO-2019126391 A1 | 6/2019 | |
| WO | WO-2019195196 A1 | 10/2019 | |
| WO | WO-2019200323 A1 | 10/2019 | |
| WO | WO-2022011313 A1 | 1/2022 | |
| WO | WO-2022155223 A1 | 7/2022 | |

OTHER PUBLICATIONS

U.S. Appl. No. 16/955,707 Non-Final Office Action dated Jan. 31, 2023, restarting response period for Non-Final Office Action dated Jan. 19, 2023.
Angerer et al. Demonstration of tissue-specific gene expression by in situ hybridization. Methods Enzymol 152:649-660 (1987).
Asbury et al. Trapping of DNA by dielectrophoresis. Electrophoresis 23:2658-2666 (2002).
Asbury et al. Trapping of DNA in Nonuniform Oscillating Electric Fields. Biophys J. 74:1024-1030 (1998).
Becker et al. Separation of Human Breast Cancer Cells From Blood by Differential Dielectric Affinity. Proceedings of the National Academy of Sciences 92:860-864 (1995).
Becker et al. The removal of human leukemia cells from blood using interdigitated microelectrodes. J Phys. D: Appl. Phys. 27:2659-2662 (1994).
Berg et al. Cellphone-Based Hand-Held Microplate Reader for Point-of-Care Testing of Enzyme-Linked Immunosorbent Assays. ACS NANO 9(8):7857-7866 (2015).
Bettegowda et al. Detection of Circulating Tumor DNA in Early- and Late-Stage Human Malignancies. Sci Transl Med. 6:224 (2014).
Board et al. DNA Methylation in Circulating Tumour DNA as a Biomarker for Cancer. Biomark Insights 2:307-319 (2007).
Board et al. Isolation and extraction of circulating tumor DNA from patients with small cell lung cancer. Ann. N. Y. Acad. Sci. 1137:98-107 (Aug. 2008).

Cairns. Detection of promoter hypermethylation of tumor suppressor genes in urine from kidney cancer patients. Ann N Y Acad Sci. 1022:40-43 (Jun. 2004).
Casciano et al. Circulating Tumor Nucleic Acids: Perspective in Breast Cancer. Breast Care 5:75-80 (2010).
Catarino et al. Quantification of Free circulating tumor DNA as a diagnostic marker for breast cancer. DNA Cell Biol. 27(8):415-421 (Aug. 2008).
Cetin et al. Microfluidic bio-particle manipulation for biotechnology. Biochemical Engineering Journal 92:63-82 (2014).
Chan. Circulating EBC DNA as a tumor marker for nasopharyngeal carcinoma. Semin Cancer Biol. 12(6):489-496 (Dec. 2002).
Chan et al. Nasopharyngeal carcinoma. Annals of Oncology 13:1007-1015 (2002).
Chan et al. Persistent Aberrations in Circulating DNA Integrity after Radiotherapy Are Associated with Poor Prognosis in Nasopharyngeal Carcinoma Patients. Clinical Cancer Research 14(13):4141-4145 (2008).
Chan et al. Quantitative Analysis of Circulating Methylated DNA as a Biomarker for Hepatocellular Carcinoma. Clinical Chemistry 54(9):1528-1536 (2008).
Chan et al. Radiological, pathological and DNA remission in recurrent metastatic nasopharyngeal carcinoma. BMC Cancer 6:259 (Oct. 31, 2006).
Cheng et al. Isolation of Cultured Cervical Carcinoma Cells Mixed with Peripheral Blood Cells on a Bioelectronic Chip. Analytical Chemistry 70(11):2321-2326 (1998).
Cheng et al. Preparation and Hybridization Analysis of DNA/A from E. coli on Microfabricated Bioelectronic Chips. Nature Biotechnology 16:541-546 (1998).
Cheng et al. Quantification of circulating cell-free DNA in the plasma of cancer patients during radiation therapy. Cancer Science 100(2):303-309 (Feb. 2009).
Choi et al. Microfluidic-based biosensors toward point-of-care detection of nucleic acids and proteins. Microfluidics And Nanofluidics 10(2):231-247 (2010).
Chuang et al. Detectable BRAF mutation n serum DNA samples from patients with papillary thyroid carcinomas. Head Neck 32(2):229-234 (2010).
Chun et al. Circulating tumour-associated plasma DNA represents an independent and informative predictor of prostate cancer. BJU International 98(3):544-548 (2006).
Combaret et al. Circulating MYCN DNA as a Tumor-specific Marker in Neuroblastoma Patients. Cancer Research 62:3646-3648 (Jul. 1, 2002).
Cortese et al. Epigenetic markers of prostate cancer in plasma circulating DNA. Human Molecular Genetics 21:3619-3631 (2012).
Da Silva et al. Circulating cell-free DNA in serum as a biomarker of colorectal cancer. Journal of Clinical Pathology 66(9):775-778 (Sep. 2013).
Daniotti et al. Detection of mutated BRAFV600E variant in circulating DNA of stage III-IV melanoma patients. Int. J. Cancer 120:2439-2444 (Jun. 1, 2007).
Dawson et al. Analysis of circulating tumor DNA to monitor metastatic breast cancer. N Engl J Med 368:1199-1209 (2013).
De Maio et al. Circulating and stool nucleic acid analysis for colorectal cancer diagnosis. World Journal of Gastroenterology 20(4):957-967 (Jan. 28, 2014).
Delgado. Characterization of cell-free circulating DNA in plasma in patients with prostate cancer. Tumor Biol. 34(2):983-986 (Apr. 2013).
Deligezer et al. Effect of adjuvant chemotherapy on integrity of free serum DNA in patients with breast cancer. Ann N Y Acad Sci. 1137:175-179 (Aug. 2008).
Devos et al. Circulating Methylated Sep. 9 DNA in Plasma Is a Biomarker for Colorectal Cancer. Clinical Chemistry 55(7):1337-1346 (Jul. 2009).
Dobrzycka. Circulating free DNA and p53 antibodies in plasma of patients with ovarian epithelial cancers. Annals of Oncology 22(5):1133-1140 (May 2011).
Dobrzycka. Circulating free DNA, p53 antibody and mutations of KRAS gene in endometrial cancer. 127(3):612-621 (Aug. 1, 2010).

(56) References Cited

OTHER PUBLICATIONS

El Tarhouny et al. Comparison of serum VEGF and its soluble receptor sVEGFR1 with serum cell-free DNA in patients with breast tumor. Cytokine 44(1):65-69 (Oct. 2008).
Ellinger et al. Cell-free circulating DNA: diagnostic value in patients with testicular germ cell cancer. J. Urol. 181(1):363-371 (Jan. 2009).
Ellinger et al. CpG island hypermethylation of cell-free circulating serum DNA in patients with testicular cancer. J. Urol. 182(1):324-329 (Jul. 2009).
Ellinger et al. Noncancerous PTGS2 DNA fragments of apoptotic origin in sera of prostate cancer patients qualify as diagnostic and prognostic indicators. Int. J. Cancer 122(1):138-143 (Jan. 1, 2008).
Elshimali et al. The Clinical Utilization of Circulating Cell Free DNA (CCFDNA) in Blood of Cancer Patients. Int. J. Mol. Sci. 14(9):18925-18958 (Sep. 13, 2013).
Fuhr et al. Cell manipulation and cultivation under a.c. electric field influence in highly conductive culture media. Biochimica et Biophysica Acta 1201:353-360 (1994).
Gahan et al. Circulating nucleic acids in plasma and serum: diagnosis and prognosis in cancer. EPMA Journal 1(3):503-512 (Sep. 2010).
Ganepola et al. Use of blood-based biomarkers for early diagnosis and surveillance of colorectal cancer. World Journal of Gastrointestinal Oncology 6(4):83-97 (Apr. 15, 2014).
Gautschi et al. Circulating deoxyribonucleic Acid as prognostic marker in non-small-cell lung cancer patients undergoing chemotherapy. J Clin Oncol. 22(20):4157-4164 (2004).
Goessl et al. DNA Alterations in Body Fluids as Molecular Tumor Markers for Urological Malignancies. European Urology 41(6):668-676 (Jun. 2002).
Gornik et al. Free serum DNA is an early predictor of severity of acute pancreatitis. Clin Biochem. 42(1-2):38-43 (Jan. 2009).
Green et al. Ac electrokinetics: a survey of sub-micrometre particle dynamics. J. Phys. D: Appl. Phys. 33:632-641 (2000).
Guan et al. Analysis of circulating DNA level in the plasma of cervical cancer patients. Nan fang Yi Ke Da Xue Xue Bao 28(9):1663-1667 (Aug. 2008) (English Abstract).
Haeberle et al. Centrifugal extraction of plasma from whole blood on a rotating disk. Lab Chip 6(6):776-781 (2006).
Hashad et al. Free circulating tumor DNA as a diagnostic marker for breast cancer. J Clin Lab Anal. 26(6):467-472 (Nov. 2012).
Higgins et al. Variant Ciz1 is a circulating biomarker for early-stage lung cancer. PNAS USA 109(45):E3128-3135 (Nov. 6, 2012).
Higuchi. Chromosomal DNA fragmentation in apoptosis and necrosis induced by oxidative stress. Biochem Pharacol. 66:1527-1535(2003).
Higuchi et al. Appearance of 1-2 Mbp giant DNA fragments as an early common response leading to cell death induced by various substances that cause oxidative stress. Free Radical Biology & Medicine 23:90-99 (1997).
Hoffmann et al. Methylated DAPK and APC promoter DNA detection in peripheral blood is significantly associated with apparent residual tumor and outcome. J Cancer Res Clin Oncol. 135(89):1231-1237 (Sep. 2009).
Hoffmann et al. Universal protocol for grafting PCR primers onto various lab-on-a-chip substrates for solid-phase PCR. RSC Advances 2:3885-3889 (2012).
Hohaus et al. Cell-free circulating DNA in Hodgkin's and non-Hodgkin's lymphomas. Annals of Oncology 20(8):1408-1413 (2009).
Holdhoff et al. Blood-based biomarkers for malignant gliomas. J Neurooncol 113:345-352 (2013).
Holzel et al. Trapping Single Molecules by Dielectrophoresis. Phys. Rev. Lett. 95:128102 (2005).
Hosny et al. Ser-249 TP53 and CTNNB1 mutations in circulating free DNA of Egyptian patients with hepatocellular carcinoma versus chronic liver diseases. Cancer Lett. 264(2):201-208 (Jun. 18, 2008).
Huang et al. Dielectrophoretic Cell Separation and Gene Expression Profiling on Microelectronic Chip Arrays. Analytical Chem. 74:3362-3371 (2002).
Huang et al. Electric Manipulation of Bioparticles and Macromolecules on Microfabricated Electrodes. Analytical Chemistry (73):1549-1559 (2001).
Huang et al. Functionalization of Surfaces by Water-Accelerated Atom-Transfer Radical Polymerization of Hydroxyethyl Methacrylate and Subsequent Derivatization. Macromolecules 35:1175-1179 (2002).
Hughes. Chapter 16: Nanoparticle Manipulation by Electrostatic Forces. Handbook of Nanoscience, Engineering and Technology 2nd Ed., WA Goddard III, DW Brenner, S. Lyshenski & G. Iafrate (eds.) (CRC Press 2007), pp. 16-1 to 16-32.
Hughes et al. Dielectrophoretic Characterization and Separation of Antibody-Coated Submicrometer Latex Spheres. Anal Chem 71:3441-3445 (1999).
Hughes et al. Dielectrophoretic Manipulation and Characterization of Herpes Simplex Virus-1 Capsids. Eur Biophys J 30:268-272 (2001).
Hughes. Strategies for Dielectrophoretic Separation in Laboratory-on-a-chip Systems. Electrophoresis 23:2569-2582 (2002).
Iida et al. Relation between serum levels of cell-free DNA and inflammation status in hepatitis C virus-related hepatocellular carcinoma. Oncology Reports 20(4):761-765 (Oct. 2008).
Iizuka et al. Elevated Levels of Circulating Cell-free DNA in the Blood of Patients with Hepatitis C Virus-associated Hepatocellular Carcinoma. Anticancer Research 26(6C):4713-4720 (2006).
Jiang et al. Dynamic monitoring of plasma circulating DNA in patients with acute myeloid leukemia and its clinical significance. ZhongguoShi Yan Xue Ye Xue Za Zhi 20(1):53-56 (Feb. 2012) (Abstract).
Jiang et al. Increased plasma DNA integrity index in head and neck cancer patients. Int. J. Cancer 119(11):2673-2676 (Dec. 2006).
Jin et al. Circulating DNA-Important Biomarker of Cancer. Journal of Molecular Biomarkers & Diagnosis S2 (2012) (7 pgs.).
Kakimoto et al. Microsatellite analysis of serum DNA in patients with oral squamous cell carcinoma. Oncology Reports 20(5):1195-1200 (Nov. 2008).
Kolesnikova et al. Circulating DNA in the blood of gastric cancer patients. Ann N Y Acad Sci. 1137:226-231 (Aug. 2008).
Krishnan et al. Alternating current electrokinetic separation and detection of DNA nanoparticles in high-conductance solutions. Electrophoresis 29(9):1765-1774 (2008).
Krishnan et al. An AC electrokinetic method for enhanced detection of DNA nanoparticles. J. Biophotonics 2(4):253-261 (2009).
Krishnan et al. Interaction of nanoparticles at the DEP microelectrode interface under high conductance conditions. Electrochem. Comm. 11(8):1661-1666 (2009).
Kuhlmann et al. LOH at 6q and 10q in fractionated circulating DNA of ovarian cancer patients is predictive for tumor cell spread and overall survival. BMC Cancer 12:3525 (Jul. 31, 2012).
Lavon et al. Serum DNA can define tumor-specific genetic and epigenetic markers in gliomas of various grades. Neuro-Oncology 12(2):173-180 (2010).
Lee et al. A micro cell lysis device. Sensors and Actuators A: Physical. 73(1-2):74-79 (1999).
Lee et al. Methylation of TMEFF2 Gene in Tissue and Serum DNA from Patients with Non-Small Cell Lung Cancer. Molecules and Cells 34(2):171-176 (Aug. 31, 2012).
Li et al. Alternating current electrokinetics enhanced in situ capacitive immunoassay. Electrophoresis 36(3):471-474 (2015).
Lida et al. Relation between serum levels of cell-free DNA and inflammation status in hepatitis C virus-related hepatocellular carcinoma. Oncol Rep. 20(4):761-5 (2008).
Liggett et al. Differential Methylation of Cell-Free Circulating DNA Among Patients with Pancreatic Cancer Versus Chronic Pancreatitis. Cancer 116(7):1674-1680 (Apr. 1, 2010).
Liggett et al. Methylation patterns in cell-free plasma DNA reflect removal of the primary tumor and drug treatment of breast cancer patients. Int. J. Cancer 128(2):492-499 (Jan. 15, 2011).
Lo Nigro et al. Methylated Tissue Factor Pathway Inhibitor 2 (TFPI2) DNA in Serum Is a Biomarker of Metastatic Melanoma. Journal of Investigative Dermatology 133(5):1278-1285 (May 2013).
Lofton-Day et al. DNA Methylation Biomarkers for Blood-Based Colorectal Cancer Screening. Clinical Chemistry 54(2):414-423 (Feb. 2008).

(56) References Cited

OTHER PUBLICATIONS

Ma et al. Detection of circulating hypermethylated tumor-specific RASSF1A DNA in ovarian cancer patients. Zhonghua Bing Li Xue Za Zhi. 34(12):785-787 (Dec. 2005) (Abstract).
Ma et al. Methylated DNA and microRNA in Body Fluids as Biomarkers for Cancer Detection. International Journal of Molecular Sciences 14(5):10307-10331 (May 16, 2013).
Majchrzak et al. Detection of MGMT, RASSF1A, p15INK4B, and p14ARF promoter methylation in circulating tumor-derived DNA of central nervous system cancer patients. J. Appl. Genetics 54:335-344 (2013).
Melnikov et al. Methylation profile of circulating plasma DNA in patients with pancreatic cancer. J Surg Oncol. 99(2):119-122 (Feb. 2009).
Menachery et al. Controlling cell destruction using dielectrophoretic forces. IEE Proc.—Nanobiotechnol. 152(4):145-149 (2005).
Mirza et al. Clinical significance of promoter hypermethylation of ERβ and RARβ2 in tumor and serum DNA in Indian breast cancer patients. Ann Surg Oncol. 19(9):3107-3115 (Sep. 2012).
Misale et al. Emergence of KRAS mutations and acquired resistance to anti EGFR therapy in colorectal cancer. Nature 486(7404):532-536 (Jun. 28, 2012).
Misawa et al. RASSF1A hypermethylation in pretreatment serum DNA of neuroblastoma patients: a prognostic marker. British Journal of Cancer 100:399-404 (2009).
Morgan et al. Separation of Submicron Bioparticles by Dielectrophoresis Biophysical Journal. 77:516-525 (1999).
Mouliere et al. Circulating Cell-Free DNA from Colorectal Cancer Patients May Reveal High KRAS or BRAF Mutation Load. Translational Oncology 6(3):319-328 (Jun. 2013).
Mouliere et al. High fragmentation characterizes tumour-derived circulating DNA. PLoS ONE 6(9):e23418 (2011).
Muller et al. DNA Methylation in Serum of Breast Cancer Patients: An Independent Prognostic Marker. Cancer Research 63(22):7641-7645 (Nov. 15, 2003).
Muller et al. Identification of Loss of Heterozygosity on Circulating Free DNA in Peripheral Blood of Prostate Cancer Patients: Potential and Technical Improvements. Clinical Chemistry 54(4):688-696 (Apr. 2008).
Nakagawa et al. Fabrication of amino Silane-Coated Microchip for DNA extraction from Whole Blood. Journal of Biotechnology 116(2):105-111 (2005).
Nakamoto et al. Detection of Microsatellite Alterations in Plasma DNA of Malignant Mucosal Melanoma Using Whole Genome Amplification. Bull Tokyo Dent. Coll. 49(2):77-87 (May 2008).
Nakamura et al. Application of a Highly Sensitive Detection System for Epidermal Growth Factor Receptor Mutations in Plasma DNA. Journal of Thoracic Oncology 7(9):1369-1381 (Sep. 2012).
Nakayama et al. A Highly Sensitive Method for the Detection of p16 Methylation in the Serum of Colorectal Cancer Patients. Anticancer Research 27(3B):1459-1464 (2007).
Page et al. Detection of HER2 amplification in circulating free DNA in patients with breast cancer. British Journal of Cancer 104:1342-1348 (2011).
Pang et al. Microsatellite alterations of circulating DNA in the plasma of patients with hepatocellular carcinoma. Zhonghua Yi Xue Za Zhi. 86(24):1662-1665 (Jun. 27, 2006) (Abstract).
Papadopoulou et al. Cell-free DNA and RNA in Plasma as a New Molecular Marker for Prostate and Breast Cancer, Ann. NY, Acad. Sci. 1075:235-243 (2006).
Parker et al. mRNA: detection by In Situ and northern hybridization. Methods Mol Biol 106:247-283 (1999).
PCT/US2009/039565 International Preliminary Report on Patentability and Written Opinion dated Oct. 5, 2010.
PCT/US2009/039565 International Search Report dated Dec. 23, 2009.
PCT/US2013/036845 International Search Report and Written Opinion dated Aug. 6, 2013.
PCT/US2013/051158 International Search Report and Written Opinion dated Nov. 14, 2013.
PCT/US2015/024624 International Search Report and Written Opinion dated Aug. 21, 2015.
PCT/US2015/036789 International Search Report and Written Opinion dated Sep. 29, 2015.
PCT/US2016/030821 International Search Report and Written Opinion dated Aug. 29, 2016.
PCT/US2017/024149 International Search Report and Written Opinion dated Jul. 18, 2017.
PCT/US2017/024149 Invitation to Pay Additional Fees dated May 15, 2017.
PCT/US2018/031652 International Search Report and Written Opinion dated Jul. 31, 2018.
PCT/US2018/066602 International Search Report and Written Opinion dated Apr. 4, 2019.
PCT/US2018/066605 International Search Report and Written Opinion dated Mar. 25, 2019.
PCT/US2019/025242 International Search Report and Written Opinion dated Jun. 11, 2019.
Persat, et al., Purification of Nucleic Acids from Whole Blood Using Isotachophoresis, Analytical Chemistry, 81.22 (Nov. 15, 2009): 9507-9511, supporting materials.
Pethig. Dielectrophoresis: Using Inhomogenous AC Electrical Fields to Separate and Manipulate Cells, CRC Critical Reviews in Biotechnology, CRC Press, Boca Raton, FL, US. 16(4):331-348 (Jan. 1, 1996).
Ponomaryova et al. Potentialities of aberrantly methylated circulating DNA for diagnostics and post-treatment follow-up of lung cancer patients. Lung Cancer. 81(3):397-403 (Sep. 2013).
Quesada-Gonzalez et al. Mobile phone-based biosensing: An emerging "diagnostic and communication" technology. Biosensors and Bioelectronics 92:549-562 (2016).
Ramos et al. Ac electrokinetics: a review of forces in microelectrode structures. J Phys. D: Appl. Phys. 31:2338-2353 (1998).
Ren et al. Circulating DNA level is negatively associated with the long-term survival of hepatocellular carcinoma patients. World Journal of Gastroenterology 12(24):3911-3914 (Jun. 28, 2006).
Sai et al. Quantification of Plasma Cell-free DNA in Patients with Gastric Cancer. Anticancer Research 27(4C):2747-2752 (2007).
Sakakura et al. Quantitative Analysis of Tumor-derived Methylated RUNX3 Sequences in the Serum of Gastric Cancer Patients. Anticancer Research 29:2619-2626 (2009).
Salkeni et al. Detection of EGFRvIII mutant DNA in the peripheral blood of brain tumor patients. J. Neurooncol. 115(1):27-35 (Oct. 2013).
Sawabu et al. Serum tumor markers and molecular biological diagnosis in pancreatic cancer. Pancreas 28(3):263-267 (Apr. 2004).
Schwarzenbach. Detection and monitoring of cell-free DNA in blood of patients with colorectal cancer. Ann N Y Acad Sci. 1137:190-196 (Aug. 2008).
Schwarzenbach. Loss of Heterozygosity at Tumor Suppressor Genes Detectable on Fractionated Circulating Cell-Free Tumor DNA as Indicator of Breast Cancer Progression. Clinical Cancer Research 18:5719-5730 (Sep. 25, 2012).
Sharma et al. DNA methylation of circulating DNA: a marker for monitoring efficacy of neoadjuvant chemotherapy in breast cancer patients. Tumour Biol. 33(6):1837-1843 (Dec. 2012).
Shaw et al. Genomic analysis of circulating cell-free DNA infers breast cancer dormancy. Genome Research 22(2):220-231 (Feb. 2012).
Sonnenberg et al. Dielectrophoretic isolation and detection of cfc-DNA nanoparticulate biomarkers and virus from blood. Electrophoresis 34(7):1076-1084 (2013).
Sonnenberg et al. Dielectrophoretic Isolation of DNA and Nanoparticles from Blood. Electrophoresis 33(16):2482-2490 (2012).
Sorenson. Detection of Mutated KRAS2 Sequences as Tumor Markers in Plasma/Serum of Patients with Gastrointestinal Cancer. Clin Cancer Res 6:2129-2137 (2000).
Sosnowski et al. Rapid determination of single base mismatch mutations in DNA hybrids by direct electric field control. PNAS USA 94:1119-1123 (Feb. 1997).
Stephens et al. The dielectrophoresis enrichment of CD34+ cells from peripheral blood stem cell harvests. Bone Marrow Transplant. 18:777-782 (1996).

(56) References Cited

OTHER PUBLICATIONS

Stroun et al. Isolation and characterization of DNA from the plasma of cancer patients. Eur J Cancer Clin Oncol 23:707-712 (1987).
Swaminathan et al. Enhanced sub-micron colloidal particle separation with interdigitated microelectrode arrays using mixed AC/DC dielectrophoretic scheme. Biomedical Microdevices 17(2):1-9 (2015).
Swanson. A fully multiplexed CMOS biochip for DNA analysis. Sensors and Actuators B 64:22-30 (Jun. 2000).
Tamkovich et al. Cell-surface-bound circulating DNA as a prognostic factor in lung cancer. Ann N Y Acad Sci. 1137:214-217 (Aug. 2008).
Tanaka et al. Role of circulating free alu DNA in endometrial cancer. Int J Gynecol Cancer 22(1):82-86 (Jan. 2012).
Tangkijvanich et al. Serum LINE-1 hypomethylation as a potential prognostic marker for hepatocellular carcinoma. Clin Chim Acta. 379(1-2):127-133 (Apr. 2007).
Tani et al. An early detection of recurrence using reverse transcriptase-polymerase chain reaction (RT-PCP) and methylation-specific polymerase chain reaction (MSP) from peripheral blood in patients after gastrectomy. Gan to Kagaku Ryoho 33(12):1720-1722 (Nov. 2006) (Abstract).
Tomita et al. Quantification of Circulating Plasma DNA Fragments as Tumor Markers in Patients with Esophageal Cancer, Anticancer Research 27(4C):2737-2742 (2007).
Toner et al. Blood-on-a-chip. Annual Review of Biomedical Engineering 7:77-103 (2005).
Tong et al. Diagnostic developments involving cell-free (circulating) nucleic acids. Clinica Chimica Acta. 363:187-96 (2006).
Toth et al. Free circulating DNA based colorectal cancer screening from peripheral blood: the possibility of the methylated septin 9 gene marker. Orv. Hetil. 150(21): 969-977(May 24, 2009) (English Abstract).
Trevisiol et al. Prognostic value of circulating KRAS2 gene mutations in colorectal cancer with distant metastases. Int J Biol Markers. 21(4):223-228 (Oct.-Dec. 2006).
Tuukanen et al. Carbon nanotubes as electrodes for dielectrophoresis of DNA. Nano Letters. 6:1339-1343 (2006).
Umetani et al. Increased Integrity of Free Circulating DNA in Sera of Patients with Colorectal or Periampullary Cancer: Direct Quantitative PCR for ALU Repeats. Clinical Chemistry 52(6):1062-1069 (Jun. 2006).
Umetani et al. Prediction of Breast Tumor Progression by Integrity of Free Circulating DNA in Serum. Journal of Clinical Oncology 24(26):4270-4276 (Sep. 10, 2006).
U.S. Appl. No. 12/936,147 Office Action dated Apr. 27, 2015.
U.S. Appl. No. 12/936,147 Office Action dated Aug. 12, 2015.
U.S. Appl. No. 12/936,147 Office Action dated Dec. 11, 2012.
U.S. Appl. No. 12/936,147 Office Action dated Jul. 18, 2013.
U.S. Appl. No. 12/936,147 Office Action dated Mar. 17, 2017.
U.S. Appl. No. 12/936,147 Office Action dated Oct. 31, 2012.
U.S. Appl. No. 12/936,147 Office Action dated Sep. 22, 2016.
U.S. Appl. No. 13/864,179 Office Action dated Aug. 15, 2013.
U.S. Appl. No. 14/063,884 Office Action dated Aug. 28, 2014.
U.S. Appl. No. 14/063,884 Office Action dated Feb. 12, 2014.
U.S. Appl. No. 14/067,841 Office Action dated Mar. 16, 2015.
U.S. Appl. No. 14/194,566 Office Action dated May 15, 2014.
U.S. Appl. No. 14/201,715 Office Action dated May 15, 2014.
U.S. Appl. No. 14/201,726 Office Action dated May 16, 2014.
U.S. Appl. No. 14/271,337 Office Action dated Jun. 12, 2014.
U.S. Appl. No. 14/311,037 Office Action dated Sep. 5, 2014.
U.S. Appl. No. 14/415,546 Office Action dated Apr. 28, 2016.
U.S. Appl. No. 14/415,546 Office Action dated Oct. 7, 2016.
U.S. Appl. No. 14/477,800 Office Action dated Dec. 15, 2014.
U.S. Appl. No. 14/477,800 Office Action dated Feb. 2, 2015.
U.S. Appl. No. 14/509,022 Office Action dated Jan. 15, 2015.
U.S. Appl. No. 14/512,356 Office Action dated Feb. 5, 2015.
U.S. Appl. No. 14/680,819 Office Action dated Dec. 3, 2015.
U.S. Appl. No. 14/925,157 Office Action dated Mar. 22, 2016.
U.S. Appl. No. 15/146,572 Office Action dated Jul. 11, 2019.
U.S. Appl. No. 15/171,876 Office Action dated Oct. 12, 2016.
U.S. Appl. No. 15/293,062 Office Action dated Mar. 22, 2017.
U.S. Appl. No. 15/320,730 Office Action dated Oct. 4, 2017.
U.S. Appl. No. 15/571,812 Office Action dated Apr. 30, 2020.
U.S. Appl. No. 15/571,812 Office Action dated Oct. 21, 2019.
U.S. Appl. No. 15/974,591 Office Action dated Jan. 2, 2020.
U.S. Appl. No. 15/974,591 Office Action dated Mar. 21, 2019.
U.S. Appl. No. 15/974,591 Office Action dated Sep. 5, 2018.
U.S. Appl. No. 15/991,717 Office Action dated Jul. 9, 2019.
U.S. Appl. No. 15/991,717 Office Action dated Nov. 2, 2018.
U.S. Appl. No. 16/355,462 Office Action dated Jan. 21, 2021.
U.S. Appl. No. 16/355,462 Office Action dated Sep. 3, 2020.
U.S. Appl. No. 15/146,572 Office Action dated Jan. 2, 2019.
U.S. Appl. No. 15/469,406 Office Action dated Mar. 28, 2018.
Wallner et al. Methylation of Serum DNA Is an Independent Prognostic Marker in Colorectal Cancer. Clinical Cancer Research 12(24):7347-7352 (Dec. 15, 2006).
Ward et al. Binding activities of a repertoire of single immunoglobulin variable domains secreted from *Escherichia coli*. Nature 341(6242):544-546 (1989).
Washizu et al. Applications of electrostatic stretch-and-positioning of DNA. Industry Applications. IEEE Transactions on Industry Applications 31:447-456 (1995).
Washizu et al. Electrostatic manipulation of DNA in microfabricated structures. Industry Applications. IEEE Transactions on Industry Applications 26:1165-1172 (1990).
Weaver et al. Methylated tumor-specific DNA as a plasma biomarker in patients with glioma. Cancer Invest. 24(1):35-40 (Feb. 2006).
Weiss et al. Circulating tumor DNA to monitor metastatic breast cancer. New England Journal of Medicine. 369(1):93 (Jul. 4, 2013).
Widschwendter et al. CDH1 and CDH13 Methylation in Serum is an Independent Prognostic Marker in Cervical Cancer Patients. Int. J. Cancer 109(2):163-166 (Mar. 20, 2004).
Wu et al. Cell-free DNA: measurement in various carcinomas and establishment of normal reference range. Clin Chim Acta. 321(1-2):77-87 (2002).
Xie et al. Quantification of plasma DNA as a screening tool for lung cancer. Chinese Medical Journal 117(10):1485-1488 (Oct. 2004).
Xue et al. Optimizing the yield and utility of circulating cell-free DNA from plasma and serum. Clin Chim Acta 404(2):100-4 (2009).
Yoon et al. Comparison of Circulating Plasma DNA Levels between Lung Cancer Patients and Healthy Controls. Journal of Molecular Diagnostics 11(3):182-185 (May 2009).
Zachariah et al. Circulating cell-free DNA as a potential biomarker for minimal and mild endometriosis. Reprod Biomed Online 18(3):407-411 (Mar. 2009).
Zachariah et al. Levels of circulating cell-free nuclear and mitochondrial DNA in benign and malignant ovarian tumors. Obstet. Gynecol. 112(4):843-850 (Oct. 2008).
Zhang et al. Individually addressable microelectrode arrays fabricated with gold-coated pencil graphite particles for multiplexed and high sensitive impedance immunoassays. Biosensors And Bioelectronics 25(1):34-40 (2009).
Zhou et al. Circulating cell-free nucleic acids: promising biomarkers of hepatocellular carcinoma. Semin Oncol. 39(4):440-448 (Aug. 2012).
Ziegler et al. Circulating DNA: a new diagnostic gold mine? Cancer Treat Rev. 28:255-271 (2002).
Zurita et al. Hypermethylated 14-3-3-σ and ESR1 gene promoters in serum as candidate biomarkers for the diagnosis and treatment efficacy of breast cancer metastasis. BMC Cancer 10(217) 9 pgs (May 2010).
Cohen, et al., Detection and localization of surgically resectable cancers with a multi-analyte blood test. Science Feb. 23, 2018: vol. 359, Issue 6378, pp. 926-930. DOI: 10.1126/science.aar3247.
Dvorak: Vascular permeability factor/vascular endothelial growth factor: a critical cytokine in tumor angiogenesis and a potential target for diagnosis and therapy. J Clin Oncol. 20(21):4368-4380 doi:10.1200/JCO.2002.10.088 (2002).
Gao et al.: Increased integrity of circulating cell-free DNA in plasma of patients with acute leukemia. Clin Chem Lab Med. 48(11):1651-1656 doi:10.1515/CCLM.2010.311. (2010).
Hinestrosa et al.: Simultaneous Isolation of Circulating Nucleic Acids and EV-Associated Protein Biomarkers From Unprocessed

(56) References Cited

OTHER PUBLICATIONS

Plasma Using an AC Electrokinetics-Based Platform. Front Bioeng Biotechnol. 8(581157):1-13 doi:10.3389/fbioe.2020.581157 (2020).
Hoshino et al.: Extracellular Vesicle and Particle Biomarkers Define Multiple Human Cancers. Cell 182(4):1044-1061.E18. doi:10.1016/j.cell.2020.07.009 (2020).
Hoshino et al.: Tumour exosome integrins determine organotropic metastasis. Nature 527(7578):329-335 doi:10.1038/nature15756 (2015).
Juppner. Functional properties of the PTH/PTHrP receptor. Bone. Aug. 1995; 17(2):Supplement 39S-42S.
Kjaergaard et al.: The use of the soluble adhesion molecules sE-selectin, sICAM-1, sVCAM-1, sPECAM-1 and their ligands CD11a and CD49d as diagnostic and prognostic biomarkers in septic and critically ill non-septic ICU patients. APMIS 124(10):846-855 doi:10.1111/apm.12585 (2016).
Krishnan et al.: Alternating current electrokinetic separation and detection of DNA nanoparticles in high-conductance solutions. Electrophoresis 29(9):1765-1774 doi:10.1002/elps.200800037 (2008).
Krishnan et al.: An AC electrokinetic method for enhanced detection of DNA nanoparticles. J Biophotonics. 2(4):253-261 doi:10.1002/jbio.200910007 (2009).
Krishnan et al.: Interaction of Nanoparticles at the DEP Microelectrode Interface under High Conductance Conditions. lectrochem commun. 11(8):1661-1666 doi:10.1016/j.elecom.2009.06.033 (2009).
Lennartsson et al.: Stem cell factor receptor/c-Kit: from basic science to clinical implications. Physiol Rev. 92(4):1619-1649 doi:10.1152/physrev.00046.2011 (2012).
Liu et al. Sensitive and Specific Multi-Cancer Detection and Localization Using Methylation Signatures in Cell-Free DNA. Annals of Oncology 31(6):745-759 (2020).
Lu et al.: Abstract: AC electrokinetic isolation of cell free high molecular weight DNA (CF-HMW DNA) from serum. American Association for Cancer Research Publication 72(8):1704 URL: https://doi.org/10.1158/1538-7445.AM2012-1704 (2012).
Moasser: The oncogene HER2: its signaling and transforming functions and its role in human cancer pathogenesis. Oncogene 26(45):6469-6487 doi:10.1038/sj.onc.1210477 (2007).
Moreira, et al. Cell-free DNA as a noninvasive acute rejection marker in renal transplantation. Clin Chem. Nov. 2009;55(11):1958-66. doi: 10.1373/clinchem.2009.129072. Epub Sep. 3, 2009.
Niland et al.: Neuropilins in the Context of Tumor Vasculature. Int J Mol Sci. 20(3):639, pp. 1-44 doi:10.3390/ijms20030639 (2019).
PCT/US2021/041177 International Search Report and Written Opinion dated Oct. 19, 2021.
PCT/US2022/012149 International Search Report and Written Opinion dated Apr. 11, 2022.
Ross et al.: Binding affinity of surface functionalized gold nanoparticles to hydroxyapatite. J Biomed Mater Res A. 99(1):58-66 (2011).
Sonnenberg et al.: Dielectrophoretic isolation and detection of cancer-related circulating cell-free DNA biomarkers from blood and plasma. Electrophoresis. 2014 35(12-13):1828-1836 (2014).
Turner et al.: Cancer Detection at your Fingertips: Smartphone-Enabled DNA Testing. Annu Int Conf IEEE Eng Med Biol Soc. 2018:5418-5421 doi:10.1109/EMBC.2018.8513553 (2018).
U.S. Appl. No. 16/355,462 Final Office Action dated Mar. 8, 2022.
U.S. Appl. No. 16/955,707 Non-Final Office Action dated Aug. 8, 2022.
U.S. Appl. No. 16/955,732 Final Office Action dated Apr. 29, 2022.
U.S. Appl. No. 16/955,732 Non-Final Office Action dated Nov. 19, 2021.
U.S. Appl. No. 17/033,427 Non-Final Office Action dated Oct. 6, 2022.
U.S. Appl. No. 16/355,462 Office Action dated Aug. 18, 2021.
Ohwaki: Characterization of native oxide on aluminum by infrared spectroscopy. 54(1):31-36. doi: 10.2464/jilm.54.31 [with English Machine Translation] (2004).
U.S. Appl. No. 16/955,732 Non-Final Office Action dated Mar. 23, 2023.
U.S. Appl. No. 17/033,427 Final Office Action dated Apr. 21, 2023.

* cited by examiner

DIELECTRIC MATERIALS

CROSS-REFERENCE

This patent application is a U.S. National Phase of International Application No. PCT/US2019/025242, which claims the benefit of U.S. Provisional Patent Application No. 62/651,659, filed Apr. 2, 2018, which is incorporated herein by reference in its entirety.

BACKGROUND OF THE INVENTION

Progress has been made in characterizing and isolating analytes from complex samples, including the isolation of biomolecules, such as nucleic acids or virus particles from biological samples, for next generation sequencing, immunoassays, or other diagnostic application. These techniques and others are expected to transform fields as diverse as medicine, renewable energy, biosecurity and agriculture to name a few. However, devices, methods, compositions, and systems for efficiently isolating analytes suitable for analysis with these advanced methods have not kept pace, and this may become a limitation.

SUMMARY OF THE INVENTION

The present methods, devices, processes, and systems disclosed herein fulfill a need for improved methods of isolating and/or quantifying analytes from samples. Particular attributes of certain aspects provided herein include devices comprising dielectric materials for isolation of analytes. In some embodiments, the dielectric materials are used with electrodes. In some embodiments, the present methods, devices, processes, and systems can be used to isolate and/or separate analytes such as cell-free nucleic acids, exosomes, high molecular weight (mw) nucleic acids, including high molecular weight DNA, oligo-nucleosome complexes, nucleosomes, aggregated proteins, vesicle bound DNA, cell membrane fragments and cellular debris, proteins, lipids, viruses, or other analyte from dilute and/or complex fluids such as blood, environmental samples, or any other sample source comprising analytes. In other aspects, the present invention uses small amounts of starting material, achieves isolation of highly pure analytes, and is amenable to multiplexed and high-throughput operation.

In one aspect, disclosed herein are devices for capturing analytes comprising: a) an electrode configured to generate an electrokinetic field region; and b) a layer in contact with at least a portion of the electrode, wherein the layer comprises a dielectric material and is less than 100 angstroms in thickness. In some embodiments, the electrode is energized with AC. In some embodiments, the electrode is energized with DC. In some embodiments, the electrokinetic field comprises a dielectrophoretic field, an electrothermal field, an electroosmotic field, or a combination thereof. In some embodiments, the layer is about 5 angstroms to about 25 angstroms in thickness. In some embodiments, the layer is about 13 angstroms to about 19 angstroms in thickness. In some embodiments, the layer is about 16 angstroms in thickness. In some embodiments, the layer is no more than 50 angstroms in thickness. In some embodiments, the dielectric material comprises a metalloid oxide, metalloid nitride, metalloid carbide, metalloid silicide, or combination thereof. In some embodiments, the metalloid is selected from the group consisting of boron, silicon, germanium, arsenic, antimony, tellurium, and combinations thereof. In some embodiments, the dielectric material comprises a non-metal, and at least one of boron, silicon, germanium, arsenic, antimony, tellurium, or any combination thereof. In some embodiments, the non-metal is selected from the group consisting of oxygen, carbon, silicon, selenium, nitrogen, and combinations thereof. In some embodiments, the dielectric material further comprises a metal. In some embodiments, the metal is selected from the group consisting of platinum, ruthenium, rhodium, iridium, manganese, magnesium, tungsten, zirconium, chromium, gold, iron, aluminum, tantalum, gallium, copper, silver, brass, zinc, tin, nickel, palladium, titanium, cobalt, indium, bismuth, lead, lanthanum, hafnium, yttrium, and combinations thereof. In some embodiments, the metal is selected from the group consisting of calcium, magnesium, strontium, barium, and combinations thereof. In some embodiments, the metal is selected from the group consisting aluminum, zinc, gallium, indium, cadmium, mercury, thallium, lead, bismuth, antimony, germanium, and combinations thereof. In some embodiments, the metal is selected from the group consisting of platinum, ruthenium, rhodium, iridium, manganese, tungsten, zirconium, chromium, gold, iron, tantalum, copper, silver, brass, zinc, tin, nickel, palladium, titanium, titanium, lead, lanthanum, hafnium, yttrium, and combinations thereof. In some embodiments, the dielectric material comprises an organic or inorganic polymer. In some embodiments, the polymer is fluorinated. In some embodiments, the dielectric material comprises a ceramic. In some embodiments, the dielectric material comprises a high-κ dielectric material. In some embodiments, the dielectric material comprises a low-κ dielectric material. In some embodiments, the dielectric material comprises a material having a dielectric constant of no more than 3. In some embodiments, the dielectric material has a dielectric constant of no more than 4. In some embodiments, the dielectric material has a dielectric constant of no more than 10. In some embodiments, the dielectric material has a dielectric constant of at least 4. In some embodiments, the dielectric material has a dielectric constant of about 2 to about 10. In some embodiments, the dielectric material has a dielectric constant of at least 10. In some embodiments, the layer comprises a material selected from the group consisting of silicon, silicon oxide, silicon nitride, silicon carbide, titanium oxide, germanium, polytetrafluoroethylene, neoprene, polyvinylidene fluoride, silicon dioxide, titanium dioxide, fluorosilicate glass, polyimide, fluorinated polyimide, methylsilsesquioxane, polyarylene ether, polyethylene, polystyrene, calcium carbonate, and combinations thereof. In some embodiments, the dielectric material has a resistivity of about $10^{-5}$ Ω·m to about $10^{25}$ Ω·m. In some embodiments, the dielectric material has a resistivity of about $10^{-2}$ Ω·m to about $10^{20}$ Ω·m. In some embodiments, the dielectric material has a resistivity of about 10 Ω·m to about $10^{15}$ Ω·m. In some embodiments, the dielectric material has a resistivity of about $10^{3}$ Ω·m to about $10^{12}$ Ω·m. In some embodiments, the dielectric material has a resistivity of about $10^{-5}$ Ω·m to about $10^{6}$ Ω·m. In some embodiments, the dielectric material has a resistivity of about $10^{-4}$ Ω·m to about $10^{7}$ Ω·m. In some embodiments, the electrode comprises a conductive material. In some embodiments, the conductive material has a resistivity of about $10^{-8}$ Ω·m to about $10^{-2}$ Ω·m. In some embodiments, the conductive material has a resistivity of about $10^{-8}$ Ω·m to about $10^{-5}$ Ω·m. In some embodiments, the conductive material has a resistivity of about $10^{-4}$ Ω·m to about $10^{-2}$ Ω·m. In some embodiments, the ratio of dielectric to conductive material is about 0.01:2 to about 99:1. In some embodiments, the ratio of dielectric to conductive material is about 0.1:2 to about 0.7:2. In some embodiments, the ratio of dielectric to conductive material is about 0.3:2. In some embodiments, the conductive material comprises at least one of the group consisting of platinum, gold, aluminum, tantalum, gallium arsenide, silver, brass, zinc, tin, nickel, silicon, palladium, titanium, graphite, carbon, and combinations thereof. In some embodiments, the electrode comprises a metal. In some embodiments, the electrode comprises a mixed-metal oxide. In some embodiments, the mixed-metal oxide is selected from the group consisting of platinum oxide, titanium oxide, zirconium oxide, niobium oxide, tantalum oxide, tungsten oxide, and combinations thereof. In some embodiments, the electrode comprises a mixed-metal carbide. In some embodiments, the mixed-metal carbide is selected from the group consisting of platinum carbide, titanium carbide, zirconium carbide, niobium carbide, tantalum carbide, tungsten carbide, and combinations thereof. In some embodiments, the electrode comprises a mixed-metal nitride. In some embodiments, the mixed-metal nitride is selected from the group consisting of platinum nitride, titanium nitride, zirconium nitride, niobium nitride, tantalum nitride, tungsten nitride, and combinations thereof. In some embodiments, the electrode has a resistivity of about $10^{-8}$ Ω·m to about $10^{-2}$ Ω·m. In some embodiments, the electrode has a resistivity of about $10^{-6}$ Ω·m to about $10^{-4}$ Ω·m. In some embodiments, the electrode has a resistivity of about $10^{-6}$ Ω·m to about $10^{-3}$ Ω·m. In some embodiments, the composition comprises a plurality of electrodes. In some embodiments, the conductive material is substantially absent from the center of the individual electrodes. In some embodiments, the plurality of electrodes is configured in an array. In some embodiments, the plurality of electrodes is configured in three-dimensions. In some embodiments, the conductive material is configured as discontinuous, curved lines in an open disk shape, a wavy line shape, a hollow tube shape, a hollow triangular tube, or a hollow ring with an extruded center. In some embodiments, the electrode is about 40 μm to about 1000 μm in its largest dimension. In some embodiments, the electrode is about 40 μm to about 500 μm in its largest dimension. In some embodiments, the electrode is about 40 μm to about 100 μm in its largest dimension. In some embodiments, the electrode is about 100 nm to about 500 nm in thickness. In some embodiments, the electrode is about 50 nm to about 200 nm in thickness. In some embodiments, the electrode is about 100 nm to about 1 μm in thickness. In some embodiments, the electrode is coated with a polymer layer. In some embodiments, the polymer layer is porous. In some embodiments, the polymer layer further comprises a dielectric material. In some embodiments, the polymer layer comprises a copolymer. In some embodiments, the polymer layer comprises polymethyl methacrylate, nylon 6,6, polyether ether ketone, polyether sulfone, polystyrene, polyisoprene, polyethylene terephthalate, or any combination thereof. In some embodiments, the polymer layer comprises polyhydroxyethylmethacrylate. In some embodiments, the polymer layer comprises a hydrogel. In some embodiments, the hydrogel has a thickness between about 0.01 microns and 1 micron. In some embodiments, the hydrogel has a thickness between about 0.01 micron and 0.1 micron. In some embodiments, the hydrogel has a thickness between about 0.1 micron and 1 micron. In some embodiments, the presence of the layer results in about a 0.01% to about a 99.99% reduction in the conductivity of the device when compared to the device without the layer. In some embodiments, the presence of the layer results in about 0.01% to about 50% reduction in the conductivity of the device when compared to the device without the layer. In some embodiments, the presence of the layer results in about 50% to about 99.99% reduction in the conductivity of the device when compared to the device without the layer. In some embodiments, the presence of the layer results in about 25% to about 75% reduction in the conductivity of the device when compared to the device without the layer. In some embodiments, the presence of the layer results in about 1% to about 25% reduction in the conductivity of the device when compared to the device without the layer. In some embodiments, the presence of the layer results in about 0.01% to about 10% reduction in the conductivity of the device when compared to the device without the layer.

Additionally provided herein are devices for capturing analytes comprising: a) an electrode configured to generate an electrokinetic field region; and b) a layer in contact with at least a portion of the electrode, wherein the layer comprises a dielectric material and is 100 angstroms to about 10,000 angstroms in thickness. In some embodiments, the electrode is energized with AC. In some embodiments, the electrode is energized with DC. In some embodiments, the electrokinetic field comprises a dielectrophoretic field, an electrothermal field, an electroosmotic field, or a combination thereof. In some embodiments, the dielectric material comprises a metalloid oxide, metalloid nitride, metalloid carbide, metalloid silicide, or combination thereof. In some embodiments, the metalloid is selected from the group consisting of boron, silicon, germanium, arsenic, antimony, tellurium, and combinations thereof. In some embodiments, the dielectric material comprises a non-metal, and at least one of boron, silicon, germanium, arsenic, antimony, tellurium, or any combination thereof. In some embodiments, the non-metal is selected from the group consisting of oxygen, carbon, silicon, selenium, nitrogen, and combinations thereof. In some embodiments, the dielectric material further comprises a metal. In some embodiments, the metal is selected from the group consisting of platinum, ruthenium, rhodium, iridium, manganese, magnesium, tungsten, zirconium, chromium, gold, iron, aluminum, tantalum, gallium, copper, silver, brass, zinc, tin, nickel, palladium, titanium, cobalt, indium, bismuth, lead, lanthanum, hafnium, yttrium, and combinations thereof. In some embodiments, the metal is selected from the group consisting of calcium, magnesium, strontium, barium, and combinations thereof. In some embodiments, the metal is selected from the group consisting aluminum, zinc, gallium, indium, cadmium, mercury, thallium, lead, bismuth, antimony, germanium, and combinations thereof. In some embodiments, the metal is selected from the group consisting of platinum, ruthenium, rhodium, iridium, manganese, tungsten, zirconium, chromium, gold, iron, tantalum, copper, silver, brass, zinc, tin, nickel, palladium, titanium, titanium, lead, lanthanum, hafnium, yttrium, and combinations thereof. In some embodiments, the dielectric material comprises an organic or inorganic polymer. In some embodiments, the polymer is fluorinated. In some embodiments, the dielectric material comprises a ceramic. In some embodiments, the dielectric material comprises a high-κ dielectric material. In some embodiments, the dielectric material comprises a low-κ dielectric material. In some embodiments, the dielectric material comprises a material having a dielectric constant of no more than 3. In some embodiments, the dielectric material has a dielectric constant of no more than 4. In some embodiments, the dielectric material has a dielectric constant of no more than 10. In some embodiments, the dielectric material has a dielectric constant of at least 4. In some embodiments, the dielectric material has a dielectric constant of about 2 to about 10. In some embodiments, the dielectric material has a dielectric constant of at least 10. In some embodiments, the layer is 100 angstroms to about 1000 angstroms in thickness. In some embodiments, the layer is about 1000 angstroms to about 10,000 angstroms in thickness. In some embodiments, the layer comprises a material selected from the group consisting of silicon, silicon oxide, silicon nitride, silicon carbide, titanium oxide, germanium, polytetrafluoroethylene, neoprene, polyvinylidene fluoride, silicon dioxide, titanium dioxide, fluorosilicate glass, polyimide, fluorinated polyimide, methylsilsesquioxane, polyarylene ether, polyethylene, polystyrene, calcium carbonate, and combinations thereof. In some embodiments, the dielectric material has a resistivity of about $10^{-5}$ Ω·m to about $10^{25}$ Ω·m. In some embodiments, the dielectric material has a resistivity of about $10^{-2}$ Ω·m to about $10^{20}$ Ω·m. In some embodiments, the dielectric material has a resistivity of about 10 Ω·m to about $10^{15}$ Ω·m. In some embodiments, the dielectric material has a resistivity of about $10^{3}$ Ω·m to about $10^{12}$ Ω·m. In some embodiments, the dielectric material has a resistivity of about $10^{-5}$ Ω·m to about $10^{6}$ Ω·m. In some embodiments, the dielectric material has a resistivity of about $10^{-4}$ Ω·m to about $10^{7}$ Ω·m. In some embodiments, the electrode comprises a conductive material. In some embodiments, the conductive material has a resistivity of about $10^{-8}$ Ω·m to about $10^{-2}$ Ω·m. In some embodiments, the conductive material has a resistivity of about $10^{-8}$ Ω·m to about $10^{-5}$ Ω·m. In some embodiments, the conductive material has a resistivity of about $10^{-4}$ Ω·m to about $10^{-2}$ Ω·m. In some embodiments, the ratio of dielectric to conductive material is about 0.01:2 to about 99:1. In some embodiments, the ratio of dielectric to conductive material is about 0.1:2 to about 0.7:2. In some embodiments, the ratio of dielectric to conductive material is about 0.3:2. In some embodiments, the conductive material comprises at least one of the group consisting of platinum, gold, aluminum, tantalum, gallium arsenide, copper, silver, brass, zinc, tin, nickel, silicon, palladium, titanium, graphite, carbon, and combinations thereof. In some embodiments, the electrode comprises a metal. In some embodiments, the electrode comprises a mixed-metal oxide. In some embodiments, the mixed-metal oxide is selected from the group consisting of platinum oxide, titanium oxide, zirconium oxide, niobium oxide, tantalum oxide, tungsten oxide, and combinations thereof. In some embodiments, the electrode comprises a mixed-metal carbide. In some embodiments, the mixed-metal carbide is selected from the group consisting of platinum carbide, titanium carbide, zirconium carbide, niobium carbide, tantalum carbide, tungsten carbide, and combinations thereof. In some embodiments, the electrode comprises a mixed-metal nitride. In some embodiments, the mixed-metal nitride is selected from the group consisting of platinum nitride, titanium nitride, zirconium nitride, niobium nitride, tantalum nitride, tungsten nitride, and combinations thereof. In some embodiments, the electrode has a resistivity of about $10^{-8}$ Ω·m to about $10^{-2}$ Ω·m. In some embodiments, the electrode has a resistivity of about $10^{-6}$ Ω·m to about $10^{-}$Ω·m. In some embodiments, the electrode has a resistivity of about $10^{-6}$ Ω·m to about $10^{-3}$ Ω·m. In some embodiments, the composition comprises a plurality of electrodes. In some embodiments, the conductive material is substantially absent from the center of the individual electrodes. In some embodiments, the plurality of electrodes is configured in an array. In some embodiments, the plurality of electrodes is configured in three-dimensions. In some embodiments, the conductive material is configured as discontinuous, curved lines in an open disk shape, a wavy line shape, a hollow tube shape, a hollow triangular tube, or a hollow ring with an extruded center. In some embodiments, the electrode is about 40 μm to about 1000 μm in its largest dimension. In some embodiments, the electrode is about 40 μm to about 500 μm in its largest dimension. In some embodiments, the electrode is about 40 μm to about 100 μm in its largest dimension. In some embodiments, the electrode is about 100 nm to about 500 nm in thickness. In some embodiments, the electrode is about 50 nm to about 200 nm in thickness. In some embodiments, the electrode is about 100 nm to about 1 μm in thickness. In some embodiments, the electrode is coated with a polymer layer. In some embodiments, the polymer layer is porous. In some embodiments, the polymer layer further comprises a dielectric material. In some embodiments, the polymer layer comprises a copolymer. In some embodiments, the polymer layer comprises polymethyl methacrylate, nylon 6,6, polyether ether ketone, polyether sulfone, polystyrene, polyisoprene, polyethylene terephthalate, or any combination thereof. In some embodiments, the polymer layer comprises polyhydroxyethylmethacrylate. In some embodiments, the polymer layer comprises a hydrogel. In some embodiments, the hydrogel has a thickness between about 0.01 microns and 1 micron. In some embodiments, the hydrogel has a thickness between about 0.01 micron and 0.1 micron. In some embodiments, the hydrogel has a thickness between about 0.1 micron and 1 micron. In some embodiments, the presence of the layer results in about a 0.01% to about a 99.99% reduction in the conductivity of the device when compared to the device without the layer. In some embodiments, the presence of the layer results in about 0.01% to about 50% reduction in the conductivity of the device when compared to the device without the layer. In some embodiments, the presence of the layer results in about 50% to about 99.99% reduction in the conductivity of the device when compared to the device without the layer. In some embodiments, the presence of the layer results in about 25% to about 75% reduction in the conductivity of the device when compared to the device without the layer. In some embodiments, the presence of the layer results in about 1% to about 25% reduction in the conductivity of the device when compared to the device without the layer. In some embodiments, the presence of the layer results in about 0.01% to about 10% reduction in the conductivity of the device when compared to the device without the layer.

Also provided herein are devices for capturing analytes comprising an electrode comprising platinum, wherein the electrode is configured to generate an AC dielectrophoretic field region; and a layer in contact with a portion of the electrode, wherein the layer is less than 100 angstroms in thickness; comprises a dielectric material and a conductive material, wherein the ratio of semi-conductive to conductive material is about 0.3/2; and the presence of the layer results in a 30% reduction in conductivity of the device.

Also provided herein are devices for capturing analytes comprising an electrode comprising platinum, wherein the electrode is configured to generate an AC dielectrophoretic field region; and a layer in contact with a portion of the electrode, wherein the layer is less than 100 angstroms in thickness; comprises a dielectric material and a conductive material, wherein the ratio of semi-conductive to conductive material is about 0.15:1; and the presence of the layer results in a 30% reduction in conductivity of the device.

Additionally provided herein are methods for isolating an analyte in a sample, the method comprising: applying the sample to the device of the devices provided herein; producing at least one AC dielectrophoretic and/or AC electrokinetic field region; and isolating the analyte in the AC dielectrophoretic and/or AC electrokinetic field region. In some embodiments, the presence of the layer results in an increase in analyte capture on the surface when compared to the device without the layer. In some embodiments, the presence of the layer results in at least a 5 fold increase in analyte capture on the surface when compared to the device without the layer. In some embodiments, the presence of the layer results in at least a 50 fold increase in analyte capture on the surface when compared to the device without the layer. In some embodiments, the presence of the layer results in at least a 100 fold increase in analyte capture on the surface when compared to the device without the layer. In some embodiments, the presence of the layer results in at least a 200 fold increase in analyte capture on the surface when compared to the device without the layer. In some embodiments, the presence of the layer results in at least a 500 fold increase in analyte capture on the surface when compared to the device without the layer. In some embodiments, the analyte comprises a biomolecule. In some embodiments, the analyte comprises nucleic acid, nucleosomes, exosomes, extracellular vesicles, aggregated proteins, viruses, prokaryotic cells, cell membrane fragments, mitochondria, cellular vesicles, or any combination thereof. In some embodiments, the analyte comprises a virus. In some embodiments, the analyte comprises cell-free materials. In some embodiments, the analyte comprises cell-free nucleic acid. In some embodiments, the sample comprises a fluid. In some embodiments, the fluid comprises a cell. In some embodiments, the cell comprises a prokaryotic cell. In some embodiments, the cell comprises a eukaryotic cell. In some embodiments, the fluid has a conductivity of 100 mS/m or more. In some embodiments, the fluid has a conductivity of less than 100 mS/m. In some embodiments, the analyte is no more than 1 micrometer in its largest dimension. In some embodiments, the analyte is no more than 0.1 micrometers in its largest dimension. In some embodiments, the analyte is no more than 50 nanometers in its largest dimension. In some embodiments, the analyte has a mass of no more than 1 nanogram. In some embodiments, the analyte has a mass of no more than 1 picogram. In some embodiments, the analyte has a molecular weight of no more than $10^9$ grams per mol. In some embodiments, the analyte has a molecular weight of no more than $10^6$ grams per mol. In some embodiments, the analyte has a molecular weight of no more than $10^3$ grams per mol. In some embodiments, the analyte has a dielectric constant of about 1 to about 100. In some embodiments, the analyte has a dielectric constant of about 1 to about 20. In some embodiments, the analyte has a dielectric constant of about 6 to about 11.

Further provided herein are methods for manufacturing any of the devices described herein comprising depositing the layer on the electrode using at least one deposition technique. In some embodiments, the deposition technique is selected from the group consisting of e-beam deposition, electrode sputtering deposition, atomic layer deposition, plasma-enhanced chemical vapor deposition (PECVD), pulsed-laser deposition, and chemical vapor deposition. In some embodiments, the deposition technique comprises sputtering deposition. In some embodiments, the sputtering deposition comprises ion-beam, reactive, ion-assisted, high-target utilization, high-power impulse magnetron, or gas flow sputtering.

Additionally provided herein are methods of diagnosing or monitoring a disease or condition in a patient comprising applying a sample to any one of the devices described herein.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
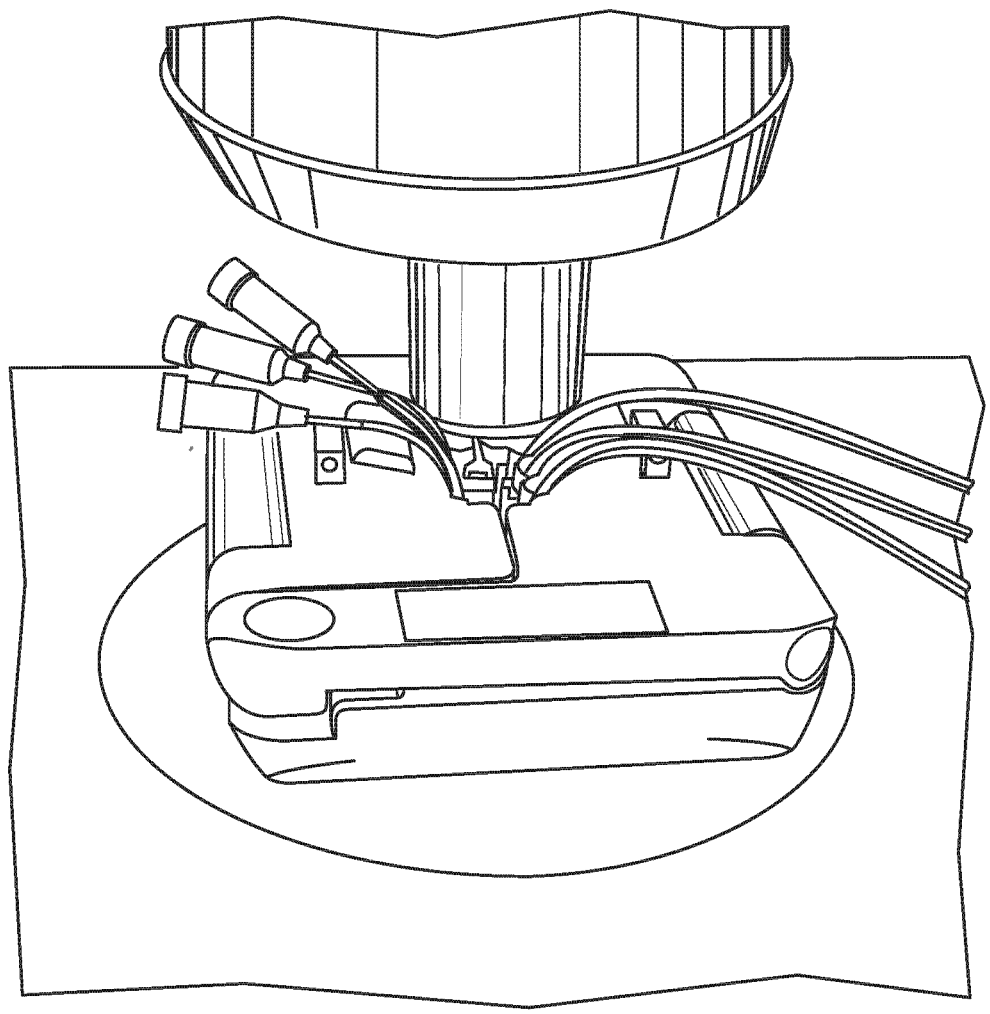
FIG. 1 shows a top view of an exemplary device.

Described herein are methods, devices, systems, and compositions comprising dielectric materials. In specific aspects of the methods, devices and systems disclosed herein, electrodes are layered with or incorporate a dielectric material. In some cases, methods, devices, and systems are suitable for isolating or separating particles or molecules from a fluid composition, including analytes. In specific embodiments, provided herein are methods, devices and systems for isolating or separating a biomolecule from a fluid comprising cells or other particulate material. In some aspects, the methods, devices and systems may allow for rapid separation of particles and molecules in a fluid composition. In other aspects, the methods, devices and systems may allow for rapid isolation of molecules from particles in a fluid composition. In various aspects, the methods, devices and systems may allow for a rapid procedure that requires a minimal amount of material. In some aspects, the methods, devices and systems result in the isolation of molecules from complex fluids such as blood or environmental samples. In various embodiments, the methods, devices, and systems comprise applying the fluid to a device comprising an array of electrodes comprising dielectric materials and being capable of generating electrokinetic forces (e.g., when the array of electrodes are energized with direct current, alternating current, or both). In some embodiments, the methods, devices, and systems comprising electrodes are energized to produce dielectrophoretic fields. In some embodiments, the methods, devices, compositions, and systems described herein are used to predict, diagnose, treat, evaluate, or prevent a disease or condition.

The electrodes described herein are in some embodiments charged with alternating electric current (AC). The electrodes described herein are in some embodiments charged with direct electric current (DC). In some embodiments, an array of electrodes comprising dielectric materials generates an electric field for dielectrophoresis (DEP) applications. The electric field in some instances is non-uniform. In some embodiments, a dielectrophoretic field is a component of AC electrokinetic (ACE) force effects. In various embodiments, the component of AC electrokinetic force effects is AC electroosmosis or AC electrothermal effects. In some embodiments the AC electrokinetic force, including dielectrophoretic fields comprises high-field regions (positive DEP, i.e. areas where there is a strong concentration of electric field lines due to a non-uniform electric field) and/or low-field regions (negative DEP, i.e. areas where there is a weak concentration of electric field lines due to a non-uniform electric field).

In some embodiments, the dielectrophoretic field is a component of DC electrokinetic force effects. In various embodiments, the component of DC electrokinetic force effects is DC electroosmosis or DC electrothermal effects. In some embodiments, both DC and AC electrodes are used in the methods, devices, systems, and compositions described herein. In some embodiments, DC is continuous or pulsed to facilitate electrophoretic movement of analytes or other sample components over the device for separation and/or analysis of analytes. In some embodiments, DC separates analytes such as different molecular weights of nucleic acids independently or in concert with AC electrodes.

Different steps of the methods described herein or aspects of the devices or systems described herein may be utilized to isolate and separate different components, such as intact cells or other particular material; further, different field regions of the applied A/C or D/C electrokinetic force may be used in different steps of the methods or aspects of the devices and systems described herein. This force does not require the particle to be charged. In some instances, the strength of the force depends on the medium and the specific particles' electrical properties, on the particles' shape and size, as well as on the frequency of the electric field. In some instances, fields of a particular frequency selectively manipulate particles. In certain aspects described herein, these processes allow for the separation of cells and/or smaller particles (such as molecules, including nucleic acid molecules) from other components (e.g., in a fluid medium) or each other.

Electrodes Comprising Dielectric Materials

In various embodiments, electrokinetic (such as A/C electrokinetics and D/C electrokinetics) fields are created by selectively energizing an electrode or an array of electrodes comprising dielectric materials as described herein. In some embodiments, the A/C electrokinetic or D/C electrokinetic field is a dielectrophoretic (DEP) field. In some embodiments, the DEP field is an AC dielectrophoretic field. In some embodiments, the DEP field is a DC dielectrophoretic field. In some embodiments A/C electrokinetic or DEP fields are used to isolate analytes, such as analytes and/or biomolecules. Such materials can provide several advantages. Overlaying, embedding, incorporating, manufacturing, etching, layering, or coating electrode structures (e.g., arrays) with one or more layers of dielectric materials in some instances reduces the deleterious electrochemistry effects, including but not limited to electrolysis reactions, heating, and chaotic fluid movement that may occur on or near the electrodes, and still allow the effective separation of cells, bacteria, virus, nanoparticles, DNA, and other biomolecules to be carried out. In some embodiments, the materials layered over the electrode structures are dielectric materials, such as insulators or semi-conductors. In some embodiments, polymers are layered over the electrode structures. In some embodiments, polymers comprise dielectric materials, or particles that comprise dielectric materials. In some embodiments, polymers comprise hydrogels.

Moreover, such dielectric materials can provide unexpected advantages. In some embodiments, the presence of such a layer or coating increases the efficiency of the electrode, reduces the amount of analyte needed for detection, increases the total yield of analyte capture, increases or alters the numbers and types of analytes that can be captured, or optimizes the process for another downstream application, such as analyte detection and analysis. In some applications it is unexpected that an electrode with a dielectric layer can increase the efficiency of analyte capture at all. In certain situations, adding a dielectric layer to an electrode might have been predicted to act like a contaminant that negatively impacted the performance of the electrode.

Among the embodiments described herein are electrodes comprising a dielectric layer containing a layer of a specific thickness, which can provide previously unrecognized benefits (e.g. reduced analyte requirements, higher isolation yields, other benefit) described herein. In some embodiments, the presence of a layer of even or approximately even thickness leads to higher consistency during fabrication and analyte capture, as well as improved efficiency of analyte capture.

Provided herein are devices and compositions comprising dielectric materials. A variety of materials may be used for a dielectric material. In some aspects, the layer comprises elements such as silicon, titanium, germanium, calcium, chromium, cobalt, aluminum, barium, strontium, hafnium, lanthanum, yttrium, tantalum, praseodymium, zirconium, erbium, lead, fluorine, any other element consistent with the specification, or any combination thereof. In various embodiments, the dielectric material layer comprises an oxide, nitride, silicide, carbide, or carbonate of an element. In some embodiments the material layer comprises a nitride or an oxynitride.

The dielectric layer may comprise a low-κ dielectric material. In some embodiments, a low-K dielectric material has a dielectric constant of no more than 3. In some embodiments, a low-κ dielectric material has a dielectric constant of no more than 4. In some embodiments, the dielectric material is doped with carbon. In some embodiments, the dielectric material is carbon doped silicon dioxide. In some embodiments, the dielectric material is diamond-like carbon ("black diamond", or fluorinated diamond-like carbon). In some embodiments, the dielectric material comprises aromatic thermosets. In some embodiments, the dielectric material comprises silsequioxanes, such as hydrogen silsequioxanes or methyl silsequioxanes. In some embodiments, the dielectric material comprises organosilica glasses. In some embodiments, the dielectric material comprises fluorosilicate glasses. In some embodiments, the dielectric material comprises Aurora® LK or Coral® (SiOC).

The dielectric layer may comprise a high-κ dielectric material. In some embodiments, a low-κ dielectric material has a dielectric constant of at least 4. In some embodiments, a low-κ dielectric material has a dielectric constant of at least 10. In some embodiments, a low-κ dielectric material has a dielectric constant of at least 20. In some embodiments, the dielectric material comprises silicon, aluminum, zirconium, hafnium, lanthanum, tantalum, titanium, or any combination thereof. In some embodiments, the dielectric material comprises silicon nitride, aluminum oxide, zirconium silicate, hafnium silicate, zirconium oxide, hafnium oxide, lanthanum oxide, tantalum oxide, titanium oxide, or any combination thereof.

The dielectric layer may comprise a dielectric material such as a polymer. In some embodiments, the polymer is an organic polymer (polyacrylates, polystyrenes, poly-4-vinylphenols, polyvinylidene fluorides, etc.). In some embodiments the dielectric material comprises PTFE (polytetrafluoroethylene), polypropylene, polyethylene, polymethyl methacrylate, polyvinylchloride, polycarbonate, polyvinylidene chloride, nylon, polyacrylonitrile, polyarylene, parylene-N, parylene F, polychloroprene rubber, polystyrene, polyethylene terephthalate, polynorbornenes, polynapthalene, benzocyclobutane, xerogels, or any combination thereof.

Additional exemplary dielectric materials include silicon, silicon oxide, silicon nitride, silicon carbide, silicon dioxide, titanium oxide, germanium, polytetrafluoroethylene, neoprene, polyvinylidene fluoride, silicon dioxide, titanium dioxide, fluorosilicate glass, polyimide, fluorinated polyimide, methylsilsesquioxane, polyarylene ether, polyethylene, polystyrene, aluminum oxide, calcium carbonate or combinations thereof. In some embodiments the layer comprises silicon oxide, wherein silicon oxide is a material having a combination of oxygen and silicon, for example silicon dioxide. In some instances, the layer comprises materials suitable for electrode compositions described herein. In some instances, the layer comprises an oxide, silicide, nitride, or carbide of an element (such as a metal) present in the electrode.

The dielectric material may comprise a ceramic, such as an electroceramic. Various ceramics in some embodiments comprise elements such as titanium, zirconium, barium, calcium, strontium, magnesium, zinc, lanthanum, neodymium, lead, niobium, tantalum, oxides, zirconium, beryllium, tin, indium, yttrium, chromium, cobalt, gadolinium, aluminum, iron, or any combinations thereof. In some embodiments ceramics comprise zirconium barium titanate, strontium titanate, calcium titanate, magnesium titanate, calcium magnesium titanate, zinc titanate, lanthanum titanate, and neodymium titanate, barium zirconate, calcium zirconate, lead magnesium niobate, lead zinc niobate, lithium niobate, barium stannate, calcium stannate, magnesium aluminium silicate, magnesium silicate, barium tantalate, titanium dioxide, niobium oxide, zirconia, silica, sapphire, beryllium oxide, zirconium tin titanate, indium tin oxide, lanthanum-doped strontium titanate, yttrium-doped strontium titanate, yttria-stabilized zirconia, gadolinium-doped strontium titanate, lanthanum strontium gallate magnesite, beta alumina, beta" alumina, lead zirconate titanate, barium titanate, quartz, ferrites, iron oxide, strontium carbonate, lanthanum strontium manganite, or any combination thereof.

Electrodes may further comprise at least one porous layer. Layers comprising dielectric materials are in some embodiments located above or below porous layers. In other embodiments, particles comprising dielectric materials described herein are embedded or added into porous layers. In some embodiments, the one or more porous layers is a polymer layer. In some embodiments, the polymer layer comprises polymethyl methacrylate, nylon 6,6, polyether ether ketone (PEEK), polyether sulfone, polystyrene, polyisoprene, polyethylene terephthalate). In other embodiments, the one or more porous polymer layers is a hydrogel. In some embodiments, the porous layer comprises a dielectric material.

In general, the porous polymer layer should have sufficient mechanical strength and be relatively chemically inert such that it will be able to endure the electrochemical effects at the electrode surface without disconfiguration or decomposition. In general, the porous polymer layer is sufficiently permeable to small aqueous ions, but keeps biomolecules away from the electrode surface.

Layers comprising dielectric materials are in some embodiments located above or below the porous polymer layer. In some embodiments, particles comprising dielectric materials are embedded in the porous polymer layer. For example, porous polymer layer growth occurs in the presence of particles comprising dielectric materials, embedding them in the porous polymer layer. In some embodiments, dielectric materials are embedded in porous polymer layer through formation of a sol-gel. In some embodiments, particles comprising dielectric materials are embedded in the porous polymer layer after synthesis of the porous polymer layer. In other embodiments, a porous polymer layer comprises a copolymer. In some embodiments the copolymer comprises at least one polymer described herein, and a dielectric material. In some embodiments, the copolymer comprises HEMA (hydroxyethylmethacrylate) and a dielectric material. In some embodiments, the copolymer comprises a porous polymer material and polysilicon. In some embodiments, the copolymer comprises HEMA and polysilicon. In some embodiments, the porous polymer material comprises a hydrogel material.

Particles comprising dielectric materials may be embedded in one or more porous polymer layer layers, and may comprise a variety of sizes and compositions. In some cases, such embedded particles improve the performance properties of underlying electrodes for analyte capture or separation. For example, in some embodiments, particles are as small as individual atoms, or larger. In some embodiments, particles comprising dielectric materials are no more than 10, 20, 50, 100, 200, 500, 800, or no more than 1000 angstroms in diameter. In some embodiments, dielectric materials are no more than 10, 20, 50, 100, 200, 500, 800, 1000, 2000, 5000, 8000, or no more than 10,000 nm in diameter. In some embodiments, particles comprising dielectric materials are about 10 to about 50 angstroms, about 30 to about 200 angstroms, about 50 to about 500 angstroms, about 200 to about 1000 angstroms, or about 50 to about 1000 angstroms in diameter. In some embodiments, particles comprising dielectric materials are about 1 nm to about 10,000 nm, about 10 nm to about 10,000 nm, about 50 nm to about 10,000 nm, about 100 to about 10,000 nm, about 200 to about 10,000 nm, about 200 to about 1,000 nm, about 500 to about 10,000 nm, about 1 nm to about 100 nm, about 1 nm to about 200 nm, about 100 to about 500 nm, or about 200 to about 5000 nm in diameter.

A porous polymer layer may comprise single layer, or a plurality of smaller layers, wherein each layer may have different compositions or properties. In some embodiments, the porous polymer layer is a single layer, or coating. In some embodiments, the porous polymer layer comprises a gradient of porosity, wherein the bottom of the porous polymer layer has greater porosity than the top of the porous polymer layer. In some embodiments, the porous polymer layer comprises multiple layers or coatings. In some embodiments, the porous polymer layer comprises two coats. In some embodiments, the porous polymer layer comprises three coats. In some embodiments, the bottom (first) coating has greater porosity than subsequent coatings. In some embodiments, the top coat is has less porosity than the first coating. In some embodiments, the top coat has a mean pore diameter that functions as a size cut-off for particles of greater than 100 picometers in diameter. In some embodiments, the top coat has a mean pore diameter that functions as a size cut-off for particles of greater than 1000 picometers in diameter. In some embodiments, the top coat has a mean pore diameter that functions as a size cut-off for particles of greater than 500 picometers in diameter. In some embodiments, the top coat has a mean pore diameter that functions as a size cut-off for particles of greater than about 10, 20, 50, 80, 100, 200, 500, 800, or greater than about 1000 picometers in diameter. In some embodiments, one or more porous polymer layer layers or coatings further comprise dielectric materials.

The conductivity of a porous polymer layer may influence the performance of an underlying electrode for analyte separation or capture, and desired conductivities are obtained through choice of materials, embedded dielectric materials, synthesis method, or other property that influences conductivity of porous polymer layers. In some embodiments, the porous polymer layer comprises a hydrogel. In some embodiments, the hydrogel has a conductivity from about 0.001 S/m to about 10 S/m. In some embodiments, the hydrogel has a conductivity from about 0.01 S/m to about 10 S/m. In some embodiments, the hydrogel has a conductivity from about 0.1 S/m to about 10 S/m. In some embodiments, the hydrogel has a conductivity from about 1.0 S/m to about 10 S/m. In some embodiments, the hydrogel has a conductivity from about 0.01 S/m to about 5 S/m. In some embodiments, the hydrogel has a conductivity from about 0.01 S/m to about 4 S/m. In some embodiments, the hydrogel has a conductivity from about 0.01 S/m to about 3 S/m. In some embodiments, the hydrogel has a conductivity from about 0.01 S/m to about 2 S/m. In some embodiments, the hydrogel has a conductivity from about 0.1 S/m to about 5 S/m. In some embodiments, the hydrogel has a conductivity from about 0.1 S/m to about 4 S/m. In some embodiments, the hydrogel has a conductivity from about 0.1 S/m to about 3 S/m. In some embodiments, the hydrogel has a conductivity from about 0.1 S/m to about 2 S/m. In some embodiments, the hydrogel has a conductivity from about 0.1 S/m to about 1.5 S/m. In some embodiments, the hydrogel has a conductivity from about 0.1 S/m to about 1.0 S/m. In some embodiments, the hydrogel has a conductivity of about 0.1 S/m. In some embodiments, the hydrogel has a conductivity of about 0.2 S/m. In some embodiments, the hydrogel has a conductivity of about 0.3 S/m. In some embodiments, the hydrogel has a conductivity of about 0.4 S/m. In some embodiments, the hydrogel has a conductivity of about 0.5 S/m. In some embodiments, the hydrogel has a conductivity of about 0.6 S/m. In some embodiments, the hydrogel has a conductivity of about 0.7 S/m. In some embodiments, the hydrogel has a conductivity of about 0.8 S/m. In some embodiments, the hydrogel has a conductivity of about 0.9 S/m. In some embodiments, the hydrogel has a conductivity of about 1.0 S/m.

Porous polymer layer thickness may be controlled during synthesis of the layer, and various thicknesses facilitate electrode performance for analyte separation or capture. In some embodiments, the porous polymer layer comprises a hydrogel. In some embodiments, the hydrogel has a thickness from about 0.01 microns to about 10 microns. In some embodiments, the hydrogel has a thickness from about 0.05 microns to about 10 microns. In some embodiments, the hydrogel has a thickness from about 0.01 microns to about 1 micron. In some embodiments, the hydrogel has a thickness from about 0.01 microns to about 0.5 microns. In some embodiments, the hydrogel has a thickness from about 0.05 microns to about 0.1 microns. In some embodiments, the hydrogel has a thickness from about 0.01 microns to about 5 microns. In some embodiments, the hydrogel has a thickness from about 0.05 microns to about 5 microns. In some embodiments, the hydrogel has a thickness from about 0.1 microns to about 10 microns. In some embodiments, the hydrogel has a thickness from about 0.1 microns to about 5 microns. In some embodiments, the hydrogel has a thickness from about 0.1 microns to about 4 microns. In some embodiments, the hydrogel has a thickness from about 0.1 microns to about 3 microns. In some embodiments, the hydrogel has a thickness from about 0.1 microns to about 2 microns. In some embodiments, the hydrogel has a thickness from about 1 micron to about 5 microns. In some embodiments, the hydrogel has a thickness from about 1 micron to about 4 microns. In some embodiments, the hydrogel has a thickness from about 1 micron to about 3 microns. In some embodiments, the hydrogel has a thickness from about 1 micron to about 2 microns. In some embodiments, the hydrogel has a thickness from about 0.5 microns to about 1 micron.

The choice of porous polymer layer materials and dielectric materials may influence the viscosity of a porous polymer layer solution prior to deposition on electrodes. Different viscosities and thicknesses are also used for different layers in some embodiments. In some embodiments, the porous polymer layer comprises a hydrogel. In some embodiments, the viscosity of a hydrogel solution prior to spin-coating or deposition onto an electrode ranges from about 0.5 cP to about 5 cP. In some embodiments, a single coating of hydrogel solution has a viscosity of between about 0.75 cP and 5 cP prior to spin-coating or deposition onto an electrode. In some embodiments, in a multi-coat hydrogel, the first hydrogel solution has a viscosity from about 0.5 cP to about 1.5 cP prior to spin coating or deposition onto an electrode. In some embodiments, the second hydrogel solution has a viscosity from about 1 cP to about 3 cP. The viscosity of the hydrogel solution is based on the polymers concentration (0.1%40%) and polymers molecular weight (10,000 to 300,000) in the solvent and the starting viscosity of the solvent. In some embodiments, the first hydrogel coating has a thickness between about 0.5 microns and 1 micron. In some embodiments, the first hydrogel coating has a thickness between about 0.5 microns and 0.75 microns. In some embodiments, the first hydrogel coating has a thickness between about 0.75 and 1 micron. In some embodiments, the second hydrogel coating has a thickness between about 0.2 microns and 0.5 microns. In some embodiments, the second hydrogel coating has a thickness between about 0.2 and 0.4 microns. In some embodiments, the second hydrogel coating has a thickness between about 0.2 and 0.3 microns. In some embodiments, the second hydrogel coating has a thickness between about 0.3 and 0.4 microns. In some embodiments, a multi-layer hydrogel comprises one or more layers of dielectric material. In some embodiments, one or more layers of the multi-layer hydrogel comprises dielectric materials. Any number of different hydrogel thicknesses is appropriate, and depend on the type of materials and desired performance characteristics of the hydrogel.

In some embodiments, the porous polymer layer comprises any suitable synthetic polymer forming a porous polymer layer. In general, any sufficiently hydrophilic and polymerizable molecule may be utilized in the production of a synthetic polymer porous polymer layer for use as disclosed herein. In some embodiments, dielectric materials described herein are mixed with the polymerizable molecules during porous polymer layer formation. Polymerizable moieties in the monomers may include alkenyl moieties including but not limited to substituted or unsubstituted α,β, unsaturated carbonyls wherein the double bond is directly attached to a carbon which is double bonded to an oxygen and single bonded to another oxygen, nitrogen, sulfur, halogen, or carbon; vinyl, wherein the double bond is singly bonded to an oxygen, nitrogen, halogen, phosphorus or sulfur; allyl, wherein the double bond is singly bonded to a carbon which is bonded to an oxygen, nitrogen, halogen, phosphorus or sulfur; homoallyl, wherein the double bond is singly bonded to a carbon which is singly bonded to another carbon which is then singly bonded to an oxygen, nitrogen, halogen, phosphorus or sulfur; alkynyl moieties wherein a triple bond exists between two carbon atoms. In some embodiments, acryloyl or acrylamido monomers such as acrylates, methacrylates, acrylamides, methacrylamides, etc., are useful for formation of porous polymer layers as disclosed herein. More preferred acrylamido monomers include acrylamides, N-substituted acrylamides, N-substituted methacrylamides, and methacrylamide. In some embodiments, a porous polymer layer comprises polymers such as epoxide-based polymers, vinyl-based polymers, allyl-based polymers, homoallyl-based polymers, cyclic anhydride-based polymers, ester-based polymers, ether-based polymers, alkylene-glycol based polymers (e.g., polypropylene glycol), and the like. In some embodiments, the porous polymer layer comprises poly (2-hydroxyethylmethacrylate) (pHEMA), cellulose acetate, cellulose acetate phthalate, cellulose acetate butyrate, or any appropriate acrylamide or vinyl-based polymer, or a derivative thereof. Dielectric materials possessing functional groups capable of forming covalent or non-covalent bonds with a polymer are in some embodiments used to construct copolymers. In some embodiments, porous polymer layers comprise metal-organic frameworks.

Porous polymer layers are applied using a variety of techniques known by those skilled in the art. In some embodiments, the porous polymer layer is applied by vapor deposition. In some embodiments, the porous polymer layer is polymerized via atom-transfer radical-polymerization (ATRP). In some embodiments, the porous polymer layer is polymerized via Activators ReGenerated by Electron Transfer-polymerization (ARGET). In some embodiments, the porous polymer layer is polymerized via Initiators for Continuous Activator Regeneration-polymerization (ICAR). In some embodiments, the porous polymer layer is polymerized via Nitroxide-Mediated Radical Polymerization (NMP). In some embodiments, the porous polymer layer is polymerized via Photoinitiated-ATRP. In some embodiments, the porous polymer layer is polymerized via reversible addition-fragmentation chain-transfer (RAFT) polymerization. In some embodiments, any number of porous polymer layer application techniques are modified or adapted to accommodate incorporation of dielectric materials into the porous polymer layer.

In some embodiments, additives are added to the porous polymer layer. In some embodiments, the porous polymer layer comprises a hydrogel. In some embodiments, additives are added to a porous polymer layer to increase conductivity of the porous polymer layer. In some embodiments, the additives comprise dielectric materials. In some embodiments, additives are conductive polymers (e.g., PEDOT:PSS), salts (e.g., copper chloride), metals (e.g., gold), plasticizers (e.g., PEG200, PEG 400, or PEG 600), or co-solvents. In some embodiments, the porous polymer layer also comprises compounds or materials which help maintain the stability of the DNA hybrids, including, but not limited to histidine, histidine peptides, polyhistidine, lysine, lysine peptides, and other cationic compounds or substances.

Figure 2:
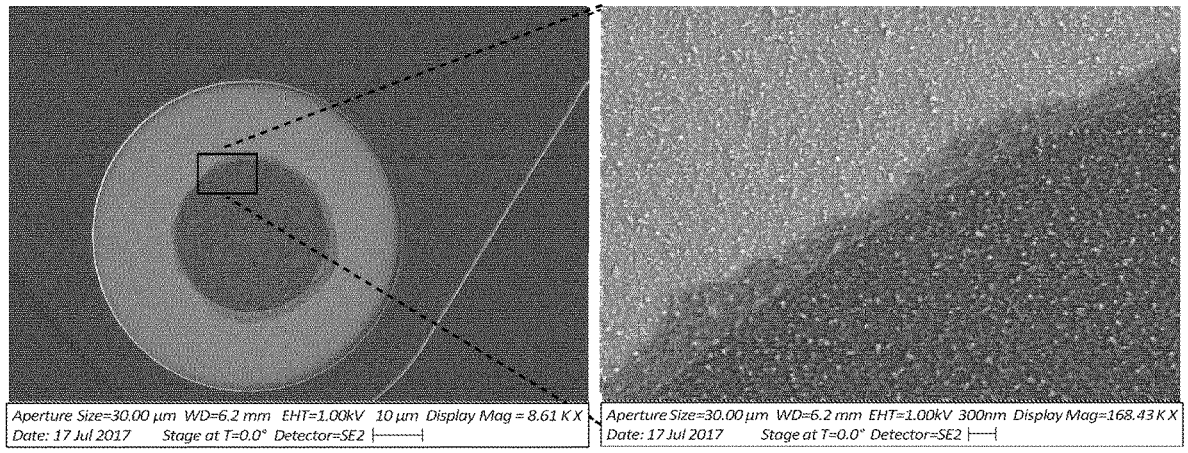
FIG. 2 shows prior art devices where the dielectric material partially covers the metallic electrode.
Figure 3:
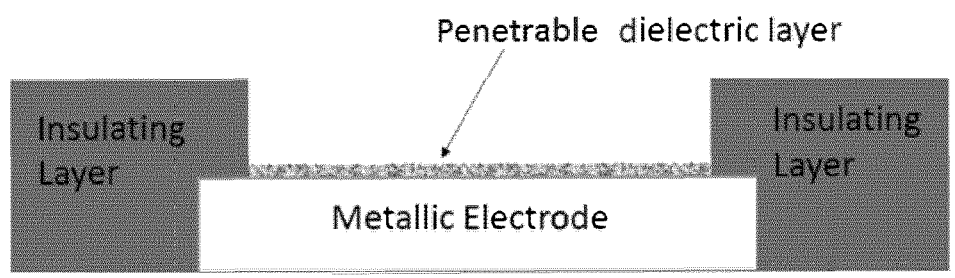
FIG. 3 shows an exemplary illustration of the electrode configuration, with a penetrable dielectric layer over the metallic electrode.
Figure 5:
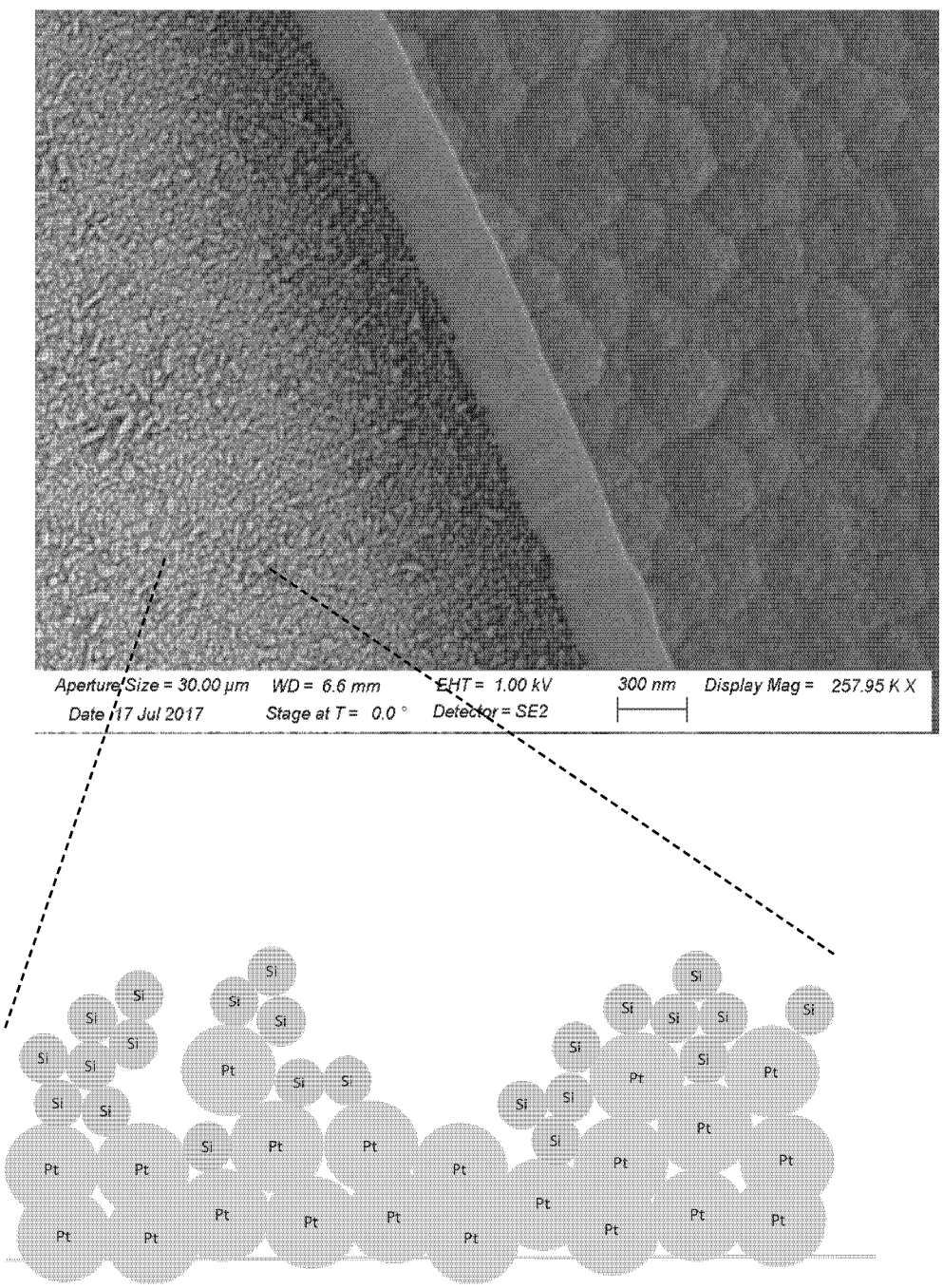
FIG. 5 exemplifies an SEM depiction and atomic level illustration of a dielectric layer on a platinum conductive electrode.

The amount of the electrode surface that is covered by the layer in some cases affects device performance during the isolation of biomolecules. For example, previously reported dielectric coatings on electrodes in some cases only partially covered the electrode surface (FIG. 2). In some instances, the electrode surface comprises the area of the electrode in contact with the sample. In some embodiments, a device described herein is configured such that the electrode is surrounded by an insulating layer (FIG. 3) In some embodiments, the dielectric material covers the electrode, and uniformly contacts the insulating layer (FIG. 5). In some embodiments, the layer covers at least 50%, 75%, 80%, 85% 99%, 99.5, 99.9, 99.99 or more than 99.99% of the electrode surface. In some embodiments the layer is or comprises a dielectric material. In some embodiments, a dielectric material covers at least 50%, 75%, 80%, 85%, 90%, 95%, 99%, 99.5%, 99.9%, 99.99% or more than 99.99% of the electrode surface. In some embodiments, a dielectric material covers about 50% to about 99.99%, about 75% to about 99.9%, about 80% to about 99%, about 85% to about 95%, about 90% to about 99.99%, about 70% to about 90%, about 50% to about 75%, or about 90% to about 99.9% of the electrode surface.

In some embodiments, the layer has an even or approximately even thickness over the surface of the electrode. In some embodiments, the layer evenly or approximately evenly covers the surface of the electrode. In some instances, one or more layers uniformly or approximately uniformly cover the surface of the electrode. In some instances, a mean thickness is defined as the average thickness of one or more layers over an area of the electrode. For example, at least 95% of the surface area of the electrode has a layer thickness that is within 2× of the mean layer thickness. In some instances, at least 95% of the surface area of the electrode has a layer thickness that is within 1.5× of the mean layer thickness. In some instances, at least 97% of the surface area of the electrode has a layer thickness that is within 1.5× of the mean layer thickness. In some instances, at least 90%, 95%, 97%, 98%, 99%, 99.9%, or at least 99.99% of the surface area of the electrode has a layer thickness that is within 1.5× of the mean thickness. In some instances, about 90%, 95%, 97%, 98%, 99%, 99.9%, or about 99.99% of the surface area of the electrode has a layer thickness that is within 1.5× of the mean layer thickness. In some embodiments, the layer is penetrable by an electric field. In some embodiments, the layer is penetrable by a fluid.

The layer may be evenly distributed over the surface of the electrode (uniform thickness), or varied over the surface of the electrode depending on the electrode geometry, materials, or other variable of the device. In some embodiments, the layer thickness is higher than average in the center of the electrode, and lower than average on the edges of the electrode. For example, the layer thickness in the center of the electrode is about 5% higher, about 10%, 20%, 30%, 40%, 50%, 70%, 90%, 100%, 125%, 200%, 500%, or about 1000% higher than the average thickness over the entire electrode. In some embodiments the layer thickness in the center of the electrode is at least 5% higher, about 10%, 20%, 30%, 40%, 50%, 70%, 90%, 100%, 125%, 200%, 500%, or at least 1000% higher than the average thickness over the entire electrode surface. In some embodiments the layer thickness in the center of the electrode is no more than 5% higher, about 10%, 20%, 30%, 40%, 50%, 70%, 90%, 100%, 125%, 200%, 500%, or no more than 1000% higher than the average thickness over the entire electrode surface.

In some embodiments, the electrode structure is overlaid or embedded with multiple layers or coatings. In some embodiments, the electrode structure is overlaid with two layers or three layers. Each layer in some embodiments comprises different materials. Each layer in some embodiments comprises one or more of the same materials. In some embodiments, at least one of the layers is a passivation layer.

The layer may comprise a range of different thicknesses, which can impact the performance of the device in various applications. In some instances, the thickness of the layer is configured to capture specific analytes or specific sizes with particular efficiencies depending on the desired outcome. In some instances, the layer thickness is measured at a single point on the surface. In other instances, the layer thickness is measured by a mean thickness over an area on the surface. In still various embodiments, the thickness is measured as function of a maximum or minimum thickness over a specific area of the electrode. The area measured in some embodiments is a portion of the electrode. In some embodiments, the area measured is the entire surface of the electrode. In some embodiments, the layer has a thickness from about 1 angstrom to about 100 angstroms. In some embodiments, the layer has a thickness from about 5 angstroms to about 75 angstroms. In some embodiments, the layer has a thickness from about 12 angstroms to about 50 angstroms. In some embodiments, the layer has a thickness from about 1 angstrom to about 50 angstroms. In some embodiments, the layer has a thickness from about 10 angstroms to about 30 angstroms. In some embodiments, the layer has a thickness from about 10 angstroms to about 75 angstroms. In some embodiments, the layer has a thickness from about 10 angstroms to about 20 angstroms. In some embodiments, the layer has a thickness from about 5 angstroms to about 10 angstroms. In some embodiments, the layer has a thickness from about 1 angstrom to about 20 angstroms. In some embodiments, the layer has a thickness from about 1 angstrom to about 16 angstroms. In some embodiments, the layer has a thickness of no more than about 1, 2, 5, 10, 12, 14, 15, 16, 17, 18, 19, 20, 25, 30, 35, 40, 45, 50, 60, 70, 80, 90, or no more than about 100 angstroms. In some embodiments, the layer has a thickness of about 1, 2, 5, 10, 12, 14, 15, 16, 17, 18, 19, 20, 25, 30, 35, 40, 50, 60, 70, 80, 90, or about 100 angstroms. In some embodiments, the layer has a thickness of about 16 angstroms. In some embodiments, the layer has a thickness of about 5 angstroms. In some embodiments, the layer has a thickness of about 7 angstroms. In some embodiments, the layer has a thickness of about 9 angstroms. In some embodiments, the layer has a thickness of about 12 angstroms. In some embodiments, the layer has a thickness of about 14 angstroms. In some embodiments, the layer has a thickness of about 18 angstroms. In some embodiments, the layer has a thickness of about 20 angstroms. In some embodiments, the layer has a thickness of about 22 angstroms. In some embodiments, the layer has a thickness of about 24 angstroms. In some embodiments, the layer has a thickness no more than 5 angstroms. In some embodiments, the layer has a thickness no more than 7 angstroms. In some embodiments, the layer has a thickness no more than 9 angstroms. In some embodiments, the layer has a thickness no more than 12 angstroms. In some embodiments, the layer has a thickness no more than 14 angstroms. In some embodiments, the layer has a thickness no more than 18 angstroms. In some embodiments, the layer has a thickness no more than 20 angstroms. In some embodiments, the layer has a thickness no more than 22 angstroms. In some embodiments, the layer has a thickness no more than 24 angstroms. In some embodiments, the layer has a thickness no more than 30 angstroms. In some embodiments, the layer has a thickness no more than 34 angstroms. In some embodiments, the layer has a thickness no more than 38 angstroms. In some embodiments, the layer has a thickness no more than 45 angstroms. In some embodiments, the layer has a thickness no more than 55 angstroms. In some embodiments, the layer has a thickness no more than 60 angstroms. In some embodiments, the layer has a thickness no more than 65 angstroms. In some embodiments, the layer has a thickness no more than 70 angstroms. In some embodiments, the layer has a thickness no more than 75 angstroms. In some embodiments, the layer has a thickness no more than 80 angstroms. In some embodiments, the layer has a thickness no more than 85 angstroms. In some embodiments, the layer has a thickness no more than 90 angstroms. In some embodiments, the layer has a thickness no more than 95 angstroms. In some embodiments, the layer has a thickness no more than 95 angstroms.

In some embodiments, the layer has a thickness of 10 angstroms to 20 angstroms. In some embodiments, the layer has a thickness of at least about 1, 2, 5, 10, 12, 14, 15, 16, 17, 18, 19, 20, 25, 30, 35, 40, 45, 50, 60, 70, 80, 90, or at least about 100 angstroms. In some embodiments, the layer has a thickness of less than 100 angstroms.

In some embodiments, the layer has a thickness from about 100 angstrom to about 10,000 angstroms. In some embodiments, the layer has a thickness from about 500 angstroms to about 7500 angstroms. In some embodiments, the layer has a thickness from about 1000 angstroms to about 5000 angstroms. In some embodiments, the layer has a thickness from about 100 angstrom to about 5000 angstroms. In some embodiments, the layer has a thickness from about 100 angstroms to about 3000 angstroms. In some embodiments, the layer has a thickness from about 100 angstroms to about 7500 angstroms. In some embodiments, the layer has a thickness from about 100 angstroms to about 2000 angstroms. In some embodiments, the layer has a thickness from about 500 angstroms to about 10,000 angstroms. In some embodiments, the layer has a thickness from about 100 angstrom to about 2000 angstroms. In some embodiments, the layer has a thickness from about 100 angstrom to about 1600 angstroms. In some embodiments, the layer has a thickness of no more than about 100, 200, 500, 1000, 1200, 1400, 1500, 1600, 1700, 1800, 1900, 2000, 2500, 3000, 3500, 4000, 4500, 5000, 6000, 7000, 8000, 9000, or no more than about 10,000 angstroms. In some embodiments, the layer has a thickness of at least about 100, 200, 500, 1000, 1200, 1400, 1500, 1600, 1700, 1800, 1900, 2000, 2500, 3000, 3500, 4000, 4500, 5000, 6000, 7000, 8000, 9000, or at least about 10,000 angstroms. In some embodiments, the layer has a thickness of about 100, 200, 500, 1000, 1200, 1400, 1500, 1600, 1700, 1800, 1900, 2000, 2500, 3000, 3500, 4000, 4500, 5000, 6000, 7000, 8000, 9000, or about 10,000 angstroms. In some embodiments, the layer has a thickness of about 1600 angstroms. In some embodiments, the layer has a thickness of 1000 angstroms to 2000 angstroms.

In some embodiments, the total thickness of all layers is no more than 100 angstroms. In some embodiments, the total thickness of all layers is no than 10,000 angstroms. In some embodiments, the total thickness of all layers is about 10 to about 10,0000, about 10 angstroms to about 2000 angstroms, about 10 angstroms to about 500 angstroms, about 15 angstroms to about 100 angstroms, about 25 angstroms to about 250 angstroms, about 50 angstroms to about 5000 angstroms, about 50 angstroms to about 1000 angstroms, about 100 angstroms to about 2000 angstroms, about 100 angstroms to about 5000 angstroms, about 300 angstroms to about 10,000 angstroms, about 500 angstroms to about 5000 angstroms, about 1000 angstroms to about 10,000 angstroms, or about 5000 angstroms to about 10,000 angstroms.

Different dielectric materials may be used to construct the layer, such as insulative or semiconductive materials which can be described by resistivity. In some embodiments, the semiconductive material has a resistivity of at least about $10^{-5}$ Ω·m, $10^{-4}$ Ω·m, $10^{-3}$ Ω·m, $10^{-2}$ Ω·m, $10^{-1}$ Ω·m, 10 Ω·m, $10^2$ Ω·m, $10^3$ Ω·m, $10^4$ Ω·m, $10^5$ Ω·m, or at least about $10^6$ Ω·m. In some embodiments, the semiconductive material has a resistivity of no more than about $10^{-5}$ Ω·m, $10^{-4}$ Ω·m, $10^{-3}$ Ω·m, $10^{-2}$ Ω·m, $10^{-1}$ Ω·m, 10 Ω·m, $10^2$ Ω·m, $10^3$ Ω·m, $10^4$ Ω·m, $10^5$ Ω·m, or no more than about $10^6$ Ω·m. In some embodiments, the semiconductive material has a resistivity of about $10^{-5}$ Ω·m, $10^4$ Ω·m, $10^{-3}$ Ω·m, $10^{-2}$ Ω·m, $10^{-1}$ Ω·m, 10 Ω·m, $10^2$ Ω·m, $10^3$ Ω·m, $10^4$ Ω·m, $10^5$ Ω·m, or about $10^6$ Ω·m. In some embodiments, the semiconductive material has a resistivity of about $10^{-5}$ Ω·m to about $10^6$ Ω·m, about $10^{-5}$ Ω·m to about $10^5$ Ω·m, about $10^{-5}$ Ω·m to about $10^3$ Ω·m, about $10^{-5}$ Ω·m to about 10 Ω·m, about $10^{-3}$ Ω·m to about $10^4$ Ω·m, about $10^{-1}$ Ω·m to about $10^3$ Ω·m, about 10 Ω·m to about $10^6$ Ω·m, or about 10 Ω·m to about $10^4$ Ω·m.

In some embodiments, the insulative material has a resistivity of at least about $10^4$ Ω·m, $10^5$ Ω·m, $10^6$ Ω·m, $10^7$ Ω·m, $10^9$ Ω·m, $10^{12}$ Ω·m, $10^{15}$ Ω·m, $10^{17}$ Ω·m, $10^{20}$ Ω·m, $10^{23}$ Ω·m, or at least about $10^{25}$ Ω·m. In some embodiments, the semiconductive material has a resistivity of no more than about $10^4$ Ω·m, $10^5$ Ω·m, $10^6$ Ω·m, $10^7$ Ω·m, $10^9$ Ω·m, $10^{12}$ Ω·m, $10^{15}$ Ω·m, $10^{17}$ Ω·m, $10^{20}$ Ω·m, $10^{23}$ Ω·m, or no more than about $10^{25}$ Ω·m. In some embodiments, the semiconductive material has a resistivity of about $10^4$ Ω·m, $10^5$ Ω·m, $10^6$ Ω·m, $10^7$ Ω·m, $10^9$ Ω·m, $10^{12}$ Ω·m, $10^{15}$ Ω·m, $10^{17}$ Ω·m, $10^{20}$ Ω·m, $10^{23}$ Ω·m, or about $10^{25}$ Ω·m. In some embodiments, the semiconductive material has a resistivity of about $10^6$ Ω·m to about $10^{25}$ Ω·m, about $10^6$ Ω·m to about $10^{20}$ Ω·m, about $10^6$ Ω·m to about $10^{17}$ Ω·m, about $10^7$ Ω·m to about $10^{20}$ Ω·m, about $10^9$ Ω·m to about $10^{15}$ Ω·m, about $10^{11}$ Ω·m to about $10^{15}$ Ω·m, about $10^{12}$ Ω·m to about $10^{20}$ Ω·m, about $10^{15}$ Ω·m to about $10^{25}$ Ω·m, or about $10^{20}$ Ω·m to about $10^{25}$ Ω·m.

Different materials may be used to construct the layer, such as conductive materials that have a relatively lower resistivity. In some embodiments, the conductive material has a resistivity of about $10^{-8}$ Ω·m to about $10^{-2}$ Ω·m. In some embodiments, the conductive material has a resistivity of about $10^{-8}$ Ω·m to about $10^{-4}$ Ω·m. In some embodiments, the conductive material has a resistivity of about $10^{-8}$ Ω·m to about $10^{-6}$ Ω·m. In some embodiments, the conductive material has a resistivity of about $10^{-5}$ Ω·m to about $10^{-2}$ Ω·m. In some embodiments, the conductive material has a resistivity of about $10^{-8}$ Ω·m, $10^{-7}$ Ω·m, $10^{-6}$ Ω·m, $10^{-5}$ Ω·m, $10^{-4}$ Ω·m, $10^{-3}$ Ω·m, or about $10^{-2}$ Ω·m. In some embodiments, the conductive material has a resistivity of at least $10^{-8}$ Ω·m, $10^{-7}$ Ω·m, $10^{-6}$ Ω·m, $10^{-5}$ Ω·m, $10^{-4}$ Ω·m, $10^{-3}$ Ω·m, or at least $10^{-2}$ Ω·m. In some embodiments, the conductive material has a resistivity of no more than $10^{-8}$ Ω·m, $10^{-7}$ Ω·m, $10^{-6}$ Ω·m, $10^{-5}$ Ω·m, $10^4$ Ω·m, $10^{-3}$ Ω·m, or no more than $10^{-2}$ Ω·m.

In some embodiments, the layer has a relative dielectric (relative permittivity) constant of about 1 to about 2,000. In some embodiments, the layer has a relative dielectric constant of at least about 1. In some embodiments, the layer has a relative dielectric constant of at most about 2,000. In some embodiments, the layer has a relative dielectric constant of about 1 to about 3, about 1 to about 5, about 1 to about 10, about 1 to about 20, about 1 to about 35, about 1 to about 50, about 1 to about 75, about 1 to about 100, about 1 to about 200, about 1 to about 500, about 1 to about 2,000, about 3 to about 5, about 3 to about 10, about 3 to about 20, about 3 to about 35, about 3 to about 50, about 3 to about 75, about 3 to about 100, about 3 to about 200, about 3 to about 500, about 3 to about 2,000, about 5 to about 10, about 5 to about 20, about 5 to about 35, about 5 to about 50, about 5 to about 75, about 5 to about 100, about 5 to about 200, about 5 to about 500, about 5 to about 2,000, about 10 to about 20, about 10 to about 35, about 10 to about 50, about 10 to about 75, about 10 to about 100, about 10 to about 200, about 10 to about 500, about 10 to about 2,000, about 20 to about 35, about 20 to about 50, about 20 to about 75, about 20 to about 100, about 20 to about 200, about 20 to about 500, about 20 to about 2,000, about 35 to about 50, about 35 to about 75, about 35 to about 100, about 35 to about 200, about 35 to about 500, about 35 to about 2,000, about 50 to about 75, about 50 to about 100, about 50 to about 200, about 50 to about 500, about 50 to about 2,000, about 75 to about 100, about 75 to about 200, about 75 to about 500, about 75 to about 2,000, about 100 to about 200, about 100 to about 500, about 100 to about 2,000, about 200 to about 500, about 200 to about 2,000, or about 500 to about 2,000. In some embodiments, the layer has a relative dielectric constant of about 1, about 3, about 5, about 10, about 20, about 35, about 50, about 75, about 100, about 200, about 500, or about 2,000.

In some embodiments, the layer and/or electrode comprise both a conductive and a semi-conductive or insulative material. In some embodiments, the ratio is measured as a mole ratio of the two materials. In some embodiments, the ratio is measured as a mass ratio of the two materials. In some embodiments, the ratio is measured as a volume ratio of the two materials. In some embodiments, the ratio of semi-conductive/conductive material is about 0.01/2 to about 99/1. In some embodiments, the layer has a ratio of semi-conductive to conductive material of at least about 0.01/2, 0.02/2, 0.05/2, 0.1/2, 0.2/2, 0.5/2, 1/2, 2/1, 5/1, 10/1, 20/1, 50/1, or at least about 99/1. In some embodiments, the layer has a ratio of semi-conductive to conductive material of no more than about 0.01/2, 0.02/2, 0.05/2, 0.1/2, 0.2/2, 0.5/2, 1/2, 2/1, 5/1, 10/1, 20/1, 50/1, or no more than 99/1. In some embodiments, the layer has a ratio of semi-conductive to conductive material of about 0.01/2 to about 99/1, 0.02/2 to about 99/1, about 0.01/2 to about 20/1, about 0.05/2 to about 99/1, about 0.01/2 to about 50/1, about 0.1/2 to about 20/1, about 0.1/2 to about 10/1, about 0.5/2 to about 1/1, about 0.02/2 to about 1/2, about 0.02/2 to 0.1/2, about 0.02/2 to about 0.2/2, about 0.02/2 to about 0.5/2, about 0.02/2 to about 2/2, about 0.05/2 to about 0.1/2, about 0.05/2 to about 0.2/2, about 0.05/2 to about 1/2, about 0.05/2 to 2/2, about 0.1/2 to about 0.2/2, about 0.1/2 to about 0.5/2, about 0.1/2 to about 1/2, about 0.2/2 to about 0.5/2, about 0.2/2 to about 1/2, about 1/2 to about 99/1, about 1/2 to about 50/1, about 1/2 to about 20/1, about 1/2 to about 1/1, about 1/2 to about 2/1, or about 0.1/2 to about 0.7/2, or about 0.5/2 to about 1/2. In some embodiments, the layer has a ratio of semi-conductive to conductive material of about 0.01/2, about 0.02/2, about 0.05/2, about 0.1/2, about 0.2/2, about 0.3/2, about 0.5/2, about 1/2, about 1/1, about 2/1, about 5/1, about 10/1, about 20/1, about 50/1, about 75/1, about 99/1. In some embodiments, the layer has a ratio of semi-conductive to conductive material of about 0.3/2. In some embodiments, the layer has a ratio of semi-conductive to conductive material of about 0.15:1.

The coating or layer can reduce the conductivity of a device or electrode described herein. In some embodiments, the presence of the layer results in at least about 0.1%, 0.2%, 0.5%, 1%, 2%, 5%, 10%, 20%, 50%, 75%, 90%, 99%, 99.9% or at least about 99.99% reduction in the conductivity of the device when compared to the device without the layer. In some embodiments, the presence of the layer results in no more than about 0.1%, 0.2%, 0.5%, 1%, 2%, 5%, 10%, 20%, 50%, 75%, 90%, 99%, 99.9% or no more than about 99.9% reduction in the conductivity of the device when compared to the device without the layer. In some embodiments, the presence of the layer results in about 0.1%, 0.2%, 0.5%, 1%, 2%, 5%, 10%, 20%, 50%, 75%, 90%, 99%, 99.9%, or at least 99.9% reduction in the conductivity of the device when compared to the device without the layer. In some embodiments, the presence of the layer results in about a 0.01% to about a 99.99%, about 0.01% to about 90%, about 0.05% to about 99% or about 0.01% to about 50%, about 0.1% to about 25%, about 1% to about 99.99%, about 25% to about 99.9%, about 75% to about 99.9%, about 90% to about 99.99%, about 0.01% to about 0.1% or about 0.01% to about 1% reduction in the conductivity of the device when compared to the device without the layer.

In some embodiments, the layer further comprises a passivation layer. In some embodiments, a passivation layer can be formed from any suitable material known in the art. In some embodiments, the passivation layer comprises silicon nitride. In some embodiments, the passivation layer comprises silicon dioxide. In some embodiments, the passivation layer has a relative electrical permittivity of from about 2.0 to about 8.0. In some embodiments, the passivation layer has a relative electrical permittivity of from about 3.0 to about 8.0, about 4.0 to about 8.0 or about 5.0 to about 8.0. In some embodiments, the passivation layer has a relative electrical permittivity of about 2.0 to about 4.0. In some embodiments, the passivation layer has a relative electrical permittivity of from about 2.0 to about 3.0. In some embodiments, the passivation layer has a relative electrical permittivity of about 2.0, about 2.5, about 3.0, about 3.5 or about 4.0.

In some embodiments, the passivation layer is between about 0.1 microns and about 10 microns in thickness. In some embodiments, the passivation layer is between about 0.5 microns and 8 microns in thickness. In some embodiments, the passivation layer is between about 1.0 micron and 5 microns in thickness. In some embodiments, the passivation layer is between about 1.0 micron and 4 microns in thickness. In some embodiments, the passivation layer is between about 1.0 micron and 3 microns in thickness. In some embodiments, the passivation layer is between about 0.25 microns and 2 microns in thickness. In some embodiments, the passivation layer is between about 0.25 microns and 1 micron in thickness.

In some embodiments, the passivation layer is comprised of any suitable insulative low k dielectric material, including silicon nitride or silicon dioxide. In some embodiments, the passivation layer is chosen from the group consisting of polyamides, carbon, doped silicon nitride, carbon doped silicon dioxide, fluorine doped silicon nitride, fluorine doped silicon dioxide, porous silicon dioxide, or any combinations thereof. In some embodiments, the passivation layer can comprise a dielectric ink capable of being screen-printed.

Further described herein are layers wherein the layer is porous. In some embodiments, the porosity is measured as a ratio of open to total volume in the layer. For example, the porosity is about 1%, 5%, 10%, 20%, 30%, 40%, 50%, 60%, 70%, 80%, or about 90%. In some embodiments, the porosity is at least 1%, 5%, 10%, 20%, 30%, 40%, 50%, 60%, 70%, 80%, or at least 90%. In some embodiments, the porosity is no more than 1%, 5%, 10%, 20%, 30%, 40%, 50%, 60%, 70%, 80%, or no more than 90%. In some embodiments, the porosity is about 1% to about 90%, about 5% to about 75%, about 10% to about 50%, about 20% to about 30%, about 0.5% to about 30%, about 10% to about 30%, about 5% to about 40%, about 15% to about 35% or about 50% to about 99%. In some embodiments, the porosity is about 10% to about 40%. In some embodiments, the porosity is about 15% to about 35%. In some embodiments, the porosity is about 20%. In some embodiments, the porosity is about 30%.

The layers in some instances comprise pores of various sizes. In some instances, pore size is measured as an average pore size. For example, average pore sizes are about 1 nm, 2 nm, 3 nm, 4 nm, 5 nm, 6 nm, 7 nm, 8 nm, 9 nm, or about 10 nm. In some embodiments, average pore sizes are at least 1 nm, 2 nm, 3 nm, 4 nm, 5 nm, 6 nm, 7 nm, 8 nm, 9 nm, or at least 10 nm. In some embodiments, average pore sizes are no more than 1 nm, 2 nm, 3 nm, 4 nm, 5 nm, 6 nm, 7 nm, 8 nm, 9 nm, or no more than 10 nm. In some embodiments, average pore sizes are about 0.1 nm to about 10 nm, about 0.2 nm to about 5 nm, about 0.5 nm to about 7 nm, about 1 nm to about 10 nm, about 2 nm to about 7 nm, about 3 nm to about 5 nm, about 3 nm to about 10 nm, about 5 nm to about 10 nm, about 0.1 nm to about 1 nm, about 1 nm to about 5 nm or about 7 nm to about 10 nm. In some embodiments, the average pore size is about 1 nm to about 10 nm. In some embodiments, the average pore size is about 2 nm to about 5 nm. In some embodiments, the average pore size is about 2 nm to about 5 nm. In some embodiments, the average pore size is about 3 nm to about 4 nm. In some embodiments, the average pore size is about 5 nm to about 6 nm.

Layers described herein can be applied using various methods known in the art such as (by example only) e-beam deposition, electrode sputtering, atomic layer deposition, plasma-enhanced chemical vapor deposition (PECVD), pulsed laser deposition, chemical vapor deposition, or other method consistent with the specification. For example, in some embodiments physical vapor deposition is used to generate a layer. In some instances, techniques for depositing layers variously comprise sputtering deposition. Sputtering deposition is often accomplished by applying energy from a source to a target material, which redeposits particles from the target material onto a substrate material (such as an electrode surface). In some instances, sputtering occurs in a chamber filled with a gas, such as argon. In some embodiments, sputtering deposition comprises strong magnetic fields to control particle deposition. Exemplary energy sources include lasers, ion beams, Kaufman sources, plasma, or other energy source used in the art. In some instances, the source is a plasma. Sputtering deposition methods include but are not limited to ion-beam, reactive, ion-assisted, high-target utilization, high-power impulse magnetron, or gas flow sputtering. In some instances, sputtering deposition devices or materials comprise quartz or aluminum. In some instances, sputtering devices or materials comprise silicon or oxides thereof. In some embodiments, deposition techniques include thermal oxidation, conventional CVD, anodization, electrophoretic deposition, photoresist deposition, spin/spray-on methods (e.g. spin-on deposition), screen printing, roller coating, offset printing, or any combination thereof.

In some embodiments, electrodes comprising dielectric materials are analyzed for structure and composition using surface chemistry analysis methods, such as scanning electron microscopy (SEM) and auger spectroscopy. For example, FIG. 6 exemplifies depth profiles obtained by auger spectroscopy for a dielectric coated metal conductive electrode.

Figure 7:
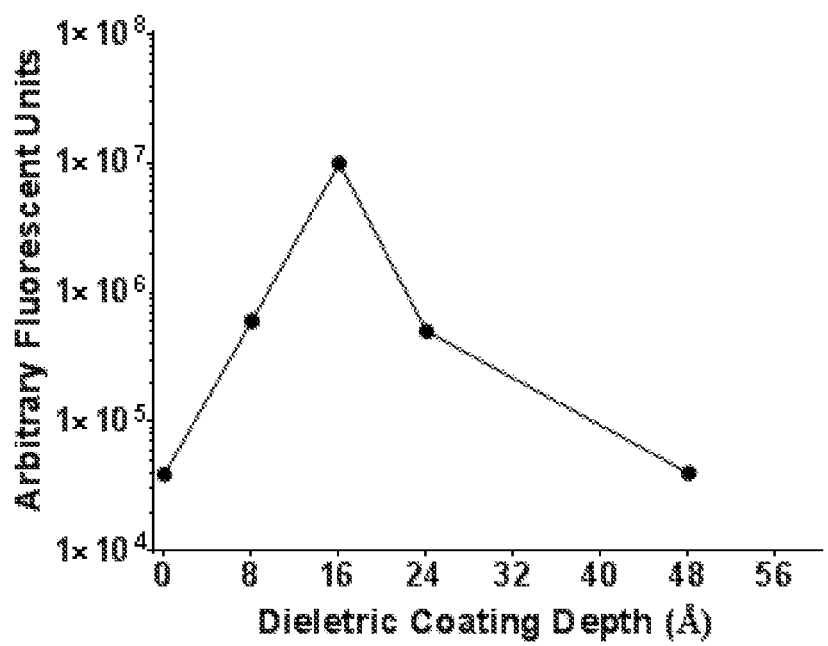
FIG. 7 exemplifies the nucleic acid capture performance (signal measured in fluorescent units from $1 \times 10^4$ to $1 \times 10^8$) using a dielectrophoretic device comprising metallic conductive electrodes coated with various thicknesses (depth) of dielectric layer from 0 angstroms to 48 angstroms.

In some embodiments disclosed herein, the presence of a dielectric layer on the electrodes fabricated into a chip results in an increase in analyte (such as nucleic acid) capture efficiency. For example the presence of the dielectric layer results in an increase of at least 2, 3, 4, 5, 6, 7, 8, 9, 10, 12, 20, 50, 100, 200, 500, 1000, or at least 10,000 fold increase in analyte capture. In some embodiments, the presence of the dielectric layer results in an increase of about 2, 3, 4, 5, 6, 7, 8, 9, 10, 12, 20, 50, 100, 200, 500, 1000 or at least 10,000 fold increase in analyte capture. In some embodiments, the presence of the dielectric layer results in an increase of no more than 2, 3, 4, 5, 6, 7, 8, 9, 10, 12, 20, 50, 100, 200, 500, 1000, or no more than 10,000 fold increase in analyte capture. In some embodiments, the presence of the dielectric layer results in an increase of about 2 fold to about 10,000 fold, about 2 fold to about 1,000 fold, about 5 fold to about 500 fold, about 10 to about 100 fold, about 2 fold to about 50 fold, about 2 fold to about 10 fold, about 500 to about 1,000 fold, about 500 fold to about 5,000 fold, or about 1,000 fold to about 10,000 fold increase in analyte capture. In some embodiments, the presence of the dielectric layer results in an increase of about 500 fold in analyte capture. In some embodiments, increases in analyte capture are measured using detectable analytes, such as analytes labeled with fluorescent tags. In some embodiments, increases in analyte capture as a function of dielectric layer depth are measured by fluorescence, as shown in FIG. 7.

Provided herein are electrodes. In various embodiments, the electrodes are of any suitable size, of any suitable orientation, of any suitable spacing, energized or capable of being energized in any suitable manner, and the like such that suitable DEP and/or other electrokinetic fields are produced.

In some embodiments, electrodes comprise conductive and non-conductive material. In some embodiments, electrodes comprise conductive and semi-conductive material. In some embodiments, electrodes comprise semiconductive and non-conductive material.

In some embodiments, the electrodes disclosed herein can comprise any suitable metal or dielectric material. The electrodes are optionally made of any suitable material resistant to corrosion, including but not limited to metals, such as noble metals (e.g. platinum, platinum iridium alloy, palladium, gold, and the like). In some embodiments, the electrodes comprise: aluminum, copper, carbon, iron, silver, gold, palladium, platinum, iridium, platinum iridium alloy, ruthenium, rhodium, osmium, tantalum, titanium, chromium, cobalt, cobalt chromium alloys, tungsten, polysilicon, and indium tin oxide, or combinations thereof. In some embodiments, the electrodes comprise a conductive polymer, such as polyacetylene or polythiophene. In some embodiments, the electrodes comprise silicide materials such as platinum silicide, titanium silicide, gold silicide, tungsten silicide, or combinations thereof. In some embodiments, the electrodes comprise platinum. In some embodiments, the electrodes can comprise a conductive ink capable of being screen-printed. In some embodiments, the electrodes disclosed herein comprise an oxide, nitride, silicide, carbide, or carbonate of an element. In some embodiments, the element is a metal. On some embodiments, the element is a metalloid. Exemplary oxides include platinum oxide, titanium oxide, zirconium oxide, niobium oxide, tantalum oxide, tungsten oxide, or combinations thereof. Exemplary carbides include platinum carbide, titanium carbide, zirconium carbide, niobium carbide, tantalum carbide, tungsten carbide, or combinations thereof. Exemplary nitrides include platinum nitride, titanium nitride, zirconium nitride, niobium nitride, tantalum nitride, tungsten nitride, or combinations thereof. Additional mixed-metal/element materials known in the art are also suitable for fabricating electrodes.

Electrodes used with the methods, devices, and systems described herein variously comprise any geometrical shape that is suitable for the generation of electrokinetic and/or dielectrophoretic fields. In some embodiments, the conductive material is in the shape of an open disk. In some embodiments, the electrode is configured in a hollow ring shape. In some embodiments, the electrode is configured in a hollow tube shape. In some embodiments, the conductive material is configured as discontinuous, curved lines in an open disk shape. In some embodiments, the conductive material is configured as discontinuous, curved lines in a wavy line shape. In some embodiments, the conductive material is configured as discontinuous, curved lines in a hollow tube shape. In some embodiments, the conductive material is configured as discontinuous, curved lines in a hollow triangular tube. In some embodiments, the conductive material is configured as discontinuous, curved lines in a hollow ring with an extruded center.

Arrays of Electrodes Comprising Dielectric Materials

Also provided herein are devices comprising a plurality of electrodes. The plurality of electrodes are optionally configured in any manner suitable for the separation processes described herein. The plurality of electrodes can be combined to create specific electrokinetic field regions for the separation of specific analytes or for different applications. In various embodiments, electrokinetic (such as DEP) fields are created by selectively energizing an array of electrode as described herein that comprises dielectric materials. In some embodiments, the DEP field is an AC dielectrophoretic field. In some embodiments, the DEP field is an DC dielectrophoretic field. In some embodiments DEP fields are used to isolate analytes, such as analytes and/or biomolecules. In some embodiments, arrays of electrodes generate dielectrophoretic fields. Arrays of electrodes in some embodiments comprise any arrangement, size, spacing, orientation, or other property of an array. In some embodiments, one or more electrodes in an array are layered with a dielectric material. In some embodiments, arrays of electrodes comprise both electrodes configured to be charged with DC and electrodes charged with AC. For example, further description of the system or device including electrodes and/or concentration of cells in DEP fields is found in PCT patent publication WO 2009/146143, which is incorporated herein for such disclosure. In some embodiments, each electrode is individually site-controlled. In some embodiments, an array of electrodes is controlled as a unit.

In some embodiments, the array of electrodes as disclosed herein comprises semi-conductive material. In some embodiments, the semi-conductive material surrounds the conductive material within the electrodes and serves as a physical barrier to the conductive material. In some embodiments, the conductive material within the electrodes fills depressions in the semi-conductive material of the array. In some embodiments, the array of electrodes as disclosed herein is configured in three-dimensions.

In some embodiments, the array of electrodes as disclosed herein comprises non-conductive material. In some embodiments, the non-conductive material surrounds the conductive material within the electrodes and serves as a physical barrier to the conductive material. In some embodiments, the conductive material within the electrodes fills depressions in the non-conductive material of the array. In some embodiments, the array of electrodes as disclosed herein is configured in three-dimensions. In some embodiments the increase in non-conductive material present on or within the electrode results in flow in and around the electrode surface, leading to increases in analyte captured on the surface of the electrode.

In some embodiments modifying the amount of conductive material in the electrode array results in flow in and around the electrode surface, leading to increases in analyte captured on the surface of the electrode. In some embodiments, the array of electrodes as disclosed herein comprises conductive material in only a fraction of the electrode array. In some embodiments, the conductive material is only present in less than about 10% of the electrode array. In some embodiments, the conductive material is only present in about 10% of the electrode array. In various embodiments, the conductive material is only present in about 20% of the electrode array. In still various embodiments, the conductive material is only present in about 30% of the electrode array. In yet various embodiments, the conductive material is only present in about 40% of the electrode array. In still various embodiments, the conductive material is only present in about 50% of the electrode array. In some embodiments, the conductive material is only present in about 60% of the electrode array. In one embodiment, the conductive material is only present in about 70% of the electrode array. In still various embodiments, the conductive material is only present in about 80% of the electrode array. In yet various embodiments, the conductive material is only present in about 90% of the electrode array.

In still various embodiments, the conductive material is only present in about 10%, in about 15%, in about 20%, in about 25%, in about 30%, in about 35%, in about 40%, in about 45%, in about 50%, in about 55%, in about 60%, in about 65%, in about 70%, in about 75%, in about 80%, in about 85% and in about 90% of the electrode array. In yet various embodiments, the conductive material is present in about 10-70% of the electrode array, in about 10-60% of the electrode array, in about 10-50% of the electrode array, in about 10-40% of the electrode or in about 10-30% of the electrode array. In various embodiments, the conductive material is present in about 30-90% of the electrode array, in about 30-80% of the electrode array, in about 30-70% of the electrode array, in about 30-60% of the electrode array or in about 30-50% of the electrode array. In some embodiments, the conductive material is present in about 8-40% of the electrode array.

In yet various embodiments, the conductive material is substantially absent from the center of the individual electrodes in the electrode array. In various embodiments, the conductive material is only present at the edges of the individual electrodes in the electrode array. In still various embodiments, the conductive material is in the shape of an open disk, which comprises conductive material that is discontinuous in the open disk electrode. In some embodiments, the electrode is a hollow ring electrode shape. In some embodiments, the electrode comprises conductive material in the electrode array that is substantially absent from the center of the individual electrodes or is only at the edge of the individual electrodes. Various shapes such as hollow rings or open disks reduce the surface area of the conductive material in an electrode. The reduction in conductive material present on the electrode results in flow in and around the electrode surface, leading to increases in analyte captured on the surface of the electrode.

In some embodiments, a layer of non-conductive material is present in certain areas of the electrode or in the proximal vicinity of the electrode array. In one embodiment, a layer of non-conductive material surrounds the electrode array, creating a physical barrier or wall surrounding the array. In some embodiments, the electrode array is depressed into the array material, creating a well or depression on the array surface wherein electrode material or substantially electrode material is present in the well or depression.

In some embodiments, the electrode configuration is in three-dimensions. In some embodiments, the electrode material is folded into an angle configuration. In various embodiments, the electrode material is formed into a triangular tube. In various embodiments, the electrode material is formed into a hollow triangular tube. In still various embodiments, the three dimensional electrode comprises angles between neighboring planar electrode surfaces of less than about 180 degrees, less than about 170 degrees, less than about 160 degrees, less than about 150 degrees, less than about 140 degrees, less than about 130 degrees, less than about 120 degrees, less than about 110 degrees, less than about 100 degrees, less than about 90 degrees, less than about 80 degrees, less than about 70 degrees, but not less than about 60 degrees. In some embodiments, the conductive material configured into angles between neighboring planar electrode surfaces of equal to or less than 180 degrees. In some embodiments, the three dimensional electrode configuration comprises angles between neighboring planar electrode surfaces of more than about 60 degrees, more than about 70 degrees, more than about 80 degrees, more than about 90 degrees, more than about 100 degrees, more than about 110 degrees, more than about 120 degrees, more than about 130 degrees, more than about 140 degrees, more than about 150 degrees, more than about 160 degrees, more than about 170 degrees, but not more than about 180 degrees. In some embodiments, the conductive material configured into angles between neighboring planar electrode surfaces of equal to or more than 60 degrees. In some embodiments, the conductive material within the electrodes is configured into a depressed concave shape. In yet various embodiments, the electrode configuration is a depressed basket electrode. The three-dimensional structure of the electrode increases the total surface area of the electrode, allowing interrogation of more fluid in a defined unit of time.

In some embodiments, the individual electrodes are about 40 μm to about 100 μm in the largest dimension. In still various embodiments, the individual electrodes are about 40 μm, about 45 μm, about 50 μm, about 55 μm, about 60 μm, about 65 μm, about 70 μm, about 75 μm, about 80 μm, about 85 μm, about 90 μm, about 95 μm or about 100 μm in the largest dimension. In yet various embodiments, the individual electrodes are about 40 μm to about 50 μm, about 40 μm to about 60 μm, about 40 μm to about 1000 μm, about 100 μm to about 500 μm, or about 40 μm to about 70 μm in the largest dimension. In still various embodiments, the individual electrodes are about 100 μm, about 200 μm, about 300 μm, about 400 μm, about 500 μm, about 600 μm, about 700 μm, about 800 μm, about 900 μm, or about 1000 μm in the largest dimension. In some embodiments, the largest dimension of an individual electrode is its diameter.

The plurality of alternating current electrodes are optionally configured in any manner suitable for the separation processes described herein. In various embodiments, the array of electrodes as disclosed herein comprises a pattern of electrode configurations, wherein the configuration comprises a repeating unit of electrode arrays. In some embodiments, the edge to edge distance between a parallel set of repeating units is equidistant, or roughly equidistant. Further description of the system or device including electrodes and/or concentration of cells in applied A/C or D/C electrokinetic fields is found in PCT patent publication WO 2009/146143, which is incorporated herein for such disclosure.

In some embodiments, the electrode material is about 100 nm to about 1000 nm thick. In some embodiments, the electrode material is about 200 nm to about 800 nm thick. In yet various embodiments, the electrode material is about 300 nm to about 500 nm thick. In still various embodiments, the electrode material is about 100 nm, about 150 nm, about 200 nm, about 250 nm, about 300 nm, about 350 nm, about 400 nm, about 450 nm, about 500 nm, about 550 nm, about 600 nm, about 650 nm, about 700 nm, about 750 nm, about 800 nm, about 850 nm, about 900 nm, about 950 nm or about 1000 nm thick.

In some embodiments, an adhesion layer is deposited or printed onto the array as a protective layer prior to deposition of the electrode material. In some instances, the adhesion layer is present above the dielectric layer. In some embodiments, the adhesion layer comprises any suitable material. In one embodiment, the adhesion layer comprises titanium or tungsten. In various embodiments, the adhesion layer is between about 10 to about 50 nm thick. In some embodiments, the adhesion layer is about 20 nm to about 500 nm thick. In some embodiments, the adhesion layer is about 20 nm to about 1000 nm thick. In some embodiments, the adhesion layer is between about 20 to about 200 nm thick. In some embodiments, the adhesion layer is between about 50 to about 150 nm thick. In some embodiments, the adhesion layer is between about 75 to about 125 nm thick. In some embodiments, the adhesion layer is between about 80 to about 120 nm thick. In some embodiments, the adhesion layer is 100 nm thick. In some embodiments, the adhesion layer is between about 20 to about 40 nm thick. In yet various embodiments, the adhesion layer is between about 20 to about 30 nm thick. In still various embodiments, the adhesion layer is about 10 nm, about 20 nm, about 30 nm, about 40 nm or about 50 nm thick.

In some embodiments, the edge to edge (E2E) to diameter ratio of an individual electrode is about 10 μm to about 500 μm. In some embodiments, the E2E of an electrode is about 50 μm to about 300 μm. In yet various embodiments, the E2E of an electrode is about 100 μm to about 200 μm. In still various embodiments, the E2E of an electrode is about 50 μm, about 60 μm, about 70 μm, about 80 μm, about 90 μm, about 100 μm, about 110 μm, about 120 μmm about 130 μm, about 140 μm, about 150 μm, about 160 μm, about 170 μm, about 180 μm, about 190 μm, about 200 μm, about 210 μm, about 220 μm, about 230 μm, about 240 μm, about 250 μm, about 260 μm, about 270 μm, about 280 μm, about 290 μm, about 300 μm, about 310 μm, about 320 μm, about 330 μm, about 340 μm, about 350 μm, about 360 μm, about 370 μm, about 380 μm, about 390 μm, about 400 μm, about 410 μm, about 420 μm, about 430 μm, about 440 μm, about 450 μm, about 460 μm, about 470 μm, about 480 μm, about 490 μm or about 500 μm. In some embodiments, the E2E of an electrode is about 750 μm, about 1000 μm, about 1500 μm, or about 2000 μm. In some embodiments, the edge to edge (E2E) to diameter ratio of an electrode is about 0.5 mm to about 5 mm. In some embodiments, the E2E to diameter ratio is about 1 mm to about 4 mm. In some embodiments, the E2E to diameter ratio is about 1 mm to about 3 mm. In some embodiments, the E2E to diameter ratio is about 1 mm to about 2 mm. In some embodiments, the E2E to diameter ratio is about 2 mm to about 5 mm. In some embodiments, the E2E to diameter ratio is about 1 mm. In some embodiments, the E2E to diameter ratio is about 2 mm. In some embodiments, the E2E to diameter ratio is about 3 mm. In some embodiments, the E2E to diameter ratio is about 4 mm. In some embodiments, the E2E to diameter ratio is about 5 mm. In some embodiments, the electrodes disclosed herein are dry-etched. In some embodiments, the electrodes are wet etched. In some embodiments, the electrodes undergo a combination of dry etching and wet etching.

In some embodiments, the electrodes disclosed herein are dry-etched. In some embodiments, the electrodes are wet etched. In some embodiments, the electrodes undergo a combination of dry etching and wet etching.

In some embodiments, each electrode is individually site-controlled.

In some embodiments, an array of electrodes as disclosed herein is controlled as a unit.

The array can be of any suitable material. In some embodiments, the array comprises plastic or silica. In some embodiments, the array comprises silicon dioxide. In some embodiments, the array comprises aluminum.

In some embodiments, the electrodes are in a dot configuration, e.g. the electrodes comprises a generally circular or round configuration. In some embodiments, the electrodes are configured as disks. In some embodiments, the electrodes are configured as rings. In some embodiments, the angle of orientation between dots is from about 30° to about 90° degrees. In some embodiments, the angle of orientation between dots is from about 25° to about 60°. In some embodiments, the angle of orientation between dots is from about 30° to about 55°. In some embodiments, the angle of orientation between dots is from about 30° to about 50°. In some embodiments, the angle of orientation between dots is from about 35° to about 45°. In some embodiments, the angle of orientation between dots is about 25°. In some embodiments, the angle of orientation between dots is about 30°. In some embodiments, the angle of orientation between dots is about 35°. In some embodiments, the angle of orientation between dots is about 40°. In some embodiments, the angle of orientation between dots is about 45°. In some embodiments, the angle of orientation between dots is about 50°. In some embodiments, the angle of orientation between dots is about 55°. In some embodiments, the angle of orientation between dots is about 60°. In some embodiments, the angle of orientation between dots is about 65°. In some embodiments, the angle of orientation between dots is about 70°. In some embodiments, the angle of orientation between dots is about 75°. In some embodiments, the angle of orientation between dots is about 80°. In some embodiments, the angle of orientation between dots is about 85°. In some embodiments, the angle of orientation between dots is about 90°.

In various embodiments, the electrodes are in a non-circular configuration. In some embodiments, the angle of orientation between non-circular configurations is between about 25 and 90 degrees. In some embodiments, the angle of orientation between non-circular configurations is from about 30° to about 90° degrees. In some embodiments, the angle of orientation between non-circular configurations is from about 25° to about 60°. In some embodiments, the angle of orientation between non-circular configurations is from about 30° to about 55°. In some embodiments, the angle of orientation between non-circular configurations is from about 30° to about 50°. In some embodiments, the angle of orientation between non-circular configurations is from about 35° to about 45°. In some embodiments, the angle of orientation between non-circular configurations is about 25°. In some embodiments, the angle of orientation between non-circular configurations is about 30°. In some embodiments, the angle of orientation between non-circular configurations is about 35°. In some embodiments, the angle of orientation between non-circular configurations is about 40°. In some embodiments, the angle of orientation between non-circular configurations is about 45°. In some embodiments, the angle of orientation between non-circular configurations is about 50°. In some embodiments, the angle of orientation between non-circular configurations is about 55°. In some embodiments, the angle of orientation between non-circular configurations is about 60°. In some embodiments, the angle of orientation between non-circular configurations is about 65°. In some embodiments, the angle of orientation between non-circular configurations is about 70°. In some embodiments, the angle of orientation between non-circular configurations is about 75°. In some embodiments, the angle of orientation between non-circular configurations is about 80°. In some embodiments, the angle of orientation between non-circular configurations is about 85°. In some embodiments, the angle of orientation between non-circular configurations is about 90°.

In some embodiments, the electrodes are in a substantially elongated configuration.

In some embodiments, the electrodes are in a configuration resembling wavy or nonlinear lines. In some embodiments, the array of electrodes is in a wavy or nonlinear line configuration, wherein the configuration comprises a repeating unit comprising the shape of a pair of dots connected by a linker, wherein the dots and linker define the boundaries of the electrode, wherein the linker tapers inward towards or at the midpoint between the pair of dots, wherein the diameters of the dots are the widest points along the length of the repeating unit, wherein the edge to edge distance between a parallel set of repeating units is equidistant, or roughly equidistant. In some embodiments, the electrodes are strips resembling wavy lines. In some embodiments, the edge to edge distance between the electrodes is equidistant, or roughly equidistant throughout the wavy line configuration. In some embodiments, the use of wavy line electrodes, as disclosed herein, lead to an enhanced applied A/C or D/C electrokinetic force gradient.

In some embodiments, the electrodes disclosed herein are in a planar configuration. In some embodiments, the electrodes disclosed herein are in a non-planar configuration.

In some embodiments, the devices disclosed herein surface selectively captures nanoscale biomolecules on its surface. For example, the devices disclosed herein may capture analytes such as nucleic acids, by, for example, a. nucleic acid hybridization; b. antibody—antigen interactions; c. biotin—avidin interactions; d. ionic or electrostatic interactions; or e. any combination thereof. The devices disclosed herein, therefore, may incorporate a functionalized surface which includes capture molecules, such as complementary nucleic acid probes, antibodies or other protein captures capable of capturing biomolecules (such as nucleic acids), biotin or other anchoring captures capable of capturing complementary target molecules such as avidin, capture molecules capable of capturing biomolecules (such as nucleic acids) by ionic or electrostatic interactions, or any combination thereof.

In some embodiments, the surface is functionalized to minimize and/or inhibit nonspecific binding interactions by: a. polymers (e.g., polyethylene glycol PEG); b. ionic or electrostatic interactions; c. surfactants; or d. any combination thereof. In some embodiments, the methods disclosed herein include use of additives which reduce non-specific binding interactions by interfering in such interactions, such as Tween 20 and the like, bovine serum albumin, nonspecific immunoglobulins, etc.

In some embodiments, the device comprises a plurality of microelectrode devices oriented (a) flat side by side, (b) facing vertically, or (c) facing horizontally. In various embodiments, the electrodes are in a sandwiched configuration, e.g. stacked on top of each other in a vertical format.

Electrokinetic Devices, Methods, and Systems

Among the embodiments provided herein are devices comprising electrodes comprising dielectric materials for collecting an analyte from a fluid. In one aspect, described herein are devices for collecting an analyte from a fluid comprising cells or other particulate material. In other aspects, the devices disclosed herein are capable of collecting and/or isolating an analyte (such as nucleic acid) from a fluid comprising cellular or protein material. In other instances, the devices disclosed herein are capable of collecting and/or isolating analytes (such as nucleic acid) from cellular material. In some embodiments, exemplary analytes include nucleic acid, nucleosomes, exosomes, extracellular vesicles, aggregated proteins, cell membrane fragments, mitochondria vesicles, cellular vesicles, any other biological analyte consistent with the specification, or any combination thereof. Nucleic acids, by way of example only, in some embodiments comprise DNA, RNA, circular RNA, cfDNA (cell free DNA), cfRNA (cell free RNA), cffDNA (cell free fetal DNA), mRNA, tRNA, rRNA, miRNA, synthetic polynucleotides, polynucleotide analogues, any other nucleic acid consistent with the specification, or any combinations thereof.

In some embodiments, disclosed herein are devices for isolating a nucleic acid from a fluid comprising cells or other particulate material, the device comprising: a. a housing; b. a heater or thermal source and/or a reservoir comprising a protein degradation agent; and c. a plurality of alternating current (AC) electrodes within the housing, the AC electrodes configured to be selectively energized to establish AC electrokinetic high field and AC electrokinetic low field regions, whereby AC electrokinetic effects provide for concentration of cells in low field regions of the device. In some embodiments, the plurality of electrodes is configured to be selectively energized to establish a dielectrophoretic high field and dielectrophoretic low field regions. In some embodiments, the protein degradation agent is a protease. In some embodiments, the protein degradation agent is Proteinase K. In some embodiments, the device further comprises a second reservoir comprising an eluent.

In some embodiments, disclosed herein are devices comprising: a. a plurality of alternating current (AC) electrodes, the AC electrodes configured to be selectively energized to establish AC electrokinetic high field and AC electrokinetic low field regions; and b. a module capable of thermocycling and performing PCR or other enzymatic reactions. In some embodiments, the plurality of electrodes is configured to be selectively energized to establish a dielectrophoretic high field and dielectrophoretic low field regions. In some embodiments, the device is capable of isolating DNA from a fluid comprising cells and performing PCR amplification or other enzymatic reactions. In some embodiments, DNA is isolated and PCR or other enzymatic reaction is performed in a single chamber. In some embodiments, DNA is isolated and PCR or other enzymatic reaction is performed in multiple regions of a single chamber. In some embodiments, DNA is isolated and PCR or other enzymatic reaction is performed in multiple chambers.

In some embodiments, the device further comprises at least one of an elution tube, a chamber and a reservoir to perform PCR amplification or other enzymatic reaction. In some embodiments, PCR amplification or other enzymatic reaction is performed in a serpentine microchannel comprising a plurality of temperature zones. In some embodiments, PCR amplification or other enzymatic reaction is performed in aqueous droplets entrapped in immiscible fluids (i.e., digital PCR). In some embodiments, the thermocycling comprises convection. In some embodiments, the device comprises a surface contacting or proximal to the electrodes, wherein the surface is functionalized with biological ligands that are capable of selectively capturing biomolecules.

In some embodiments, disclosed herein are systems for isolating a nucleic acid from a fluid comprising cells or other particulate material, the system comprising: a. a device comprising a plurality of alternating current (AC) electrodes, the AC electrodes configured to be selectively energized to establish AC electrokinetic high field and AC electrokinetic low field regions, whereby AC electrokinetic effects provide for concentration of cells in high field regions of the device; and b. a sequencer, thermocycler or other device for performing enzymatic reactions on isolated or collected nucleic acid. In some embodiments, the plurality of electrodes is configured to be selectively energized to establish a dielectrophoretic high field and dielectrophoretic low field regions.

In some embodiments described herein are methods, devices and systems in which the electrodes are placed into separate chambers and positive applied A/C or D/C electrokinetic force regions and negative applied A/C or D/C electrokinetic force regions are created within an inner chamber by passage of the AC DEP field through pore or hole structures. Various geometries are used to form the desired positive applied A/C or D/C electrokinetic force (high field) regions and applied A/C or D/C electrokinetic force negative (low field) regions for carrying cellular, microparticle, nanoparticle, and nucleic acid separations. In some embodiments, pore or hole structures contain (or are filled with) porous material or are covered with porous membrane structures. In some embodiments, by segregating the electrodes into separate chambers, such pore/hole structure applied A/C or D/C electrokinetic force devices reduce electrochemistry effects, heating, or chaotic fluidic movement from occurring in the inner separation chamber during the applied A/C or D/C electrokinetic force process. In some embodiments, dielectric layers on the electrodes results in an increase in biomolecule capture efficiency.

In one aspect, described herein are devices comprising electrodes, wherein the electrodes are placed into separate chambers and applied A/C or D/C electrokinetic fields are created within an inner chamber by passage through pore structures. An exemplary device includes a plurality of electrodes and electrode-containing chambers within a housing. A controller of the device independently controls the electrodes, as described further in PCT patent publication WO 2009/146143 A2, which is incorporated herein for such disclosure.

In some embodiments, chambered devices are created with a variety of pore and/or hole structures (nanoscale, microscale and even macroscale) and contain membranes, gels or filtering materials which control, confine or prevent cells, nanoparticles or other entities from diffusing or being transported into the inner chambers while the AC/DC electric fields, solute molecules, buffer and other small molecules can pass through the chambers.

In various embodiments, a variety of configurations for the devices are possible. For example, a device comprising a larger array of electrodes, for example in a square or rectangular pattern configured to create a repeating non-uniform electric field to enable AC electrokinetics. For illustrative purposes only, a suitable electrode array may include, but is not limited to, a 10×10 electrode configuration, a 50×50 electrode configuration, a 10×100 electrode configuration, 20×100 electrode configuration, or a 20×80 electrode configuration.

Such devices include, but are not limited to, multiplexed electrode and chambered devices, devices that allow reconfigurable electric field patterns to be created, devices that combine DC electrophoretic and fluidic processes; sample preparation devices, sample preparation, enzymatic manipulation of isolated nucleic acid molecules and diagnostic devices that include subsequent detection and analysis, lab-on-chip devices, point-of-care and other clinical diagnostic systems or versions.

In some embodiments, a planar platinum electrode array device comprises a housing through which a sample fluid flows. In some embodiments, fluid flows from an inlet end to an outlet end, optionally comprising a lateral analyte outlet. The exemplary device includes multiple AC electrodes.

In some embodiments, the AC electrokinetic field regions disclosed herein are capable of selectively isolating target particulates, including micron-sized entities, larger particulates and/or smaller particulates. In some embodiments, the AC electrokinetic field regions disclosed herein are capable of selectively isolating target particulates, including micron-sized entities, larger particulates and/or smaller particulates in complex biological or environmental samples. The target particulates are isolated in different field regions at or near the surface of the array, allowing non-target particulates or particulates that are not isolated at or near the surface of the array to be flushed from the array or cartridge.

In some embodiments, an array of electrodes are activated together and AC biased to form a checkerboard field geometry. In some embodiments, the positive DEP regions occur directly over electrodes, and negative low field regions occur between electrodes.

In some embodiments, the planar electrode array device is a 60×20 electrode array that is optionally sectioned into three 20×20 arrays that can be separately controlled but operated simultaneously. The optional auxiliary DC electrodes can be switched on to positive charge, while the optional DC electrodes are switched on to negative charge for electrophoretic purposes. In some instances, each of the controlled AC and DC systems is used in both a continuous and/or pulsed manner (e.g., each can be pulsed on and off at relatively short time intervals) in various embodiments. The optional planar electrode arrays along the sides of the sample flow, when over-layered with nanoporous material, are optionally used to generate DC electrophoretic forces as well as AC DEP. The optional planar electrode arrays along the sides of the sample flow are in some embodiments coated with one or more layers. Additionally, microelectrophoretic separation processes is optionally carried out within the nanopore layers using planar electrodes in the array and/or auxiliary electrodes in the x-y-z dimensions.

In various embodiments these methods, devices and systems are operated in the AC frequency range of from 1,000 Hz to 100 MHz, at voltages which could range from approximately 1 volt to 2000 volts pk-pk; at DC voltages from 1 volt to 1000 volts, at flow rates of from 10 microliters per minute to 10 milliliter per minute, and in temperature ranges from 1° C. to 120° C. In some embodiments, the methods, devices and systems are operated in AC frequency ranges of from about 3 to about 15 kHz. In some embodiments, the methods, devices, and systems are operated at voltages of from 5-25 volts pk-pk. In some embodiments, the methods, devices and systems are operated at voltages of from about 1 to about 50 volts/cm. In some embodiments, the methods, devices and systems are operated at DC voltages of from about 1 to about 5 volts. In some embodiments, the methods, devices and systems are operated at a flow rate of from about 10 microliters to about 500 microliters per minute. In some embodiments, the methods, devices and systems are operated in temperature ranges of from about 20° C. to about 60° C. In some embodiments, the methods, devices and systems are operated in AC frequency ranges of from 1,000 Hz to 10 MHz. In some embodiments, the methods, devices and systems are operated in AC frequency ranges of from 1,000 Hz to 1 MHz. In some embodiments, the methods, devices and systems are operated in AC frequency ranges of from 1,000 Hz to 100 kHz. In some embodiments, the methods, devices and systems are operated in AC frequency ranges of from 1,000 Hz to 10 kHz. In some embodiments, the methods, devices and systems are operated in AC frequency ranges of from 10 kHz to 100 kHz. In some embodiments, the methods, devices and systems are operated in AC frequency ranges of from 100 kHz to 1 MHz. In some embodiments, the methods, devices and systems are operated at voltages from approximately 1 volt to 1500 volts pk-pk. In some embodiments, the methods, devices and systems are operated at voltages from approximately 1 volt to 1500 volts pk-pk. In some embodiments, the methods, devices and systems are operated at voltages from approximately 1 volt to 1000 volts pk-pk. In some embodiments, the methods, devices and systems are operated at voltages from approximately 1 volt to 500 volts pk-pk. In some embodiments, the methods, devices and systems are operated at voltages from approximately 1 volt to 250 volts pk-pk. In some embodiments, the methods, devices and systems are operated at voltages from approximately 1 volt to 100 volts pk-pk. In some embodiments, the methods, devices and systems are operated at voltages from approximately 1 volt to 50 volts pk-pk. In some embodiments, the methods, devices and systems are operated at DC voltages from 1 volt to 1000 volts. In some embodiments, the methods, devices and systems are operated at DC voltages from 1 volt to 500 volts. In some embodiments, the methods, devices and systems are operated at DC voltages from 1 volt to 250 volts. In some embodiments, the methods, devices and systems are operated at DC voltages from 1 volt to 100 volts. In some embodiments, the methods, devices and systems are operated at DC voltages from 1 volt to 50 volts. In some embodiments, the methods, devices, and systems are operated at flow rates of from 10 microliters per minute to 1 ml per minute. In some embodiments, the methods, devices, and systems are operated at flow rates of from 10 microliters per minute to 500 microliters per minute. In some embodiments, the methods, devices, and systems are operated at flow rates of from 10 microliters per minute to 250 microliters per minute. In some embodiments, the methods, devices, and systems are operated at flow rates of from 10 microliters per minute to 100 microliters per minute. In some embodiments, the methods, devices, and systems are operated in temperature ranges from 1° C. to 100° C. In some embodiments, the methods, devices, and systems are operated in temperature ranges from 20° C. to 95° C. In some embodiments, the methods, devices, and systems are operated in temperature ranges from 25° C. to 100° C. In some embodiments, the methods, devices, and systems are operated at room temperature.

In some embodiments, the controller independently controls each of the electrodes. In some embodiments, the controller is externally connected to the device such as by a socket and plug connection or is integrated with the device housing.

Also described herein are scaled sectioned (x-y dimensional) arrays of robust electrodes and strategically placed (x-y-z dimensional) arrangements of auxiliary electrodes that combine DEP, electrophoretic, and fluidic forces, and use thereof. In some embodiments, clinically relevant volumes of blood, serum, plasma, or other samples are more directly analyzed under higher ionic strength and/or conductance conditions. Described herein is the overlaying of robust electrode structures (e.g. platinum, palladium, gold, etc.) with one or more porous layers of materials (natural or synthetic porous materials, membranes, controlled nanopore materials, and penetrable thin dielectric layered materials) to reduce the effects of any electrochemistry (electrolysis) reactions, heating, and chaotic fluid movement that may occur on or near the electrodes, and still allow the effective separation of cells, bacteria, virus, nanoparticles, DNA, and other biomolecules to be carried out. In some embodiments, in addition to using AC frequency cross-over points to achieve higher resolution separations, on-device (on-array) DC microelectrophoresis is used for secondary separations. For example, the separation of DNA particulates (20-50 kb), high molecular weight DNA (5-20 kb), intermediate molecular weight DNA (1-5 kb), and lower molecular weight DNA (0.1-1 kb) fragments may be accomplished through DC microelectrophoresis on the array. In some embodiments, the device is sub-sectioned, optionally for purposes of concurrent separations of different blood cells, bacteria and virus, and DNA carried out simultaneously on such a device. In some embodiments, the device comprises a housing and a heater or thermal source and/or a reservoir comprising a protein degradation agent. In some embodiments, the heater or thermal source is capable of increasing the temperature of the fluid to a desired temperature (e.g., to a temperature suitable for degrading proteins, about 30° C., 40° C., 50° C., 60° C., 70° C., or the like). In some embodiments, the heater or thermal source is suitable for operation as a PCR thermocycler. In various embodiments, the heater or thermal source is used to maintain a constant temperature (isothermal conditions). In some embodiments, the protein degradation agent is a protease. In various embodiments, the protein degradation agent is Proteinase K and the heater or thermal source is used to inactivate the protein degradation agent.

In some embodiments, the device also comprises a plurality of alternating current (AC) electrodes within the housing, the AC electrodes capable of being configured to be selectively energized to establish dielectrophoretic (DEP) high field and dielectrophoretic (DEP) low field regions, whereby AC electrokinetic effects provide for concentration of cells in low field regions of the device. In some embodiments, the electrodes are selectively energized to provide the first AC electrokinetic field region and subsequently or continuously selectively energized to provide the second AC electrokinetic field region. For example, further description of the electrodes and the concentration of cells in applied A/C or D/C electrokinetic fields is found in PCT patent publication WO 2009/146143 A2, which is incorporated herein for such disclosure. In some instances, AC electrokinetic effects provide for concentration of cells in low field regions and/or concentration (or collection or isolation) of molecules (e.g., macromolecules, such as nucleic acid) in high field regions of the applied A/C or D/C electrokinetic field.

In some embodiments, the device comprises a second reservoir comprising an eluent. The eluent is any fluid suitable for eluting the isolated nucleic acid from the device. In some instances the eluent is water or a buffer. In some instances, the eluent comprises reagents required for a DNA sequencing method.

Also provided herein are systems and devices comprising a plurality of direct current (DC) electrodes. In some embodiments, the plurality of DC electrodes comprises at least two rectangular electrodes, spread throughout the array. In some embodiments, the electrodes are located at the edges of the array. In some embodiments, DC electrodes are interspersed between AC electrodes. In some instances, DC electrodes comprise a dielectric material.

In some embodiments, a system or device described herein comprises a means for manipulating nucleic acid. In some embodiments, a system or device described herein includes a means of performing enzymatic reactions. In various embodiments, a system or device described herein includes a means of performing polymerase chain reaction, isothermal amplification, ligation reactions, restriction analysis, nucleic acid cloning, transcription or translation assays, or other enzymatic-based molecular biology assay. In yet various embodiments, a system or device described herein includes a means of performing Quantitative Real Time PCR, including of nuclear or mitochondrial DNA, enzyme-linked immunosorbent assays (ELISA), direct SYBR gold assays, direct PicoGreen assays, loss of heterozygosity (LOH) of microsatellite markers, optionally followed by electrophoresis analysis, including but not limited to capillary electrophoresis analysis, sequencing and/or cloning, including next generation sequencing, methylation analysis, including but not limited to modified semi-nested or nested methylation specific PCR, DNA specific PCR (MSP), quantification of minute amounts of DNA after bisulfitome amplification (qMAMBRA), as well as methylation on beads, mass-based analysis, including but not limited to MALDI-ToF (matrix-assisted laser desorption/ionization time of flight analysis, optionally in combination with PCR, and digital PCR.

In some embodiments, a system or device described herein comprises a nucleic acid sequencer. The sequencer is optionally any suitable DNA sequencing device including but not limited to a Sanger sequencer, pyro-sequencer, ion semiconductor sequencer, polony sequencer, sequencing by ligation device, DNA nanoball sequencing device, sequencing by ligation device, or single molecule sequencing device.

In some embodiments, a system or device described herein is capable of maintaining a constant temperature. In some embodiments, a system or device described herein is capable of cooling the array or chamber. In some embodiments, a system or device described herein is capable of heating the array or chamber. In some embodiments, a system or device described herein comprises a thermocycler. In some embodiments, the devices disclosed herein comprises a localized temperature control element. In some embodiments, the devices disclosed herein are capable of both sensing and controlling temperature.

In some embodiments, the devices further comprise heating or thermal elements. In some embodiments, a heating or thermal element is localized underneath an electrode. In some embodiments, the heating or thermal elements comprise a metal. In some embodiments, the heating or thermal elements comprise tantalum, aluminum, tungsten, or a combination thereof. Generally, the temperature achieved by a heating or thermal element is proportional to the current running through it. In some embodiments, the devices disclosed herein comprise localized cooling elements. In some embodiments, heat resistant elements are placed directly under the exposed electrode array. In some embodiments, the devices disclosed herein are capable of achieving and maintaining a temperature between about 20° C. and about 120° C. In some embodiments, the devices disclosed herein are capable of achieving and maintaining a temperature between about 30° C. and about 100° C. In various embodiments, the devices disclosed herein are capable of achieving and maintaining a temperature between about 20° C. and about 95° C. In some embodiments, the devices disclosed herein are capable of achieving and maintaining a temperature between about ° C. and about 90° C., between about 25° C. and about 85° C., between about 25° C. and about 75° C., between about 25° C. and about 65° C. or between about 25° C. and about 55° C. In some embodiments, the devices disclosed herein are capable of achieving and maintaining a temperature of about 20° C., about 30° C., about 40° C., about 50° C., about 60° C., about 70° C., about 80° C., about 90° C., about 100° C., about 110° C. or about 120° C.

Applied A/C or D/C Electrokinetic Field Regions and Analyte Separations

In some embodiments, the methods, devices and systems described herein provide a mechanism to collect, separate, or isolate cells, particles, and/or molecules (such as nucleic acid) from a fluid material (which optionally contains other materials, such as contaminants, residual cellular material, or the like) based on properties such as size, polarity, or other property. Any number of device, method, or system variables are optimized in some embodiments to provide for separation of specific analytes or isolation from specific samples.

In some embodiments, an electrokinetic field is generated to collect, separate or isolate biomolecules, such as nucleic acids. In some embodiments, an electrokinetic field comprises an AC electrokinetic field. In some embodiments, the AC electrokinetic field is a dielectrophoretic field. Accordingly, in some embodiments dielectrophoresis (DEP) is utilized in various steps of the methods described herein.

In some embodiments, the devices and systems described herein are capable of generating DEP fields, and the like. In specific embodiments, DEP is used to concentrate cells and/or particulates, such as cell-free nucleic acids, exosomes, high mw nucleic acids, including high mw DNA, oligo-nucleosome complexes, nucleosomes, aggregated proteins, vesicle bound DNA, cell membrane fragments and cellular debris (e.g., concurrently or at different times). In certain embodiments, methods described herein further comprise energizing the array of electrodes so as to produce the first, second, and any further optional DEP fields. In some embodiments, the devices and systems described herein are capable of being energized so as to produce the first, second, and any further optional DEP fields. Different DEP fields in some instances allow for the isolation of different analytes with different properties, and optionally at different location on the devices described herein.

In various embodiments provided herein, a method described herein comprises producing a first DEP field region and a second DEP field region with the array. In various embodiments provided herein, a device or system described herein is capable of producing a first DEP field region and a second DEP field region with the array. In some instances, the first and second field regions are part of a single field (e.g., the first and second regions are present at the same time, but are found at different locations within the device and/or upon the array). In some embodiments, the first and second field regions are different fields (e.g. the first region is created by energizing the electrodes at a first time, and the second region is created by energizing the electrodes a second time). In specific aspects, the first DEP field region is suitable for concentrating or isolating cells (e.g., into a low field DEP region). In some embodiments, the second DEP field region is suitable for concentrating smaller particles, such as molecules (e.g., nucleic acid), for example into a high field DEP region. In some instances, a method described herein optionally excludes use of either the first or second DEP field region.

In some embodiments, the first DEP field region is in the same chamber of a device as disclosed herein as the second DEP field region. In some embodiments, the first DEP field region and the second DEP field region occupy the same area of the array of electrodes.

In some embodiments, the first DEP field region is in a separate chamber of a device as disclosed herein, or a separate device entirely, from the second DEP field region.

First DEP Field Region

In some aspects, e.g., high conductance buffers (>100 mS/m), the method described herein comprises applying a fluid comprising cells or other particulate material to a device comprising an array of electrodes, and, thereby, concentrating the cells in a first DEP field region. In some aspects, the devices and systems described herein are capable of applying a fluid comprising cells or other particulate material to the device comprising an array of electrodes, and, thereby, concentrating the cells in a first DEP field region. Subsequent or concurrent second, or optional third and fourth DEP regions, may collect or isolate other fluid components, including analytes, biomolecules, such as particulates, such as cell-free nucleic acids, exosomes, high mw nucleic acids, including high mw DNA, oligo-nucleosome complexes, nucleosomes, aggregated proteins, vesicle bound DNA, cell membrane fragments, cellular debris, or other analyte described herein.

The first DEP field region may be any field region suitable for concentrating cells from a fluid. For this application, the cells are generally concentrated near the array of electrodes. In some embodiments, the first DEP field region is a dielectrophoretic low field region. In some embodiments, the first DEP field region is a dielectrophoretic high field region. In some aspects, e.g. low conductance buffers (<100 mS/m), the method described herein comprises applying a fluid comprising cells to a device comprising an array of electrodes, and, thereby, concentrating the cells or other particulate material in a first DEP field region.

In some aspects, the devices and systems described herein are capable of applying a fluid comprising cells or other particulate material to the device comprising an array of electrodes, and concentrating the cells in a first DEP field region. In various embodiments, the first DEP field region may be any field region suitable for concentrating cells from a fluid. In some embodiments, the cells are concentrated on the array of electrodes. In some embodiments, the cells are captured in a dielectrophoretic high field region. In some embodiments, the cells are captured in a dielectrophoretic low-field region. High versus low field capture is generally dependent on the conductivity of the fluid, wherein generally, the crossover point is between about 300-500 mS/m. In some embodiments, the first DEP field region is a dielectrophoretic low field region performed in fluid conductivity of greater than about 300 mS/m. In some embodiments, the first DEP field region is a dielectrophoretic low field region performed in fluid conductivity of less than about 300 mS/m. In some embodiments, the first DEP field region is a dielectrophoretic high field region performed in fluid conductivity of greater than about 300 mS/m. In some embodiments, the first DEP field region is a dielectrophoretic high field region performed in fluid conductivity of less than about 300 mS/m. In some embodiments, the first DEP field region is a dielectrophoretic low field region performed in fluid conductivity of greater than about 500 mS/m. In some embodiments, the first DEP field region is a dielectrophoretic low field region performed in fluid conductivity of less than about 500 mS/m. In some embodiments, the first DEP field region is a dielectrophoretic high field region performed in fluid conductivity of greater than about 500 mS/m. In some embodiments, the first DEP field region is a dielectrophoretic high field region performed in fluid conductivity of less than about 500 mS/m.

In some embodiments, the first dielectrophoretic field region is produced by an alternating current. The alternating current has any amperage, voltage, frequency, and the like suitable for concentrating cells. In some embodiments, the first dielectrophoretic field region is produced using an alternating current having an amperage of 0.1 micro Amperes 10 Amperes; a voltage of 1-50 Volts peak to peak; and/or a frequency of 1-10,000,000 Hz. In some embodiments, the first DEP field region is produced using an alternating current having a voltage of 5-25 volts peak to peak. In some embodiments, the first DEP field region is produced using an alternating current having a frequency of from 3-15 kHz. In some embodiments, the first DEP field region is produced using an alternating current having an amperage of 1 milli Ampere to 1 Ampere. In some embodiments, the first DEP field region is produced using an alternating current having an amperage of 0.1 micro Amperes 1 Ampere. In some embodiments, the first DEP field region is produced using an alternating current having an amperage of 1 micro Amperes 1 Ampere. In some embodiments, the first DEP field region is produced using an alternating current having an amperage of 100 micro Amperes 1 Ampere. In some embodiments, the first DEP field region is produced using an alternating current having an amperage of 500 micro Amperes 500 milli Amperes. In some embodiments, the first DEP field region is produced using an alternating current having a voltage of 1-25 Volts peak to peak. In some embodiments, the first DEP field region is produced using an alternating current having a voltage of 1-10 Volts peak to peak. In some embodiments, the first DEP field region is produced using an alternating current having a voltage of 25-50 Volts peak to peak. In some embodiments, the first DEP field region is produced using a frequency of from 10-1,000,000 Hz. In some embodiments, the first DEP field region is produced using a frequency of from 100-100,000 Hz. In some embodiments, the first DEP field region is produced using a frequency of from 100-10,000 Hz. In some embodiments, the first DEP field region is produced using a frequency of from 10,000-100,000 Hz. In some embodiments, the first DEP field region is produced using a frequency of from 100,000-1,000,000 Hz.

In some embodiments, the first dielectrophoretic field region is produced by a direct current. The direct current has any amperage, voltage, frequency, and the like suitable for concentrating cells. In some embodiments, the first dielectrophoretic field region is produced using a direct current having an amperage of 0.1 micro Amperes-1 Amperes; a voltage of 10 milli Volts-10 Volts; and/or a pulse width of 1 milliseconds-1000 seconds and a pulse frequency of 0.001-1000 Hz. In some embodiments, the first DEP field region is produced using a direct current having an amperage of 1 micro Amperes-1 Amperes. In some embodiments, the first DEP field region is produced using a direct current having an amperage of 100 micro Amperes-500 milli Amperes. In some embodiments, the first DEP field region is produced using a direct current having an amperage of 1 milli Amperes-1 Amperes. In some embodiments, the first DEP field region is produced using a direct current having an amperage of 1 micro Amperes-1 milli Amperes. In some embodiments, the first DEP field region is produced using a direct current having a pulse width of 500 milliseconds-500 seconds. In some embodiments, the first DEP field region is produced using a direct current having a pulse width of 500 milliseconds-100 seconds. In some embodiments, the first DEP field region is produced using a direct current having a pulse width of 1 second 1000 seconds. In some embodiments, the first DEP field region is produced using a direct current having a pulse width of 500 milliseconds-1 second. In some embodiments, the first DEP field region is produced using a pulse frequency of 0.01-1000 Hz. In some embodiments, the first DEP field region is produced using a pulse frequency of 0.1-100 Hz. In some embodiments, the first DEP field region is produced using a pulse frequency of 1-100 Hz. In some embodiments, the first DEP field region is produced using a pulse frequency of 100-1000 Hz.

In some embodiments, the fluid comprises a mixture of cell types. In some embodiments, a mixture of cell types are separated in different DEP fields. For example, blood comprises red blood cells and white blood cells. Environmental samples comprise many types of cells and other particulate material over a wide range of concentrations. In some embodiments, one cell type (or any number of cell types less than the total number of cell types comprising the sample) is preferentially concentrated in the first DEP field. Without limitation, this embodiment is beneficial for focusing the nucleic acid isolation procedure on a particular environmental contaminant, such as a fecal coliform bacterium, whereby DNA sequencing may be used to identify the source of the contaminant. In another non-limiting example, the first DEP field is operated in a manner that specifically concentrates viruses and not cells (e.g., in a fluid with conductivity of greater than 300 mS/m, viruses concentrate in a DEP high field region, while larger cells will concentrate in a DEP low field region).

In some embodiments, a method, device or system described herein is suitable for isolating or separating specific cell types. In some embodiments, the DEP field of the method, device or system is specifically tuned to allow for the separation or concentration of a specific type of cell into a field region of the DEP field. In some embodiments, a method, device or system described herein provides more than one field region wherein more than one type of cell is isolated or concentrated. In some embodiments, methods, devices, or systems described herein are tunable so as to allow isolation or concentration of different types of cells within the DEP field regions thereof. In some embodiments, methods provided herein further comprise tuning the DEP field. In some embodiments, devices or systems provided herein are capable of having the DEP field tuned. In some instances, such tuning may be in providing a DEP particularly suited for the desired purpose. For example, modifications in the array, the energy, or another parameter are optionally utilized to tune the DEP field. Tuning parameters for finer resolution include electrode diameter, edge to edge distance between electrodes, voltage, frequency, fluid conductivity and presence of a porous polymer layer, and dielectric layer composition.

In some embodiments, the first DEP field region comprises the entirety of an array of electrodes. In some embodiments, the first DEP field region comprises a portion of an array of electrodes. In some embodiments, the first DEP field region comprises about 90%, about 80%, about 70%, about 60%, about 50%, about 40%, about 30%, about 25%, about 20%, or about 10% of an array of electrodes. In some embodiments, the first DEP field region comprises about a third of an array of electrodes.

Second DEP Field Region

In one aspect, the devices and systems described herein are capable of concentrating particulates, such as cell-free nucleic acids, exosomes, high mw nucleic acids, including high mw DNA, oligo-nucleosome complexes, nucleosomes, aggregated proteins, vesicle bound DNA, cell membrane fragments, cellular debris, or other analyte described herein in a second DEP field region. In some embodiments, the second DEP field region is any field region suitable for concentrating particulates. In some embodiments, the particulates are concentrated on the array of electrodes. In yet other aspects, the concentrating of particulates occurs in conjunction with, for example, cell lysis. In still other aspects, the concentrating of In some embodiments, the second DEP field region is a dielectrophoretic high field region. The second DEP field region is, optionally, the same as the first DEP field region.

In some embodiments, the second dielectrophoretic field region is produced by an alternating current. In some embodiments, the alternating current has any amperage, voltage, frequency, and the like suitable for concentrating particulates, such as cell-free nucleic acids, exosomes, high mw nucleic acids, including high mw DNA, oligo-nucleosome complexes, nucleosomes, aggregated proteins, vesicle bound DNA, cell membrane fragments, cellular debris, or other analyte described herein. In some embodiments, the second dielectrophoretic field region is produced using an alternating current having an amperage of 0.1 micro Amperes 10 Amperes; a voltage of 1-50 Volts peak to peak; and/or a frequency of 1-10,000,000 Hz. In some embodiments, the second DEP field region is produced using an alternating current having an amperage of 0.1 micro Amperes 1 Ampere. In some embodiments, the second DEP field region is produced using an alternating current having an amperage of 1 micro Amperes 1 Ampere. In some embodiments, the second DEP field region is produced using an alternating current having an amperage of 100 micro Amperes 1 Ampere. In some embodiments, the second DEP field region is produced using an alternating current having an amperage of 500 micro Amperes 500 milli Amperes. In some embodiments, the second DEP field region is produced using an alternating current having a voltage of 1-25 Volts peak to peak. In some embodiments, the second DEP field region is produced using an alternating current having a voltage of 1-10 Volts peak to peak. In some embodiments, the second DEP field region is produced using an alternating current having a voltage of 25-50 Volts peak to peak. In some embodiments, the second DEP field region is produced using a frequency of from 10-1,000,000 Hz. In some embodiments, the second DEP field region is produced using a frequency of from 100-100,000 Hz. In some embodiments, the second DEP field region is produced using a frequency of from 100-10,000 Hz. In some embodiments, the second DEP field region is produced using a frequency of from 10,000-100,000 Hz. In some embodiments, the second DEP field region is produced using a frequency of from 100,000-1,000,000 Hz.

In some embodiments, the second dielectrophoretic field region is produced by a direct current. In some embodiments, the direct current has any amperage, voltage, frequency, and the like suitable for concentrating particulates. In some embodiments, the second dielectrophoretic field region is produced using a direct current having an amperage of 0.1 micro Amperes 1 Amperes; a voltage of 10 milli Volts 10 Volts; and/or a pulse width of 1 milliseconds 1000 seconds and a pulse frequency of 0.001-1000 Hz. In some embodiments, the second DEP field region is produced using an alternating current having a voltage of 5-25 volts peak to peak. In some embodiments, the second DEP field region is produced using an alternating current having a frequency of from 3-15 kHz. In some embodiments, the second DEP field region is produced using an alternating current having an amperage of 1 milliamp to 1 amp. In some embodiments, the second DEP field region is produced using a direct current having an amperage of 1 micro Amperes-1 Amperes. In some embodiments, the second DEP field region is produced using a direct current having an amperage of 100 micro Amperes-500 milli Amperes. In some embodiments, the second DEP field region is produced using a direct current having an amperage of 1 milli Amperes-1 Amperes. In some embodiments, the second DEP field region is produced using a direct current having an amperage of 1 micro Amperes-1 milli Amperes. In some embodiments, the second DEP field region is produced using a direct current having a pulse width of 500 milliseconds-500 seconds. In some embodiments, the second DEP field region is produced using a direct current having a pulse width of 500 milliseconds-100 seconds. In some embodiments, the second DEP field region is produced using a direct current having a pulse width of 1 second 1000 seconds. In some embodiments, the second DEP field region is produced using a direct current having a pulse width of 500 milliseconds-1 second. In some embodiments, the second DEP field region is produced using a pulse frequency of 0.01-1000 Hz. In some embodiments, the second DEP field region is produced using a pulse frequency of 0.1-100 Hz. In some embodiments, the second DEP field region is produced using a pulse frequency of 1-100 Hz. In some embodiments, the second DEP field region is produced using a pulse frequency of 100-1000 Hz.

In some embodiments, the second DEP field region comprises the entirety of an array of electrodes. In some embodiments, the second DEP field region comprises a portion of an array of electrodes. In some embodiments, the second DEP field region comprises about 90%, about 80%, about 70%, about 60%, about 50%, about 40%, about 30%, about 25%, about 20%, or about 10% of an array of electrodes. In some embodiments, the second DEP field region comprises about a third of an array of electrodes.

Any number of DEP field regions are generated using the devices, methods, and systems described herein for the isolation of particulates from samples. In some instances, at least 1, 2, 3, 4, 5, 6, or more DEP fields regions are generated. In some instances, about 1, 2, 3, 4, 5, 6, or 7 DEP fields regions are generated. The number, location, strength or other property of DEP fields depends on the sample origin/contents, desired analyte to separate, or other variable affecting purification/analysis of analytes.

Samples and Analytes

Depending on the step of the methods described herein, aspects of the devices and systems described herein, and the like, a dielectric particle subjected to electrokinetic fields in various embodiments herein is an analyte (e.g., nanoscale particle, nanoparticulate, or other analyte), such as a biological cell and/or a molecule. In some instances, an analyte is an analyte that is no more than about 1 micron in its largest dimension. In some embodiments, exemplary dielectric particles include nanoscale particles, such as nucleic acid (e.g., high molecular weight nucleic acids, high molecular weight DNA, etc.), nucleosomes, oligo-nucleosome complexes, exosomes, extracellular vesicles, aggregated proteins, vesicle bound DNA, cell membrane fragments, mitochondria vesicles, cellular vesicles, cellular debris, a cell-free biomarker (e.g., circulating), virus particles or viral components (e.g., capsid, viral nucleic acid, surface proteins, or other component of a virus), any other biological molecule consistent with the specification, or any combination thereof. Nucleic acids in some embodiments comprise DNA, RNA, circular RNA, cfDNA (cell free DNA), ccfDNA (circulating cell free DNA), cfRNA (cell free RNA), cffDNA (cell free fetal DNA), mRNA, tRNA, rRNA, miRNA (microRNA), synthetic polynucleotides, polynucleotide analogues, nucleic acids comprising non-canonical bases, nucleic acids of viral origin, any other nucleic acid consistent with the specification, or any combinations thereof. In various embodiments, a (target) circulating cell-free biomarker is chosen from the group consisting of mutations, deletions, rearrangements or methylated nucleic acid of circulating DNA, micro RNA, RNA from microvesicles or a combination thereof. In still various embodiments, the detection of the cell-free biomarker provides information useful for cancer diagnosis, cancer prognosis or treatment response in a patient. In yet various embodiments, the tumor cell-free biomarker is associated with CNS tumors, neuroblastoma, gliomas, breast cancer, endometrial tumors, cervical tumors, ovarian tumors, hepatocellular carcinoma, pancreatic carcinoma, esophageal tumors, Stoch tumors, colorectal tumors, head and neck tumors, nasopharyngeal carcinoma, thyroid tumors, lymphoma, leukemia, lung cancer, non-small cell lung carcinoma, small cell lung carcinoma, testicular tumors, kidney tumors, prostate carcinoma, skin cancer, malignant melanoma, squamous cell carcinoma or a combination thereof. In some embodiments, the tumor cell-free biomarker is GFAP, VEGF, EGFR, b-FGF, KRAS, YKL-40, MMP-9 or combinations thereof. In various embodiments, the target biomarker is chosen from the group consisting of proteins, lipids, antibodies, high molecular weight DNA, tumor cells, exosomes, nucleosomes and nanosomes. In still various embodiments, the bound nucleic acid is eluted from the first chamber for further characterization. In yet various embodiments, the eluted nucleic acid is amplified or sequenced. In still various embodiments, the sample is whole blood, serum, plasma, cerebrospinal fluid, body tissue, urine, saliva, or other biological fluid that comprises biomolecules.

In some embodiments, nucleic acid particulates have a size of 20-50 kb, high molecular weight (mw) nucleic acid has a size of 5-20 kb, intermediate molecular weight nucleic acid has a size of 1-5 kb, and lower molecular weight nucleic acid has a size of 0.1-1 kb.

In some embodiments, an analyte is no more than about 1 µm, or no more than 0.9, 0.8, 0.7, 0.5, 0.3, 0.1, 0.05, 0.001, or no more than 0.0005 µm in its largest dimension. In some instances, an analyte is about 0.0005 µm to about 1 µm, or about 0.0005 µm to about 0.5 µm, or about 0.001 µm to about 1 µm, about 0.005 µm to about 1 µm, or about 0.005 µm to about 0.1 µm, or about 0.01 µm to about 0.5 µm, or about 0.1 µm to about 1 µm.

Analytes are in some instances separated based on their dielectric constants. In some embodiments, an analyte has a dielectric constant of at least 1, or at least 2, 3, 5, 7, 10, 15, 20, 30, or at least 50. In some embodiments, an analyte has a dielectric constant of no more than 1, or no more than 2, 3, 5, 7, 10, 15, 20, 30, or no more than 50. In some embodiments, an analyte has a dielectric constant of about 1, or about 2, 3, 5, 7, 10, 15, 20, 30, or about 50. In some embodiments, an analyte has a dielectric constant of about 1 to about 20, about 1.5 to about 15, about 1.1 to about 10, about 1.5 to about 5, about 3 to about 10, about 5 to about 20, about 2 to about 7, about 4 to about 7 or about 7 to about 15.

Analytes are in some instances separated based on their molecular weight. In some embodiments, an analyte has a molecular weight of at least 100 g/mol, or at least 500 g/mol, 1000 g/mol, 5000 g/mol, 10,000 g/mol, 50,000 g/mol, 100,000 g/mol, 500,000 g/mol, 1,000,000 g/mol, 2,000,000 g/mol, or at least 5,000,000 g/mol. In some embodiments, an analyte has a molecular weight of no more than 100 g/mol, or no more than 500 g/mol, 1000 g/mol, 5000 g/mol, 10,000 g/mol, 50,000 g/mol, 100,000 g/mol, 500,000 g/mol, 1,000, 000 g/mol, 2,000,000 g/mol, or no more than 5,000,000 g/mol. In some instances an analyte has a molecular weight about 100 g/mol to about 5,000,000 g/mol, about 1,000 to about 5,000,000 g/mol, about 2,000 to about 5,000,000 g/mol, about 5,000 to about 2,000,000 g/mol, about 5,000 to about 1,000,000 g/mol, about 10,000 to about 500,000 g/mol, about 50,000 to about 5,000,000 g/mol, about 1,000, 000 to about 5,000,000 g/mol, about 100,000 to about 5,000,000 g/mol, or about 500,000 to about 5,000,000 g/mol.

In some cases, analytes are separated by their mass. In some embodiments, an analyte has a mass of at least 0.01 pg (picogram), or at least 0.1, 0.2, 0.5, 0.8, 1, 2, 5, 8, 10, 12, 15, 18, 20, 50, 100, 200, 500, 1,000, 2,000, 5,000, 10,000, or at least 100,000 pg. In some embodiments, an analyte has a mass of no more than 0.01 pg, or no more than 0.1, 0.2, 0.5, 0.8, 1, 2, 5, 8, 10, 12, 15, 18, 20, 50, 100, 200, 500, 1,000, 2,000, 5,000, 10,000, or no more than 100,000 pg. In some embodiments, an analyte has a mass of about 0.01 pg, or about 0.1, 0.2, 0.5, 0.8, 1, 2, 5, 8, 10, 12, 15, 18, 20, 50, 100, 200, 500, 1,000, 2,000, 5,000, 10,000, or about 100,000 pg. In some embodiments, an analyte has a mass of about 0.01 pg to about 100,000 pg, or about 0.01 to about 10,000 pg, or about 0.01 to about 1,000 pg, or about 0.1 to about 10,000 pg, or about 1 to about 100,000 pg, or about 10 to about 10,000 pg, or about 50 to about 5,000 pg or about 100 to about 1,000 pg, or about 500 to about 50,000 pg, or about 5,000 to about 500,000 pg, or about 100,000 pg to about 1,000,000 pg.

In some embodiments, an analyte has a mass of at least 0.01 fg (femtogram), or at least 0.1, 0.2, 0.5, 0.8, 1, 2, 5, 8, 10, 12, 15, 18, 20, 50, 100, 200, 500, 1,000, 2,000, 5,000, 10,000, or at least 100,000 fg. In some embodiments, an analyte has a mass of no more than 0.01 fg, or no more than 0.1, 0.2, 0.5, 0.8, 1, 2, 5, 8, 10, 12, 15, 18, 20, 50, 100, 200, 500, 1,000, 2,000, 5,000, 10,000, or no more than 100,000 fg. In some embodiments, an analyte has a mass of about 0.01 fg, or about 0.1, 0.2, 0.5, 0.8, 1, 2, 5, 8, 10, 12, 15, 18, 20, 50, 100, 200, 500, 1,000, 2,000, 5,000, 10,000, or about 100,000 fg. In some embodiments, an analyte has a mass of about 0.01 fg to about 100,000 fg, or about 0.01 to about 10,000 fg, or about 0.01 to about 1,000 fg, or about 0.1 to about 10,000 fg, or about 1 to about 100,000 fg, or about 10 to about 10,000 fg, or about 50 to about 5,000 fg or about 100 to about 1,000 fg, or about 500 to about 50,000 fg, or about 5,000 to about 500,000 fg, or about 100,000 fg to about 1,000,000 fg.

Isolating Analytes

Figure 4:
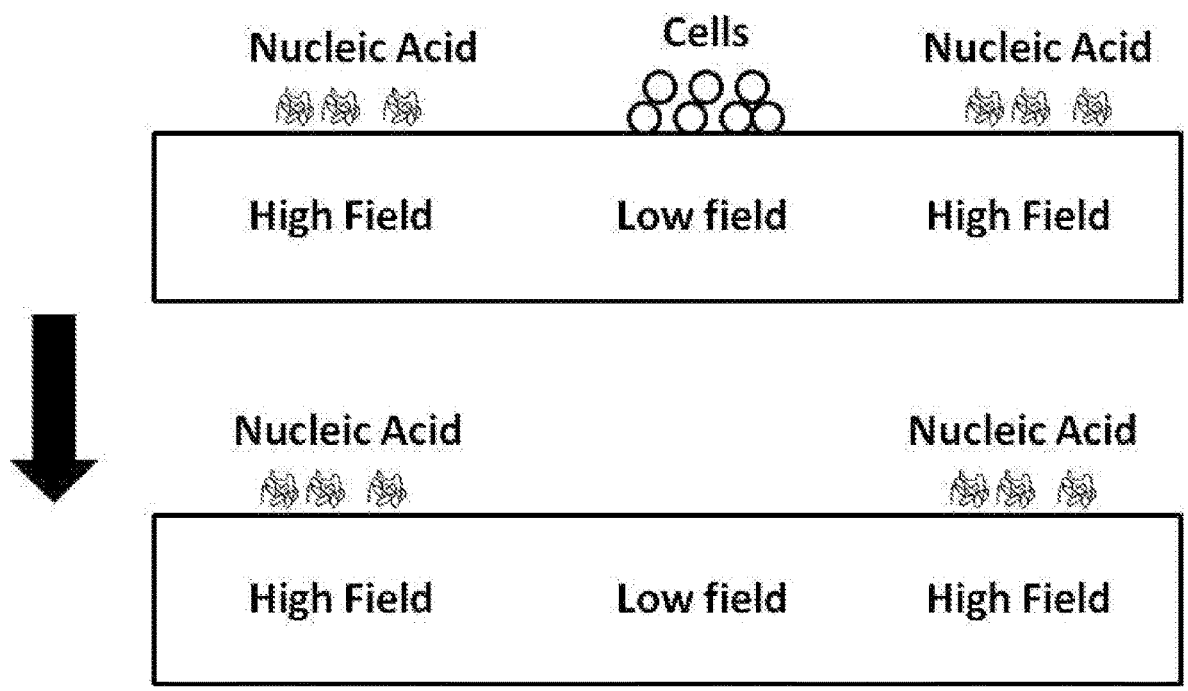
FIG. 4 shows an exemplary method for isolating cell-free nucleic acids from a fluid comprising cells.

In one aspect, described herein are electrokinetic methods for isolating an analyte, in some cases a particulate, such as cell-free nucleic acids, exosomes, high mw nucleic acids, including high mw DNA, oligo-nucleosome complexes, nucleosomes, aggregated proteins, vesicle bound DNA, cell membrane fragments, cellular debris from a fluid comprising cells, or other analyte described herein. In some embodiments, the particulates are initially inside the cells. As seen in FIG. 4, the method comprises concentrating the cells near a high field region in some instances. In some embodiments, disclosed herein are methods for isolating an analyte such as a nucleic acid from a fluid comprising cells, the methods comprising: a. applying the fluid to a device, the device comprising an array of electrodes; b. concentrating a plurality of cells in a first AC electrokinetic (e.g., dielectrophoretic) field region; c. isolating nucleic acid in a second AC electrokinetic (e.g., dielectrophoretic) field region; and d. flushing cells away. In some instances, the cells are lysed in the high field region. Following lysis, the particulates remain in the high field region and/or are concentrated in the high field region. In some instances, residual cellular material is concentrated near the low field region. In some embodiments, the residual material is washed from the device and/or washed from the particulates. In some embodiments, the nucleic acid is concentrated in the second AC electrokinetic field region.

In specific instances, the particles or molecules (e.g., nucleic acid) are isolated (e.g., isolated or separated from cells) in a field region (e.g., a high field region) of the dielectrophoretic field. In some embodiments, the methods, devices, or systems further include one or more of the following steps: concentrating cells of interest in a first dielectrophoretic field region (e.g., a high field DEP region), lysing cells in the first dielectrophoretic field region, and/or concentrating nucleic acid in a first or second dielectrophoretic field region. In various embodiments, the methods, devices, or systems include one or more of the following steps: concentrating cells in a first dielectrophoretic field region (e.g., a low field DEP region), concentrating nucleic acid in a second dielectrophoretic field region (e.g., a high field DEP region), and washing away the cells and residual material. The methods also optionally includes devices and/or systems capable of performing one or more of the following steps: washing or otherwise removing residual (e.g., cellular) material from the analyte such as the nucleic acid (e.g., rinsing the array with water or buffer while the nucleic acid is concentrated and maintained within a high field DEP region of the array), degrading residual proteins (e.g., residual proteins from lysed cells and/or other sources, such degradation occurring according to any suitable mechanism, such as with heat, a protease, or a chemical), flushing degraded proteins from the an analyte, and collecting the analyte. In some embodiments, the result of the methods, operation of the devices, and operation of the systems described herein is an isolated analyte, optionally of suitable quantity and purity for further manipulation or analysis. In some embodiments, the devices described herein are portable. An exemplary device for isolating and/or analyzing analytes is shown in FIG. 1.

The methods, devices, systems, and compositions described herein variously comprise isolation of analytes from samples. In some embodiments, the sample consists of a combination of micron-sized entities or cells, larger particulates and smaller particulates or biomolecules. In some embodiments, the micron-sized entities may comprise blood cells, platelets, bacteria and the like. In some embodiments, larger particulates comprise particulates in the range of about 10 nm to about 900 nm effective stokes diameter, and may comprise exosomes, high mw nucleic acids, including high mw DNA, oligo-nucleosome complexes, aggregated proteins, vesicle bound DNA, cell membrane fragments, cellular debris, or other analyte described herein dispersed in the sample. In some embodiments, smaller particulates (<10 nm effective stokes diameter) comprise proteins such as immunoglobulins, human serum albumin, fibrinogen and other plasma proteins, smaller apoptotic DNA, and free ions. In some instances, samples comprise fluids.

In one aspect, described herein are methods for isolating an analyte (such as a nucleic acid) from a fluid comprising cells or other particulate material. In some embodiments, the analytes are not inside the cells (e.g., cell-free DNA in fluid). In some embodiments, disclosed herein are methods for isolating an analyte from a fluid comprising cells or other particulate material, the methods comprising: a. applying the fluid to a device, the device comprising an array of electrodes; b. concentrating a plurality of cells in a first AC electrokinetic (e.g., dielectrophoretic) field region; c. isolating analyte in a second AC electrokinetic (e.g., dielectrophoretic) field region; and d. flushing cells away. In some embodiments, the methods further comprise degrading residual proteins after flushing cells away. In some embodiments, cells are concentrated on or near a low field region and particulates are concentrated on or near a high field region. In some instances, the cells are washed from the device and/or washed from the particulates.

In one aspect, the methods, systems and devices described herein isolate analytes (such as nucleic acid) from a fluid comprising cells or other particulate material. In one aspect, dielectrophoresis is used to concentrate cells. In some embodiments, the fluid is a liquid, optionally water or an aqueous solution or dispersion. In some embodiments, the fluid is any suitable fluid including a bodily fluid. Exemplary bodily fluids include whole blood, serum, plasma, bile, milk, cerebrospinal fluid, gastric juice, ejaculate, mucus, peritoneal fluid, saliva, sweat, tears, urine, amniotic fluid, aqueous humour, vitreous humour, cerumen, chyle, chime, enolymph, perilymph, feces, lymph, pericardial fluid, pleural fluid, pus, rheum, sebum, sputum, synovial fluid, vomit, and other bodily fluids. In some embodiments, particulates are isolated from bodily fluids using the methods, systems or devices described herein as part of a medical therapeutic or diagnostic procedure, device or system. In some embodiments, the fluid is tissues and/or cells solubilized and/or dispersed in a fluid. For example, the tissue can be a cancerous tumor from which nucleic acid can be isolated using the methods, devices or systems described herein.

In some instances, it is advantageous that the methods described herein are performed in a short amount of time, the devices are operated in a short amount of time, and the systems are operated in a short amount of time. In some embodiments, the period of time is short with reference to the "procedure time" measured from the time between adding the fluid to the device and obtaining isolated nucleic acid. In some embodiments, the procedure time is less than 3 hours, less than 2 hours, less than 1 hour, less than 30 minutes, less than 20 minutes, less than 10 minutes, or less than 5 minutes. In some embodiments, the procedure time is about 1 minute to about 3 hours, about 1 minute to about 1 hour, about 1 minute to about 30 minutes, about 10 minutes to about 1 hour, or about 15 minutes to about 1 hour.

In another aspect, the period of time is short with reference to the "hands-on time" measured as the cumulative amount of time that a person must attend to the procedure from the time between adding the fluid to the device and obtaining isolated nucleic acid. In some embodiments, the hands-on time is less than 20 minutes, less than 10 minutes, less than 5 minute, less than 1 minute, or less than 30 seconds. In some embodiments, the hands-on time is about 1 minute to about 30 minutes, about 1 minute to about 10 minutes, about 1 minute to about 5 minutes, about 2 minutes to about 10 minute, or about 10 minutes to about 30 minutes.

In some embodiments, the fluid is an environmental sample. In some embodiments, the environmental sample is assayed or monitored for the presence of a particular analyte (e.g., nucleic acid sequence, protein, other biomarker) indicative of a certain contamination, infestation incidence or the like. The environmental sample can also be used to determine the source of a certain contamination, infestation incidence or the like using the methods, devices or systems described herein. Exemplary environmental samples include municipal wastewater, industrial wastewater, water or fluid used in or produced as a result of various manufacturing processes, lakes, rivers, oceans, aquifers, ground water, storm water, plants or portions of plants, animals or portions of animals, insects, municipal water supplies, and the like.

In some embodiments, the fluid is a food or beverage. The food or beverage can be assayed or monitored for the presence of a particular analyte (e.g., nucleic acid sequence, protein, other biomarker) indicative of a certain contamination, infestation incidence or the like. The food or beverage can also be used to determine the source of a certain contamination, infestation incidence or the like using the methods, devices or systems described herein. In various embodiments, the methods, devices and systems described herein can be used with one or more of bodily fluids, environmental samples, and foods and beverages to monitor public health or respond to adverse public health incidences.

In some embodiments, the fluid is a growth medium. The growth medium can be any medium suitable for culturing cells, for example lysogeny broth (LB) for culturing *E. coli*, Ham's tissue culture medium for culturing mammalian cells, and the like. The medium can be a rich medium, minimal medium, selective medium, and the like. In some embodiments, the medium comprises or consists essentially of a plurality of clonal cells. In some embodiments, the medium comprises a mixture of at least two species. In some embodiments, the fluid is water.

The cells are any cell suitable for isolating particulates from as described herein. In various embodiments, the cells are eukaryotic or prokaryotic. In various embodiments, the cells consist essentially of a plurality of clonal cells or may comprise at least two species and/or at least two strains.

In various embodiments, the cells are pathogen cells, bacteria cells, plant cells, animal cells, insect cells, algae cells, cyanobacterial cells, organelles and/or combinations thereof. As used herein, "cells" include viruses and other intact pathogenic microorganisms. The cells can be microorganisms or cells from multi-cellular organisms. In some instances, the cells originate from a solubilized tissue sample.

In various embodiments, the cells are wild-type or genetically engineered. In some instances, the cells comprise a library of mutant cells. In some embodiments, the cells are randomly mutagenized such as having undergone chemical mutagenesis, radiation mutagenesis (e.g. UV radiation), or a combination thereof. In some embodiments, the cells have been transformed with a library of mutant nucleic acid molecules.

In some embodiments, the fluid may also comprise other particulate material. Such particulate material may be, for example, inclusion bodies (e.g., ceroids or Mallory bodies), cellular casts (e.g., granular casts, hyaline casts, cellular casts, waxy casts and pseudo casts), Pick's bodies, Lewy bodies, fibrillary tangles, fibril formations, cellular debris and other particulate material. In some embodiments, particulate material is an aggregated protein (e.g., beta-amyloid).

The fluid can have any conductivity including a high or low conductivity. In some embodiments, the conductivity is between about 1 µS/m to about 10 mS/m. In some embodiments, the conductivity is between about 10 µS/m to about 10 mS/m. In various embodiments, the conductivity is between about 50 µSim to about 10 mS/m. In yet various embodiments, the conductivity is between about 100 µSim to about 10 mS/m, between about 100 µSim to about 8 mS/m, between about 100 µS/m to about 6 mS/m, between about 100 µS/m to about 5 mS/m, between about 100 µSim to about 4 mS/m, between about 100 µSim to about 3 mS/m, between about 100 µSim to about 2 mS/m, or between about 100 µSim to about 1 mS/m. In various embodiments, the conductivity is between about 1 mS/m to about 100 mS/m, between about 1 mS/m to about 80 mS/m, between about 5 mS/m to about 60 mS/m, between about 10 mS/m to about 50 mS/m, between about 10 mS/m to about 40 mS/m, between about 1 mS/m to about 30 mS/m, between about 10 mS/m to about 100 mS/m, or between about 50 mS/m to about 100 mS/m.

In some embodiments, the conductivity is about 1 µS/m. In some embodiments, the conductivity is about 10 µS/m. In some embodiments, the conductivity is about 100 µS/m. In some embodiments, the conductivity is about 1 mS/m. In various embodiments, the conductivity is about 2 mS/m. In some embodiments, the conductivity is about 3 mS/m. In yet various embodiments, the conductivity is about 4 mS/m. In some embodiments, the conductivity is about 5 mS/m. In some embodiments, the conductivity is about 10 mS/m. In still various embodiments, the conductivity is about 100 mS/m. In some embodiments, the conductivity is about 1 S/m. In various embodiments, the conductivity is about 10 S/m.

In some embodiments, the conductivity is at least 1 µS/m. In yet various embodiments, the conductivity is at least 10 µS/m. In some embodiments, the conductivity is at least 100 µS/m. In some embodiments, the conductivity is at least 1 mS/m. In additional embodiments, the conductivity is at least 10 mS/m. In yet various embodiments, the conductivity is at least 100 mS/m. In some embodiments, the conductivity is at least 1 S/m. In some embodiments, the conductivity is at least 10 S/m. In some embodiments, the conductivity is at most 1 µS/m. In some embodiments, the conductivity is at most 10 µS/m. In various embodiments, the conductivity is at most 100 µS/m. In some embodiments, the conductivity is at most 1 mS/m. In some embodiments, the conductivity is at most 10 mS/m. In some embodiments, the conductivity is at most 100 mS/m. In yet various embodiments, the conductivity is at most 1 S/m. In some embodiments, the conductivity is at most 10 S/m.

In some embodiments, the conductivity is between about 100 µS/m to about 100 mS/m. In some embodiments, the conductivity is between about 100 µS/m to about 100 mS/m. In various embodiments, the conductivity is between about 500 µS/m to about 100 mS/m. In yet various embodiments, the conductivity is between about 1000 µS/m to about 100 mS/m, between about 1000 µS/m to about 80 mS/m, between about 1000 µS/m to about 60 mS/m, between about 1000 µS/m to about 50 mS/m, between about 1000 µS/m to about 40 mS/m, between about 1000 µS/m to about 30 mS/m, between about 1000 µS/m to about 20 mS/m, or between about 1000 µS/m to about 10 mS/m. In various embodiments, the conductivity is between about 10 mS/m to about 1000 mS/m, between about 10 mS/m to about 800 mS/m, between about 50 mS/m to about 600 mS/m, between about 100 mS/m to about 500 mS/m, between about 100 mS/m to about 400 mS/m, between about 10 mS/m to about 300 mS/m, between about 100 mS/m to about 1000 mS/m, or between about 500 mS/m to about 1000 mS/m.

In some embodiments, the fluid is a small volume of liquid including less than 10 ml. In some embodiments, the fluid is less than 8 ml. In some embodiments, the fluid is less than 5 ml. In some embodiments, the fluid is less than 2 ml. In some embodiments, the fluid is less than 1 ml. In some embodiments, the fluid is less than 500 µl. In some embodiments, the fluid is less than 200 µl. In some embodiments, the fluid is less than 100 µl. In some embodiments, the fluid is less than 50 µl. In some embodiments, the fluid is less than 10 µl. In some embodiments, the fluid is less than 5 µl. In some embodiments, the fluid is less than 1 µl. In preferred embodiments, the fluid is between about 50 µl to about 500 µl.

In some embodiments, the quantity of fluid applied to the device or used in the method comprises less than about 100,000,000 cells. In some embodiments, the fluid comprises less than about 10,000,000 cells. In some embodiments, the fluid comprises less than about 1,000,000 cells. In some embodiments, the fluid comprises less than about 100,000 cells. In some embodiments, the fluid comprises less than about 10,000 cells. In some embodiments, the fluid comprises less than about 1,000 cells.

In some embodiments, isolation of analyte (including nucleic acid) from a fluid comprising cells or other particulate material with the devices, systems and methods described herein takes less than about 30 minutes, less than about 20 minutes, less than about 15 minutes, less than about 10 minutes, less than about 5 minutes or less than about 1 minute. In various embodiments, isolation of analyte from a fluid comprising cells or other particulate material with the devices, systems and methods described herein takes not more than 30 minutes, not more than about 20 minutes, not more than about 15 minutes, not more than about 10 minutes, not more than about 5 minutes, not more than about 2 minutes or not more than about 1 minute. In additional embodiments, isolation of analyte from a fluid comprising cells or other particulate material with the devices, systems and methods described herein takes less than about 15 minutes, preferably less than about 10 minutes or less than about 5 minutes.

In some instances, extra-cellular analytes such as DNA or other nucleic acid (outside cells) is isolated from a fluid comprising cells of other particulate material. In some embodiments, the fluid comprises cells. In some embodiments, the fluid does not comprise cells. In some embodiments, the cells comprise eukaryotic cells. In some embodiments, the cells comprise prokaryotic cells. In some instances, the cells comprises viruses.

Cell Lysis

In one aspect, following concentrating the cells in a first electrokinetic field region, the method involves freeing particulates from the cells. In another aspect, the devices and systems described herein are capable of freeing particulates from the cells. In some embodiments, the particulates are freed from the cells in the first DEP field region.

In some embodiments, the methods described herein free particulates from a plurality of cells by lysing the cells. In some embodiments, the devices and systems described herein are capable of freeing particulates from a plurality of cells by lysing the cells. One method of cell lysis involves applying a direct current to the cells after isolation of the cells on the array. The direct current has any suitable amperage, voltage, and the like suitable for lysing cells. In some embodiments, the current has a voltage of about 1 Volt to about 500 Volts. In some embodiments, the current has a voltage of about 10 Volts to about 500 Volts. In various embodiments, the current has a voltage of about 10 Volts to about 250 Volts. In still various embodiments, the current has a voltage of about 50 Volts to about 150 Volts. Voltage is generally the driver of cell lysis, as high electric fields result in failed membrane integrity. In some embodiments, the direct current used for lysis comprises one or more pulses having any duration, frequency, and the like suitable for lysing cells. In some embodiments, a voltage of about 100 volts is applied for about 1 millisecond to lyse cells. In some embodiments, the voltage of about 100 volts is applied 2 or 3 times over the source of a second.

In some embodiments, the frequency of the direct current depends on volts/cm, pulse width, and the fluid conductivity. In some embodiments, the pulse has a frequency of about 0.001 to about 1000 Hz. In some embodiments, the pulse has a frequency from about 10 to about 200 Hz. In various embodiments, the pulse has a frequency of about 0.01 Hz 1000 Hz. In still various embodiments, the pulse has a frequency of about 0.1 Hz 1000 Hz, about 1 Hz 1000 Hz, about 1 Hz 500 Hz, about 1 Hz 400 Hz, about 1 Hz 300 Hz, or about 1 Hz about 250 Hz. In some embodiments, the pulse has a frequency of about 0.1 Hz. In various embodiments, the pulse has a frequency of about 1 Hz. In still various embodiments, the pulse has a frequency of about 5 Hz, about 10 Hz, about 50 Hz, about 100 Hz, about 200 Hz, about 300 Hz, about 400 Hz, about 500 Hz, about 600 Hz, about 700 Hz, about 800 Hz, about 900 Hz or about 1000 Hz.

In various embodiments, the pulse has a duration of about 1 millisecond (ms) 1000 seconds (s). In some embodiments, the pulse has a duration of about 10 ms 1000 s. In still various embodiments, the pulse has a duration of about 100 ms 1000 s, about 1 s 1000 s, about 1 s 500 s, about 1 s 250 s or about 1 s 150 s. In some embodiments, the pulse has a duration of about 1 ms, about 10 ms, about 100 ms, about 1 s, about 2 s, about 3 s, about 4 s, about 5 s, about 6 s, about 7 s, about 8 s, about 9 s, about 10 s, about 20 s, about 50 s, about 100 s, about 200 s, about 300 s, about 500 s or about 1000 s. In some embodiments, the pulse has a frequency of 0.2 to 200 Hz with duty cycles from 10-50%.

In some embodiments, the direct current is applied once, or as multiple pulses. Any suitable number of pulses may be applied including about 1-20 pulses. There is any suitable amount of time between pulses including about 1 millisecond 1000 seconds. In some embodiments, the pulse duration is 0.01 to 10 seconds.

In some embodiments, the cells are lysed using other methods in combination with a direct current applied to the isolated cells. In yet various embodiments, the cells are lysed without use of direct current. In various aspects, the devices and systems are capable of lysing cells with direct current in combination with other means, or may be capable of lysing cells without the use of direct current. Any method of cell lysis known to those skilled in the art may be suitable including, but not limited to application of a chemical lysing agent (e.g., an acid), an enzymatic lysing agent, heat, pressure, shear force, sonic energy, osmotic shock, or combinations thereof. Lysozyme is an example of an enzymatic-lysing agent.

Removal of Residual Material

In some embodiments, following concentration of the particulates in the second electrokinetic field region, the method includes optionally flushing residual material from an analyte, such as a nucleic acid. In some embodiments, the devices or systems described herein are capable of optionally and/or comprising a reservoir comprising a fluid suitable for flushing residual material from the analyte. In some embodiments, the analyte is held near the array of electrodes, such as in the second A/C or D/C electrokinetic field (such as a DEP field) region, by continuing to energize the electrodes. "Residual material" is anything originally present in the fluid, originally present in the cells, added during the procedure, created through any step of the process including but not limited to lysis of the cells (i.e. residual cellular material), and the like. For example, residual material includes non-lysed cells, cell wall fragments, proteins, lipids, carbohydrates, minerals, salts, buffers, plasma, and undesired nucleic acids. In some embodiments, the lysed cellular material comprises residual protein freed from the plurality of cells upon lysis. It is possible that not all of the analyte will be concentrated in the second DEP field. In some embodiments, a certain amount of analyte is flushed with the residual material.

In some embodiments, the residual material is flushed in any suitable fluid, for example in water, TBE buffer, or the like. In some embodiments, the residual material is flushed with any suitable volume of fluid, flushed for any suitable period of time, flushed with more than one fluid, or any other variation. In some embodiments, the method of flushing residual material is related to the desired level of isolation of the analyte (such as nucleic acid), with higher purity nucleic acid requiring more stringent flushing and/or washing. In various embodiments, the method of flushing residual material is related to the particular starting material and its composition. In some instances, a starting material that is high in lipid requires a flushing procedure that involves a hydrophobic fluid suitable for solubilizing lipids.

In some embodiments, the method includes degrading residual material including residual protein. In some embodiments, the devices or systems are capable of degrading residual material including residual protein. For example, proteins are degraded by one or more of chemical degradation (e.g. acid hydrolysis) and enzymatic degradation. In some embodiments, the enzymatic degradation agent is a protease. In various embodiments, the protein degradation agent is Proteinase K. The optional step of degradation of residual material is performed for any suitable time, temperature, and the like. In some embodiments, the degraded residual material (including degraded proteins) is flushed from the analyte (including nucleic acid).

In some embodiments, the agent used to degrade the residual material is inactivated or degraded. In some embodiments, the devices or systems are capable of degrading or inactivating the agent used to degrade the residual material. In some embodiments, an enzyme used to degrade the residual material is inactivated by heat (e.g., 50 to 95° C. for 5-15 minutes). For example, enzymes including proteases, (for example, Proteinase K) are degraded and/or inactivated using heat (typically, 15 minutes, 70° C.). In some embodiments wherein the residual proteins are degraded by an enzyme, the method further comprises inactivating the degrading enzyme (e.g., Proteinase K) following degradation of the proteins. In some embodiments, heat is provided by a heating module in the device (temperature range, e.g., from 30 to 95° C.).

The order and/or combination of certain steps of the method can be varied. In some embodiments, the devices or methods are capable of performing certain steps in any order or combination. For example, in some embodiments, the residual material and the degraded proteins are flushed in separate or concurrent steps. That is, the residual material is flushed, followed by degradation of residual proteins, followed by flushing degraded proteins from the analyte. In some embodiments, one first degrades the residual proteins, and then flush both the residual material and degraded proteins from the analyte in a combined step.

In some embodiments, the nucleic acid are retained in the device and optionally used in further procedures such as PCR or other procedures manipulating or amplifying nucleic acid. In some embodiments, the devices and systems are capable of performing PCR or other optional procedures. In various embodiments, the particulates are collected and/or eluted from the device. In some embodiments, the devices and systems are capable of allowing collection and/or elution of nucleic acid from the device or system. In some embodiments, the isolated nucleic acid is collected by (i) turning off the second dielectrophoretic field region; and (ii) eluting the nucleic acid from the array in an eluent. Exemplary eluents include water, TE, TBE and L-Histidine buffer.

Isolation Outcomes

In some embodiments, the method, device, or system described herein is optionally utilized to obtain, isolate, or separate any analyte that may be obtained from such a method, device or system. Particulates isolated by the methods, devices and systems described herein include DNA (deoxyribonucleic acid), RNA (ribonucleic acid), and combinations thereof. In some embodiments, the nucleic acid is isolated in a form suitable for sequencing or further manipulation of the nucleic acid, including amplification, ligation or cloning.

In various embodiments, an isolated or separated nucleic acid is a composition comprising nucleic acid that is free from at least 99% by mass of other materials, free from at least 99% by mass of residual cellular material (e.g., from lysed cells from which the nucleic acid is obtained), free from at least 98% by mass of other materials, free from at least 98% by mass of residual cellular material, free from at least 95% by mass of other materials, free from at least 95% by mass of residual cellular material, free from at least 90% by mass of other materials, free from at least 90% by mass of residual cellular material, free from at least 80% by mass of other materials, free from at least 80% by mass of residual cellular material, free from at least 70% by mass of other materials, free from at least 70% by mass of residual cellular material, free from at least 60% by mass of other materials, free from at least 60% by mass of residual cellular material, free from at least 50% by mass of other materials, free from at least 50% by mass of residual cellular material, free from at least 30% by mass of other materials, free from at least 30% by mass of residual cellular material, free from at least 10% by mass of other materials, free from at least 10% by mass of residual cellular material, free from at least 5% by mass of other materials, or free from at least 5% by mass of residual cellular material. In various embodiments, the nucleic acid has any suitable purity. For example, if a DNA sequencing procedure can work with nucleic acid samples having about 20% residual cellular material, then isolation of the nucleic acid to 80% is suitable. In some embodiments, the isolated nucleic acid comprises less than about 80%, less than about 70%, less than about 60%, less than about 50%, less than about 40%, less than about 30%, less than about 20%, less than about 10%, less than about 5%, or less than about 2% non-nucleic acid cellular material and/or protein by mass. In some embodiments, the isolated nucleic acid comprises greater than about 99%, greater than about 98%, greater than about 95%, greater than about 90%, greater than about 80%, greater than about 70%, greater than about 60%, greater than about 50%, greater than about 40%, greater than about 30%, greater than about 20%, or greater than about 10% nucleic acid by mass.

The nucleic acids are isolated in any suitable form including unmodified, derivatized, fragmented, non-fragmented, and the like. In some embodiments, the nucleic acid is collected in a form suitable for sequencing. In some embodiments, the nucleic acid is collected in a fragmented form suitable for shotgun-sequencing, amplification or other manipulation. The nucleic acid may be collected from the device in a solution comprising reagents used in, for example, a DNA sequencing procedure, such as nucleotides as used in sequencing by synthesis methods.

In some embodiments, the methods described herein result in an isolated nucleic acid sample that is approximately representative of the nucleic acid of the starting sample. In some embodiments, the devices and systems described herein are capable of isolating nucleic acid from a sample that is approximately representative of the nucleic acid of the starting sample. That is, the population of particulates collected by the method, or capable of being collected by the device or system, are substantially in proportion to the population of particulates present in the cells in the fluid. In some embodiments, this aspect is advantageous in applications in which the fluid is a complex mixture of many cell types and the practitioner desires a nucleic acid-based procedure for determining the relative populations of the various cell types.

In some embodiments, the nucleic acid isolated using the methods described herein or capable of being isolated by the devices described herein is high-quality and/or suitable for using directly in downstream procedures such as DNA sequencing, nucleic acid amplification, such as PCR, or other nucleic acid manipulation, such as ligation, cloning or further translation or transformation assays. In some embodiments, the collected nucleic acid comprises at most 0.01% protein. In some embodiments, the collected nucleic acid comprises at most 0.5% protein. In some embodiments, the collected nucleic acid comprises at most 0.1% protein. In some embodiments, the collected nucleic acid comprises at most 1% protein. In some embodiments, the collected nucleic acid comprises at most 2% protein. In some embodiments, the collected nucleic acid comprises at most 3% protein. In some embodiments, the collected nucleic acid comprises at most 4% protein. In some embodiments, the collected nucleic acid comprises at most 5% protein.

In some embodiments, the nucleic acid isolated by the methods described herein or capable of being isolated by the devices described herein has a concentration of at least 0.5 ng/mL. In some embodiments, the nucleic acid isolated by the methods described herein or capable of being isolated by the devices described herein has a concentration of at least 1 ng/mL. In some embodiments, the nucleic acid isolated by the methods described herein or capable of being isolated by the devices described herein has a concentration of at least 5 ng/mL. In some embodiments, the nucleic acid isolated by the methods described herein or capable of being isolated by the devices described herein has a concentration of at least 10 ng/ml.

In some embodiments, about 50 pico-grams of nucleic acid is isolated from about 5,000 cells using the methods, systems or devices described herein. In some embodiments, the methods, systems or devices described herein yield at least 10 pico-grams of nucleic acid from about 5,000 cells. In some embodiments, the methods, systems or devices described herein yield at least 20 pico-grams of nucleic acid from about 5,000 cells. In some embodiments, the methods, systems or devices described herein yield at least 50 pico-grams of nucleic acid from about 5,000 cells. In some embodiments, the methods, systems or devices described herein yield at least 75 pico-grams of nucleic acid from about 5,000 cells. In some embodiments, the methods, systems or devices described herein yield at least 100 pico-grams of nucleic acid from about 5,000 cells. In some embodiments, the methods, systems or devices described herein yield at least 200 pico-grams of nucleic acid from about 5,000 cells. In some embodiments, the methods, systems or devices described herein yield at least 300 pico-grams of nucleic acid from about 5,000 cells. In some embodiments, the methods, systems or devices described herein yield at least 400 pico-grams of nucleic acid from about 5,000 cells. In some embodiments, the methods, systems or devices described herein yield at least 500 pico-grams of nucleic acid from about 5,000 cells. In some embodiments, the methods, systems or devices described herein yield at least 1,000 pico-grams of nucleic acid from about 5,000 cells. In some embodiments, the methods, systems or devices described herein yield at least 10,000 pico-grams of nucleic acid from about 5,000 cells.

In some embodiments, the presence of a dielectric material (such as a dielectric layer) on or in the electrodes fabricated into a chip results in lower amounts of sample needed for detection for an application. In some embodiments, the presence of a dielectric layer on the electrodes results in about 2, 3, 4, 5, 6, 7, 8, 9, 10, 20, 30, 50, 100, 200, 500, or about 1000 fold decrease in the amount of sample needed for detection. In some embodiments, the presence of a dielectric layer on the electrodes results in at least 2, 3, 4, 5, 6, 7, 8, 9, 10, 20, 30, 50, 100, 200, 500, or at least 1000 fold decrease in the amount of sample needed for detection. In some embodiments, the presence of a dielectric layer on the electrodes results in no more than 2, 3, 4, 5, 6, 7, 8, 9, 10, 20, 30, 50, 100, 200, 500, or no more than 1000 fold decrease in the amount of sample needed for detection. In some embodiments, the presence of the dielectric layer results in an decrease of about 2 fold to about 1000 fold, about 5 fold to about 500 fold, about 10 fold to about 200 fold, about 2 fold to about 100 fold, about 10 fold to about 500 fold, about 100 fold to about 1000 fold, about 2 to about 5 fold decrease in the amount of sample needed for detection.

Assays and Applications

Additional assays and applications are used in conjunction with the methods, devices, and systems described herein. In some embodiments, the methods described herein further comprise optionally amplifying the isolated nucleic acid by polymerase chain reaction (PCR). In some embodiments, the PCR reaction is performed on or near the array of electrodes or in the device. In some embodiments, the device or system comprise a heater and/or temperature control mechanisms suitable for thermocycling.

PCR is optionally done using traditional thermocycling by placing the reaction chemistry analytes in between two efficient thermoconductive elements (e.g., aluminum or silver) and regulating the reaction temperatures using TECs. Additional designs optionally use infrared heating through optically transparent material like glass or thermo polymers. In some instances, designs use smart polymers or smart glass that comprise conductive wiring networked through the substrate. This conductive wiring enables rapid thermal conductivity of the materials and (by applying appropriate DC voltage) provides the required temperature changes and gradients to sustain efficient PCR reactions. In certain instances, heating is applied using resistive chip heaters and other resistive elements that will change temperature rapidly and proportionally to the amount of current passing through them.

In some embodiments, used in conjunction with traditional fluorometry (ccd, pmt, other optical detector, and optical filters), fold amplification is monitored in real-time or on a timed interval. In certain instances, quantification of final fold amplification is reported via optical detection converted to AFU (arbitrary fluorescence units correlated to analyze doubling) or translated to electrical signal via impedance measurement or other electrochemical sensing. Given the small size of the micro electrode array, these elements are optionally added around the micro electrode array and the PCR reaction will be performed in the main sample processing chamber (over the DEP array) or the analytes to be amplified are optionally transported via fluidics to another chamber within the fluidic cartridge to enable on-cartridge Lab-On-Chip processing.

In some instances, light delivery schemes are utilized to provide the optical excitation and/or emission and/or detection of fold amplification. In certain embodiments, this includes using the flow cell materials (thermal polymers like acrylic (PMMA) cyclic olefin polymer (COP), cyclic olefin co-polymer, (COC), etc.) as optical wave guides to remove the need to use external components. In addition, in some instances light sources—light emitting diodes—LEDs, vertical-cavity surface-emitting lasers—VCSELs, and other lighting schemes are integrated directly inside the flow cell or built directly onto the micro electrode array surface to have internally controlled and powered light sources. Miniature PMTs, CCDs, or CMOS detectors can also be built into the flow cell. This minimization and miniaturization enables compact devices capable of rapid signal delivery and detection while reducing the footprint of similar traditional devices (i.e. a standard bench top PCR/QPCR/Fluorometer).

Amplification on Chip

In some instances, silicon microelectrode arrays can withstand thermal cycling necessary for PCR. In some applications, on-chip PCR is advantageous because small amounts of target particulates can be lost during transfer steps. In certain embodiments of devices, systems or processes described herein, any one or more of multiple PCR techniques are optionally used, such techniques optionally including any one or more of the following: thermal cycling in the flowcell directly; moving the material through microchannels with different temperature zones; and moving volume into a PCR tube that can be amplified on system or transferred to a PCR machine. In some instances, droplet PCR is performed if the outlet contains a T-junction that contains an immiscible fluid and interfacial stabilizers (surfactants, etc). In certain embodiments, droplets are thermal cycled in by any suitable method.

In some embodiments, amplification is performed using an isothermal reaction, for example, transcription mediated amplification, nucleic acid sequence-based amplification, signal mediated amplification of RNA technology, strand displacement amplification, rolling circle amplification, loop-mediated isothermal amplification of DNA, isothermal multiple displacement amplification, helicase-dependent amplification, single primer isothermal amplification or circular helicase-dependent amplification.

In various embodiments, amplification is performed in homogenous solution or as heterogeneous system with anchored primer(s). In some embodiments of the latter, the resulting amplicons are directly linked to the surface for higher degree of multiplex. In some embodiments, the amplicon is denatured to render single stranded products on or near the electrodes. Hybridization reactions are then optionally performed to interrogate the genetic information, such as single nucleotide polymorphisms (SNPs), Short Tandem Repeats (STRs), mutations, insertions/deletions, methylation, etc. Methylation is optionally determined by parallel analysis where one DNA sample is bisulfite treated and one is not. Bisulfite depurinates unmodified C becoming a U. Methylated C is unaffected in some instances. In some embodiments, allele specific base extension is used to report the base of interest.

Rather than specific interactions, the surface is optionally modified with nonspecific moieties for capture. For example, surface could be modified with polycations, i.e., polylysine, to capture DNA molecules which can be released by reverse bias (−V). In some embodiments, modifications to the surface are uniform over the surface or patterned specifically for functionalizing the electrodes or non-electrode regions. In certain embodiments, this is accomplished with photolithography, electrochemical activation, spotting, and the like.

In some applications, where multiple chip designs are employed, it is advantageous to have a chip sandwich where the two devices are facing each other, separated by a spacer, to form the flow cell. In various embodiments, devices are run sequentially or in parallel. For sequencing and next generation sequencing (NGS), size fragmentation and selection has ramifications on sequencing efficiency and quality. In some embodiments, multiple chip designs are used to narrow the size range of material collected creating a band pass filter. In some instances, current chip geometry (e.g., 80 µm diameter electrodes on 200 µm center-center pitch (80/200) acts as 500 bp cutoff filter (e.g., using voltage and frequency conditions around 10 Vp-p and 10 kHz). In such instances, a nucleic acid of greater than 500 bp is captured, and a nucleic acid of less than 500 bp is not. Alternate electrode diameter and pitch geometries have different cutoff sizes such that a combination of chips should provide a desired fragment size. In some instances, a 40 µm diameter electrode on 100 µm center-center pitch (40/100) has a lower cutoff threshold, whereas a 160 µm diameter electrode on 400 µm center-center pitch (160/400) has a higher cutoff threshold relative to the 80/200 geometry, under similar conditions. In various embodiments, geometries on a single chip or multiple chips are combined to select for a specific sized fragments or particles. For example a 600 bp cutoff chip would leave a nucleic acid of less than 600 bp in solution, then that material is optionally recaptured with a 500 bp cutoff chip (which is opposing the 600 bp chip). This leaves a nucleic acid population comprising 500-600 bp in solution. This population is then optionally amplified in the same chamber, a side chamber, or any other configuration. In some embodiments, size selection is accomplished using a single electrode geometry, wherein nucleic acid of >500 bp is isolated on the electrodes, followed by washing, followed by reduction of the ACE high field strength (change voltage, frequency, conductivity) in order to release nucleic acids of <600 bp, resulting in a supernatant nucleic acid population between 500-600 bp.

In some embodiments, the chip device is oriented vertically with a heater at the bottom edge which creates a temperature gradient column. In certain instances, the bottom is at denaturing temperature, the middle at annealing temperature, the top at extension temperature.

In some instances, convection continually drives the process. In some embodiments, provided herein are methods or systems comprising an electrode design that specifically provides for electrothermal flows and acceleration of the process. In some embodiments, such design is optionally on the same device or on a separate device positioned appropriately. In some instances, active or passive cooling at the top, via fins or fans, or the like provides a steep temperature gradient. In some instances the device or system described herein comprises, or a method described herein uses, temperature sensors on the device or in the reaction chamber monitor temperature and such sensors are optionally used to adjust temperature on a feedback basis. In some instances, such sensors are coupled with materials possessing different thermal transfer properties to create continuous and/or discontinuous gradient profiles. In some embodiments, the amplification proceeds at a constant temperature (i.e., isothermal amplification).

In some embodiments, the methods disclosed herein further comprise sequencing the nucleic acid isolated as disclosed herein. In some embodiments, the nucleic acid is sequenced by Sanger sequencing or next generation sequencing (NGS). In some embodiments, the next generation sequencing methods include, but are not limited to, pyrosequencing, ion semiconductor sequencing, polony sequencing, sequencing by ligation, DNA nanoball sequencing, sequencing by ligation, or single molecule sequencing.

In some embodiments, the isolated particulates, such as nucleic acids, disclosed herein are used in Sanger sequencing. In some embodiments, Sanger sequencing is performed within the same device as the nucleic acid isolation (Lab-on-Chip). Lab-on-Chip workflow for sample prep and Sanger sequencing results would incorporate the following steps: a) sample extraction using ACE chips; b) performing amplification of target sequences on chip; c) capture PCR products by ACE; d) perform cycle sequencing to enrich target strand; e) capture enriched target strands; f) perform Sanger chain termination reactions; perform electrophoretic separation of target sequences by capillary electrophoresis with on chip multi-color fluorescence detection. Washing nucleic acids, adding reagent, and turning off voltage is performed as necessary. Reactions can be performed on a single chip with plurality of capture zones or on separate chips and/or reaction chambers.

In some embodiments, the methods disclosed herein further comprise performing a reaction on the particulates (e.g., fragmentation, restriction digestion, ligation of DNA or RNA). In some embodiments, the reaction occurs on or near the array or in a device, as disclosed herein.

Other Assays

The isolated particulates disclosed herein may be further utilized in a variety of assay formats. For instance, devices which are addressed with nucleic acid probes or amplicons may be utilized in dot blot or reverse dot blot analyses, base-stacking single nucleotide polymorphism (SNP) analysis, SNP analysis with electronic stringency, or in STR analysis. In addition, such devices disclosed herein may be utilized in formats for enzymatic nucleic acid modification, or protein-nucleic acid interaction, such as, e.g., gene expression analysis with enzymatic reporting, anchored nucleic acid amplification, or other nucleic acid modifications suitable for solid-phase formats including restriction endonuclease cleavage, endo- or exo-nuclease cleavage, minor groove binding protein assays, terminal transferase reactions, polynucleotide kinase or phosphatase reactions, ligase reactions, topoisomerase reactions, and other nucleic acid binding or modifying protein reactions.

In addition, the devices disclosed herein can be useful in immunoassays. For instance, in some embodiments, locations of the devices can be linked with antigens (e.g., peptides, proteins, carbohydrates, lipids, proteoglycans, glycoproteins, etc.) in order to assay for antibodies in a bodily fluid sample by sandwich assay, competitive assay, or other formats. Alternatively, the locations of the device may be addressed with antibodies, in order to detect antigens in a sample by sandwich assay, competitive assay, or other assay formats. As the isoelectric point of antibodies and proteins can be determined fairly easily by experimentation or pH/charge computations, the electronic addressing and electronic concentration advantages of the devices may be utilized by simply adjusting the pH of the buffer so that the addressed or analyte species will be charged.

In some embodiments, the isolated biomolecules are useful for use in immunoassay-type arrays or biomolecular arrays.

Detection and Characterization of Diseases

Assays may be performed on any analyte or particulate in a sample described herein. In some embodiments, an analyte is circulating outside of cells. In some embodiments, analytes are inside of cells. In some embodiments, analytes are displayed on the surface of cells. In some embodiments, analytes are obtained after cell lysis. In some instances, diseases or conditions are detected or diagnosed following analysis of these analytes. In some embodiments, a disease is characterized in patients using biomarkers. In some embodiments, biomarkers are measured from a variety of different analyte sources. "Characterization" of a disease includes but is not limited to detection and diagnosis of a disease, prognosis of disease, treatment response monitoring and other actions related to disease analysis and treatment therein.

The methods and devices disclosed herein may be used to characterize a disease or condition in a subject. In some instances, the disease is a proliferative disease. In some embodiments, the disease is a cardiovascular disease. In some embodiments, the disease is a neural disease (for example, Alzheimer's disease). In some embodiments, the disease is an autoimmune disease (for example, lupus). In some embodiments, the disease is a metabolic disease. In some embodiments, the disease is an inflammatory disease. In some embodiments, the disease is a bone disease. In some embodiments, the disease is a gastrointestinal disease. In some embodiments, the disease is a blood disease. In some embodiments, the disease is an infectious disease (for example, bacterial, viral, fungal, protozoal, prion, or parasitic).

The methods and devices disclosed herein may be used to characterize a disease such as cancer. In some embodiments, the cancers include adrenal cancer (adrenocortical carcinoma, pheochromocytoma, or other adrenal cancer), anal cancer, appendix cancer, bile duct cancer (cholangiocarcinoma, extrahepatic bile duct cancer, intrahepatic bile duct cancer or other bile duct cancer), bladder cancer (transitional cell cancer, ureteral cancer, or other bladder cancer), bone cancer (sarcoma, Ewing sarcoma osteogenic sarcoma, osteosarcoma, chondrosarcoma, mesenchymal chondrosarcoma, or other bone cancer), brain cancer (brain stem glioma, neuroblastoma, brain tumor, craniopharyngioma, medulloblastoma, meningioma, anaplastic astrocytoma, astrocytoma, oligodendroglioma, diffuse astrocytoma, ependymoma, peripheral nerve cancer, pilocytic astrocytoma, low-grade astrocytoma, pineal region tumor, pineoblastoma, pituitary tumors, glioblastoma multiforme (GBM), mixed gliomas, germ cell tumor, glioma, or other brain cancer), breast cancer (male breast cancer, medullary carcinoma, ductal carcinoma in situ (DCIS), tubular carcinoma, papillary carcinoma, Paget's disease, triple-negative breast cancer, infiltrating ductal carcinoma (IDC), infiltrating lobular carcinoma (ILC), inflammatory breast cancer (IBC), invasive/infiltrating breast cancer, lobular carcinoma in situ, metastatic breast cancer, mucinous carcinoma, or other breast cancer), cervical cancer, colorectal cancer (bowel cancer, colon cancer, rectal cancer, or other colorectal cancer), esophageal cancer, ocular cancer (ocular melanoma, or other ocular cancer), gallbladder cancer, gastrointestinal cancer, gastrointestinal carcinoid cancer, gastrointestinal stromal tumors (GIST), gestational trophoblastic disease (GTD), head and neck cancer (neck cancer, tonsil cancer, or other head/neck cancer), hemangioendothelioma, Hodgkin lymphoma, intestinal cancer, kidney cancer (ureteral cancer, renal cell carcinoma, renal pelvis cancer, transitional cell cancer, or other kidney cancer), leptomeningeal metastases, leukemia (acute granulocytic leukemia, acute lymphocytic leukemia (ALL), acute myelogenous leukemia (AML), chronic lymphocytic leukemia (CLL), chronic myelogenous leukemia (CIVIL), myelodysplastic syndrome, hairy cell leukemia, or other leukemia), liver cancer, lung cancer (adenocarcinoma, adenosarcoma, small cell lung cancer (SCLC), non-small cell lung cancer (NSCLC), oat cell cancer, or other lung cancer), melanoma (cutaneous melanoma, metastatic melanoma, or other melanoma), mesenchymous, mesothelioma, metastatic squamous neck cancer, multiple myeloma (bone marrow cancer, or other myeloma), neuroendocrine tumors (NETS), lymphoma, non-Hodgkin lymphoma (NHL, lymph node cancer, b-cell lymphoma, mycosis fungoides, t-cell lymphoma, or other lymphoma), oral cancer (lip cancer, oral cavity cancer, tongue cancer, jaw cancer, Kaposi sarcoma, salivary gland cancer, mouth cancer, mucosal melanoma, or other oral cancer), ovarian cancer (ovarian epithelial cancer, ovarian germ cell tumor, ovarian primary peritoneal carcinoma, ovarian sex cord stromal tumor, fallopian tube cancer, peritoneal cancer, transitional cell cancer, or other ovarian cancer), pancreatic cancer (islet cell cancer, or other pancreatic cancer), paranasal sinus cancer, pelvic cancer, penile cancer, primary central nervous system lymphoma, prostate cancer, sarcoma, (liposarcoma, or other soft tissue sarcoma), sinus cancer, skin cancer (cutaneous lymphoma, squamous cell carcinoma, basal cell carcinoma, merkel cell carcinoma, or other skin cancer) small intestine cancer, soft tissue sarcoma, angiosarcoma, epithelioid sarcoma, rhabdomyosarcoma, fibrosarcoma, synovial sarcoma, leiomyosarcoma, or other sarcoma), spinal cancer (spinal column cancer, spinal cord cancer, spinal tumor, or other spinal cancer), stomach cancer (carcinoid tumors, gastric cancer, or other stomach cancer), testicular cancer, throat cancer (laryngeal cancer, nasal cavity cancer, nasopharyngeal cancer, pharyngeal cancer, oropharyngeal cancer, hypopharyngeal cancer, or other throat cancer), thymoma/thymic carcinoma, thyroid cancer (parathyroid cancer, or other thyroid cancer), tubal cancer, urethral cancer, uterine cancer (uterine sarcoma, uterine adenocarcinoma, endometrial cancer, or other uterine cancer), vaginal cancer, vulvar cancer.

The methods and devices disclosed herein may be used to characterize a disease such as a neural disease. In some embodiments, the neural disease is Alzheimer's disease, Parkinson's disease, amyotrophic lateral sclerosis, Friedreich's ataxia, Huntington's disease, Lewy body disease, spinal muscular atrophy, Alpers' Disease, Batten Disease, Batten Disease, Cerebro-Oculo-Facio-Skeletal Syndrome (COFS), Corticobasal Degeneration, Gerstmann-Straussler-Scheinker Disease, Kuru, Leigh's Disease, Monomelic Amyotrophy, Multiple System Atrophy, Multiple System Atrophy with Orthostatic Hypotension (Shy-Drager Syndrome), Neurodegeneration with Brain Iron Accumulation, Opsoclonus Myoclonus, Transmissible Spongiform Encephalopathies (Prion Diseases), Progressive Multifocal Leukoencephalopathy, Striatonigral Degeneration, or other neural disease.

The methods and devices disclosed herein may be used to characterize a disease such as a cardiovascular disease. In some embodiments, the cardiovascular disease is a heart disease. In some embodiments, the cardiovascular disease is coronary heart disease, rheumatic heart disease, cardiomyopathy, heart valve disease, pericardial diseases, myocardial infarction, heart infection, renal artery stenosis, endocarditis, myocarditis, or other cardiovascular disease. In some embodiments, the cardiovascular disease is aneurysm, peripheral arterial disease, vascular disease, cerebrovascular diseases, deep venous thrombosis (DVT), pulmonary embolism, hypertension, atherosclerosis, or other cardiovascular disease.

The methods and devices disclosed herein may be used to characterize a disease such as an autoimmune disease. In some embodiments, the autoimmune disease is achalasia, Addison's disease, Adult Still's disease, Agammaglobulinemia, Alopecia areata, Amyloidosis, Ankylosing spondylitis, Anti-GBM/Anti-TBM nephritis, Antiphospholipid syndrome, Autoimmune angioedema, Autoimmune dysautonomia, Autoimmune encephalomyelitis, Autoimmune hepatitis, Autoimmune inner ear disease (AIED), Autoimmune myocarditis, Autoimmune oophoritis, Autoimmune Orchitis, Autoimmune pancreatitis, Autoimmune retinopathy, Autoimmune urticaria, Axonal & neuronal neuropathy (AMAN), Bal disease, Behcet's disease, Benign mucosal pemphigoid, Bullous pemphigoid, Castleman disease (CD), Celiac disease, Chagas disease, Chronic inflammatory demyelinating polyneuropathy (CIDP), Chronic recurrent multifocal osteomyelitis (CRMO), Churg-Strauss Syndrome (CSS) or Eosinophilic Granulomatosis (EGPA), Cicatricial pemphigoid, Cogan's syndrome, Cold agglutinin disease, Congenital heart block, Coxsackie myocarditis, CREST syndrome, Crohn's disease, Dermatitis herpetiformis, Dermatomyositis, Devic's disease (neuromyelitis optica), Discoid lupus, Dressler's syndrome, Endometriosis, Eosinophilic esophagitis (EoE), Eosinophilic fasciitis, Erythema nodosum, Essential mixed cryoglobulinemia, Evans syndrome, Fibromyalgia, Fibrosing alveolitis, Giant cell arteritis (temporal arteritis), Giant cell myocarditis, Glomerulonephritis, Goodpasture's syndrome, Granulomatosis with Polyangiitis, Graves' disease, Guillain-Barre syndrome, Hashimoto's thyroiditis, Hemolytic anemia, Henoch-Schonlein purpura (HSP), Herpes gestationis or pemphigoid gestationis (PG), Hidradenitis Suppurativa (HS) (Acne Inversa), Hypogammalglobulinemia, IgA Nephropathy, IgG4-related sclerosing disease, Immune thrombocytopenic purpura (ITP), Inclusion body myositis (IBM), Interstitial cystitis (IC), Juvenile arthritis, Juvenile diabetes (Type 1 diabetes), Juvenile myositis (JM), Kawasaki disease, Lambert-Eaton syndrome, Leukocytoclastic vasculitis, Lichen planus, Lichen sclerosus, Ligneous conjunctivitis, Linear IgA disease (LAD), Lupus, Lyme disease chronic, Meniere's disease, Microscopic polyangiitis (MPA), Mixed connective tissue disease (MCTD), Mooren's ulcer, Mucha-Habermann disease, Multifocal Motor Neuropathy (MMN) or MMNCB, Multiple sclerosis, Myasthenia gravis, Myositis, Narcolepsy, Neonatal Lupus, Neuromyelitis optica, Neutropenia, Ocular cicatricial pemphigoid, Optic neuritis, Palindromic rheumatism (PR), PANDAS, Paraneoplastic cerebellar degeneration (PCD), Paroxysmal nocturnal hemoglobinuria (PNH), Parry Romberg syndrome, Pars planitis (peripheral uveitis), Parsonnage-Turner syndrome Pemphigus, Peripheral neuropathy, Perivenous encephalomyelitis, Pernicious anemia (PA), POEMS syndrome, Polyarteritis *nodosa*, Polyglandular syndromes type I, II, III, Polymyalgia rheumatica, Polymyositis, Postmyocardial infarction syndrome, Postpericardiotomy syndrome, Primary biliary cirrhosis, Primary sclerosing cholangitis, Progesterone dermatitis, Psoriasis, Psoriatic arthritis, Pure red cell aplasia (PRCA), Pyoderma gangrenosum, Raynaud's phenomenon, Reactive Arthritis, Reflex sympathetic dystrophy, Relapsing polychondritis, Restless legs syndrome (RLS), Retroperitoneal fibrosis, Rheumatic fever, Rheumatoid arthritis, Sarcoidosis, Schmidt syndrome, Scleritis, Scleroderma, Sjögren's syndrome (sicca), Sperm & testicular autoimmunity, Stiff person syndrome (SPS), Subacute bacterial endocarditis (SBE), Susac's syndrome, Sympathetic ophthalmia (SO), Takayasu's arteritis, Temporal arteritis/Giant cell arteritis, Thrombocytopenic purpura (TTP), Tolosa-Hunt syndrome (THS), Transverse myelitis, Type 1 diabetes, Ulcerative colitis (UC), Undifferentiated connective tissue disease (UCTD), Uveitis, Vasculitis, Vitiligo, Vogt-Koyanagi-Harada Disease, Wegener's granulomatosis (or Granulomatosis with Polyangiitis (GPA)), or other autoimmune disease.

The methods and devices disclosed herein may be used to characterize a disease such as a metabolic disease. In some embodiments, the disease is Gilbert syndrome, Gestational diabetes insipidus, Gaucher disease, Mannose-binding lectin protein deficiency, Peroxisome disorders, diabetes mellitus, hypo or hyper thyroidism, hyperlipidemia, osteoporosis, or other metabolic disease.

The methods and devices disclosed herein may be used to characterize a disease such as an inflammatory disease. In some embodiments, the inflammatory disease is acute or chronic. In some embodiments, the inflammatory diseases is asthma, chronic peptic ulcer, tuberculosis, rheumatoid arthritis, periodontitis, ulcerative colitis and Crohn's disease, sinusitis, active hepatitis, appendicitis, tonsillitis, meningitis, sinusitis, bronchitis, or other inflammatory disease.

The methods and devices disclosed herein may be used to characterize a disease such as a bone disease. In some embodiments, the bone disease is a bone tumor. In some embodiments, the bone disease is Chondroblastoma, Chondromyxoid Fibroma, Enchondroma, Extra-Abdominal Desmoid Tumors, Fibrous Dysplasia, Hypophosphatasia, Klippel-Feil Syndrome, Osteochondritis Dissecans (OCD), Osteochondroma, Osteoid Osteoma, Osteopetroses, or other bone disease.

The methods and devices disclosed herein may be used to characterize a disease such as a gastrointestinal disease. In some embodiments, the gastrointestinal disease is Dyspepsia, Peptic Ulcer Disease, Abdominal Pain Syndrome, Biliary Tract Disorders, Gallbladder Disorders and Gallstone Pancreatitis, Gallstone Pancreatitis, Gallstones, Irritable Bowel Syndrome, or other gastrointestinal disease.

The methods and devices disclosed herein may be used to characterize a disease such as a blood disease. In some embodiments, the blood disease is a red blood cell disorder, (such as Anemia overview, Sickle cell disease, Thalassemia, Hemolytic disease of the newborn, Hemolytic anemia, Spherocytosis, Iron deficiency anemia, Hemochromatosis, Iron-refractory iron deficiency anemia (IRIDA), Congenital sideroblastic anemia, Congenital dyserythropoietic anemia, Megaloblastic anemia (including pernicious anemia), white blood cell disorder (such as Severe congenital neutropenia (Kostmann syndrome), Cyclical neutropenia, Chronic granulomatous disease, Leukocyte adhesion deficiency, Myeloperoxidase deficiency), bone marrow failure syndromes (such as Aplastic anemia, Congenital amegakaryocytic thrombocytopenia, Diamond-Blackfan anemia, Dyskeratosis congenita, Fanconi anemia, Myelodysplastic syndrome (MDS), Schwachman-Diamond syndrome, Thrombocytopenia absent radius), bleeding disorder (such as Hemophilia, von Willebrand disease, platelet function disorders, Thrombocytopenia, Hypofibrinogenemia and dysfibrinogenemia), Thrombosis/anticoagulation disorders (such as Thrombosis, Factor V Leiden, Prothrombin gene mutation, Protein C deficiency, Protein S deficiency, Antithrombin deficiency, Stroke), autoimmune blood cell disorder, (such as Immune thrombocytopenia (ITP), autoimmune hemolytic anemia, Evans syndrome), Polycythemia/Erythrocytosis, Hemochromatosis, Hemoglobin C disease, Hemoglobin E disease, Hemoglobin SC disease, Cerebral cavernous malformation, Factor V Leiden, Fibromuscular dysplasia, Hemochromatosis, Hemoglobin SE disease, Idiopathic neutropenia, Lipedema, Purpura simplex, Sideroblastic anemia, or other blood disease.

The methods and devices disclosed herein may be used to characterize a disease such as an infectious disease. In some embodiments, the disease is a bacterial infection. In some embodiments, the disease is a viral infection. In some embodiments, the disease is a fungal infection. In some embodiments, the disease is a protozoal infection. In some embodiments, the disease is a prion disease. In some embodiments, the disease is a parasitic infection. In some embodiments, the infectious disease is sepsis. In some embodiments, the infectious disease is Acute Flaccid Myelitis (AFM), Anaplasmosis, Anthrax, Babesiosis, Botulism, Brucellosis, *Burkholderia mallei* (Glanders), *Burkholderia pseudomallei* (Melioidosis), Campylobacteriosis (*Campylobacter*), Carbapenem-resistant Infection (CRE/CRPA), Chancroid, Chikungunya Virus Infection (Chikungunya), *Chlamydia*, Ciguatera, *Clostridium Difficile* Infection, *Clostridium Perfringens* (Epsilon Toxin), Coccidioidomycosis fungal infection (Valley fever), Creutzfeldt-Jacob Disease, transmissible spongiform encephalopathy (CJD), Cryptosporidiosis (Crypto), Cyclosporiasis, Dengue, 1,2,3,4 (Dengue Fever), Diphtheria, *E. coli* infection (*E. coli*), Eastern Equine Encephalitis (EEE), Ebola Hemorrhagic Fever (Ebola), Ehrlichiosis, Encephalitis, Arboviral or parainfectious, Enterovirus Infection, Non-Polio (Non-Polio Enterovirus), Enterovirus Infection, D68 (EV-D68), Giardiasis (Giardia), Gonococcal Infection (Gonorrhea), Granuloma inguinale, *Haemophilus* Influenza disease, Type B (Hib or H-flu), Hantavirus Pulmonary Syndrome (HPS), Hemolytic Uremic Syndrome (HUS), Hepatitis A (Hep A), Hepatitis B (Hep B), Hepatitis C (Hep C), Hepatitis D (Hep D), Hepatitis E (Hep E), Herpes, Herpes Zoster, zoster VZV (Shingles), Histoplasmosis infection (Histoplasmosis), Human Immunodeficiency Virus/AIDS (HIV/AIDS), Human Papillomarivus (HPV), Influenza (Flu), Lead Poisoning, Legionellosis (Legionnaires Disease), Leprosy (Hansens Disease), Leptospirosis, Listeriosis (*Listeria*), Lyme Disease, Lymphogranuloma venereum infection (LVG), Malaria, Measles, Meningitis, Viral (Meningitis, viral), Meningococcal Disease, Bacterial (Meningitis, bacterial), Middle East Respiratory Syndrome Coronavirus (MERS-CoV), Mumps, Norovirus, Paralytic Shellfish Poisoning (Paralytic Shellfish Poisoning, Ciguatera), Pediculosis (Lice, Head and Body Lice), Pelvic Inflammatory Disease (PID), Pertussis (Whooping Cough), Plague; Bubonic, Septicemic, Pneumonic (Plague), Pneumococcal Disease (Pneumonia), Poliomyelitis (Polio), Powassan, Psittacosis, Pthiriasis (Crabs; Pubic Lice Infestation), Pustular Rash diseases (Small pox, monkeypox, cowpox), Q-Fever, Rabies, Ricin Poisoning, Rickettsiosis (Rocky Mountain Spotted Fever), Rubella, Including congenital (German Measles), *Salmonellosis* gastroenteritis (*Salmonella*), Scabies Infestation (Scabies), Scombroid, Severe Acute Respiratory Syndrome (SARS), Shigellosis gastroenteritis (*Shigella*), Smallpox, Staphyloccal Infection, Methicillin-resistant (MRSA), Staphylococcal Food Poisoning, Enterotoxin-B Poisoning (Staph Food Poisoning), Staphylococcal Infection, Vancomycin Intermediate (VISA), Staphylococcal Infection, Vancomycin Resistant (VRSA), Streptococcal Disease, Group A (invasive) (Strep A), Streptococcal Disease, Group B (Strep-B), Streptococcal Toxic-Shock Syndrome, STSS, Toxic Shock (STSS, TSS), Syphilis, primary, secondary, early latent, late latent, congenital, Tetanus Infection, *tetani* (Lock Jaw), Trichonosis Infection (Trichinosis), Tuberculosis (TB), Tuberculosis (Latent) (LTBI), Tularemia (Rabbit fever), Typhoid Fever, Group D, Typhus, Vaginosis, bacterial (Yeast Infection), Varicella (Chickenpox), *Vibrio cholerae* (Cholera), Vibriosis (*Vibrio*), Viral Hemorrhagic Fever (Ebola, Lassa, Marburg), West Nile Virus, Yellow Fever, Yersenia (*Yersinia*), Zika Virus Infection (Zika), or other infectious disease.

In some instances, the methods and devices described herein are used to measure or detect analyte differences between samples obtained from different sources in the same individual. For example, analyte differences in serum and cellular DNA levels are compared during characterization.

Analytes variously comprise any number of different biomarkers described herein. For example, in some embodiments analytes comprise nucleic acids. In some instances, analytes comprise nucleic acids of a specific size, for example about 50-500 bp, about 75-400 bp, about 100-300 bp, about 150-250 bp, about 250-500 bp, or about 350-500 bp. In some instances, analytes comprise nucleic acids of about 50, 100, 150, 200, 250, 300, 350, 400, or about 500 bp. In some instances, analytes comprise nucleic acids of at least 50, 100, 150, 200, 250, 300, 350, 400, or at least 500 bp. In some instances, analytes comprise nucleic acids of no more than 50, 100, 150, 200, 250, 300, 350, 400, or no more than 500 bp. In some instances, biomarkers comprise comparisons between the amounts of nucleic acid of different sizes. For example, the amount of nucleic acids 500 bp or below is compared with the amount of nucleic acids greater than 500 bp. In some embodiments, the amount of nucleic acids 300 bp or below is compared with the amount of nucleic acids greater than 300 bp. In some embodiments, the amount of nucleic acids 150 bp or below is compared with the amount of nucleic acids greater than 150 bp. Additional comparisons include changes over time, between sources (individuals, sources, sample types), or changes resulting from before, during, or after treatment for a disease or condition.

Cell Free Biomarkers

In some embodiments, the characterization may be performed via molecular profiling of biomarkers. (Holdhoff et al. *J. Neurooncol.* 2013, 113, 345; Elshimali et al. *Int. J. Mol. Sci.* 2013, 14, 18925; Swanson et al. *Sensors Actuat. B-Chem.* 2000, 64, 22; Sosnowski et al. *Proc. Natl. Acad. Sci. U.S.* 1997, 94, 1119; Huang et al. *Macromolecules* 2002, 35, 1175; and Hofman et al. *RSC Advances* 2012, 2, 3885). The profiling includes but is not limited to enumeration of analytes, specific detection of analytes, including but not limited to proteins, lipids, antibodies, tumor DNA, tumor cells, exosomes, nucleosomes, nanosomes detection of specific gene sequences, detection of mutant gene sequences, detection of loss of heterozygosity, determination of methylation status, detection of alterations, detection of deletions and other molecular profiling assays used in the analysis and characterization of physical and/or biochemical status of a patient or subject.

In some instances, the biomarkers are cell free biomarkers. In certain instances, the cell free biomarkers may comprise any analyte described herein. Cell free biomarkers can be derived from proteins or molecules associated with cellular exocytosis, necrosis, or secretion processes. Markers include: high molecular weight DNA (>300 bp), nucleosomes, exosomes, aggregated proteins, cell membrane fragments, mitochondria, cellular vesicles, and other markers related to cellular exocytosis, necrosis or secretion.

Examples of candidates for circulating cell-free biomarkers include but are not limited to circulating tumor DNA, including mutations or deletions, rearrangement, methylated nucleic acid, loss of heterozygosity, and other DNA alterations. RNA may also be used, including micro RNA (miRNA), RNA from microvesicles and other RNA forms that provide useful information with regards to the characterization of, for example, disease diagnosis, prognosis and treatment response in a patient. In some embodiments, the disease is cancer. Tumor cells may also be directly monitored, as well as cell free proteins, including but not limited to GFAP, VEGF, EGFR, b-FGF, KRAS, YKL-40 and MMP-9.

Cell free biomarkers can be nucleic acids. Nucleic acid biomarkers in some instances are at least 100 bp, at least 200 bp, at least 300 bp, at least 500 bp, or at least 1000 bp. In some instances, the analyte is a circulating cell-free high molecular weight DNA (>300 bp) or other target cell-free biomarker isolated using the methods and devices disclosed herein.

The methods and devices disclosed herein for characterization of, for example, patients and subjects uses AC Electrokinetics to isolate cell free target biomarkers directly from whole blood, serum, plasma, or other bodily fluid or sample. The methods and devices disclosed herein uses minimal amounts of sample, for example, up to 10 up to 20 up to 30 up to 40 up to 50 up to 60 up to 70 up to 80 up to 90 up to 100 up to 200 up to 300 µl, up to 400 up to 500 µl or more of sample. In some embodiments, the methods and devices disclosed herein uses less than 500 less than 400 less than 300 less than 200 µl less than 100 less than 90 less than 80 less than 70 less 60 less than 50 less than 40 less than 30 µl, less than 20 less than 10 µl or less than 5 µl of sample. In some embodiments, the methods and devices disclosed herein use between about 50 µl of sample and about 500 µl of sample.

The methods and devices disclosed herein for characterization of, for example, patients and subjects may use intercalating dyes, antibody labeling, or other traditional staining techniques to enable direct quantification using fluorescence microscopy or other detection techniques. The methods and devices disclosed herein may also use DNA/RNA hybridization techniques to detect specific alleles implicated in a disease or condition. The methods and devices disclosed herein may also use Quantitative Real Time PCR, including of nuclear or mitochondrial DNA or other target nucleic acid molecule markers, enzyme-linked immunosorbent assays (ELISA), direct SYBR gold assays, direct PicoGreen assays, loss of heterozygosity (LOH) of microsatellite markers, optionally followed by electrophoresis analysis, including but not limited to capillary electrophoresis analysis, sequencing and/or cloning, including next generation sequencing, methylation analysis, including but not limited to modified semi-nested or nested methylation specific PCR, DNA specific PCR (MSP), quantification of minute amounts of DNA after bisulfitome amplification (qMAMBRA), as well as methylation on beads, mass-based analysis, including but not limited to MALDI-ToF (matrix-assisted laser desorption/ionization time of flight analysis, optionally in combination with PCR, and digital PCR.

The methods and devices disclosed herein may employ dyes, including intercalating dyes, antibody labeling, stains and other imaging molecules that enable direct quantification of the cell-free biomarker materials directly on or in use with the embodied devices, including the use of fluorescence microscopy. Examples of fluorescent labeling of particulates, e.g. DNA and RNA, include but are not limited to cyanine dimers high-affinity stains (Life Technologies) can used. Among them YOYO®-1, YOYO®-3, POPO™-1, POPO™-3, TOTO®-1, TOTO®-3 are the preferred staining dyes. Fluorescent labeling of protein for detection and quantitation in conjunction with the methods and devices disclosed herein include but not limited to Quanti-iT™ protein quantitation assay, NanoOrange™ protein quantitation assay, CBQCA protein quantitation assay (Life Technologies). Fluorescent quantitation of other disease biomarkers are in some embodiments used, including mitochondria, labelling dyes such as MitoTracker® Green FM® and MitoTracker® Red FM®.

The methods and devices disclosed herein may also be used in conjunction with DNA/RNA hybridization techniques to detect specific alleles implicated in a disease or condition. In some embodiments, specific electrodes and corresponding electrode trace lines can be designed to individually control separate electrode so as to achieve a unique electric field distribution. By designing non-uniform electric field distribution, specific DNA/RNA can be manipulated.

The methods and devices disclosed herein are also capable of eluting circulating cell-free target biomarkers such as nucleosomes, high molecular weight DNA, exosomes and proteins for post-genetic analysis and for quantification and further analysis using quantitative PCR, reverse transcriptase (RT) PCR, and sequencing analytical techniques for identifying proteins or nucleic acids of interest in the isolated and eluted sample DNA. Post-genetic analysis is performed on nucleosomal or nucleoprotein complexed dsDNA (greater than 300 bp), on exosomal dsDNA or RNA (greater than 100 bp), and/or on mitochondrial DNA.

Characterizing Cancers

A number of various analytes are used with the methods and devices described herein for the characterization of cancer. In some embodiments, analytes comprise biomarkers. In some instances, the analyte is a cell-free biomarker such as ccfDNA. Candidates of cell-free biomarkers (ccfDNA=circulating cell-free DNA) are in some instances used for detecting cancer. In some embodiments, analytes are obtained from cancerous tissues. In some instances, analytes are obtained from fluid samples. Analytes in some embodiments comprise biomarkers, such as modifications or changes to the structure or sequence of nucleic acids. For example, in some embodiments, biomarkers include nucleic acids that are post-transcriptionally modified, such as by methylation or hydroxylation. In some embodiments, biomarkers comprise nucleic acid mutations or changes relative to nucleic acids in normal individuals or tissues. In some instances, increases or decreases in the amount of nucleic acids are used to characterize cancers.

The methods and devices described herein may be used to detect tumors of the central nervous system (CNS). In some embodiments, the CNS cancer is a brain cancer. In some embodiments, the cancer is a neuroblastoma or glioma. In some embodiments, genetic alterations related to neuroblastomas detected by the devices and methods described herein include MYCN, hypermethylation of the DCR2 promotor (Combaret, V., et al. Cancer Res. 2002 Jul. 1; 62(13):3646-8; Misawa A, et al. Br J Cancer. 2009 Jan. 27; 100(2):399-404.) In some embodiments, genetic alterations related to gliomas detected by the devices and methods described herein include gene promoter methylationp16/INK4a, MGMT, p73, RARβ and LOH in chromosomes 1p, 19q, and 10q, EGFRvIII, and RASSF1A hypermethylation (Weaver K D et al. Cancer Invest. 2006; 24:35-40; Lavon I et al. Neuro Oncol. 2010 February; 12(2):173-80.; Salkeni M. A. J. Neurooncol. 2013.; Majchrzak-Celifiska A. J Appl Genet. 2013 August; 54(3):335-44.)

The methods and devices described herein may be used to detect breast cancer. In some embodiments, levels of ccfDNA have been associated with tumor size, tumor stage, tumor grade, lymph node involvement, Her2/neu and topoisomerase IIα expression. Markers associated with breast cancer in some embodiments include LOH of circulating DNA (short DNA fragment) at markers D3S1605, D10S1765, D12S1725, D13S218, D17S855, and D12S1725, amplified HER2, copy number of LINE1 (Long Interspersed Nuclear Element-1), concurrent ERβ and RARβ2 methylation as well as loss of ERβ expression, CST6, APC, and RASSF1A, methylation of RASSF1A, cyclin D2, and RARβ2 genes in ccfDNA, aberrant hypermethylation of p16 (associated with elevated serum level of CEA), CDH1 (E-cadherin or CD324, a tumor suppressor gene), methylation patterns in ccfDNA (changes after surgery, tamoxifen treatment, or after combined treatments), different BRCA1 methylation and kinetics of plasma DNA (ALU115), hTERT (Telomerase Reverse Transcriptase in human), and VEGF (Catarino R. DNA Cell Biol. 2008 August; 27(8):415-21; Hashad D. J Clin Lab Anal. 2012 November; 26(6):467-72; Hashad D. J Clin Lab Anal. 2012 November; 26(6):467-72; Schwarzenbach H₂. Clin Cancer Res. 2012 Oct. 15; 18(20):5719-30; Weiss L. N Engl J Med. 2013 Jul. 4; 369(1):93; Page K. Br J Cancer. 2011 Apr. 12; 104(8):1342-8; Jin D. J. Mol. Biomarkers Diagn. 2012:S2-009; Shaw J A. Genome Res. 2012 February; 22(2):220-31; Umetani N. J Clin Oncol. 2006 Sep. 10; 24(26):4270-6; Mirza S. Ann Surg Oncol. 2012 September; 19(9):3107-15; Müller H. M. Cancer Res. 2003; 63:7641-7645; Zurita M. BMC Cancer. 2010 May 20; 100:217; Deligezer U. Ann N Y Acad Sci. 2008 August; 11370:175-9; Liggett T E. Int J Cancer. 2011 Jan. 15; 128(2):492-9; Sharma G. Tumour Biol. 2012 December; 33(6):1837-43; El Tarhouny S. Cytokine. 2008 October; 44(1):65-9; and Dawson S J. N Engl J Med. 2013 Mar. 28; 368(13):1199-209.)

The methods and devices described herein may be used to detect cancer in the female gynecological system. In some embodiments, the cancer comprises endometrial tumors. Markers associated with endometrial tumors in some embodiments include DNA integrity (longer DNA fragments), higher levels of ccfDNA, and association between ccfDNA and p53-Antibody as potential marker (Tanaka H. Int J Gynecol Cancer. 2012 January; 22(1):82-6; Zachariah R. Reprod Biomed Online. 2009 March; 18(3):407-11; Dobrzycka B. Int J Cancer. 2010 Aug. 1; 127(3):612-21). In some embodiments, the cancer comprises cervical tumors. Markers associated with cervical tumors in some embodiments include plasma DNA levels, MYOD1 promoter hypermethylation in serum, and unmethylated CDH11CDH13 (Müller H. M. Cancer Res. 2003; 63:7641-7645; Guan T. 2008 August; 28(9):1663-4,1667; Widschwendter A. Int J Cancer. 2004 Mar. 20; 109(2):163-6). In some embodiments, the cancer comprises ovarian tumors. Markers associated with ovarian tumors in some embodiments include higher levels of ccfDNA, hypermethylation of RASSF1A, KRAS mutations, and p53-antibody (Zachariah R. R. Gynecol. 2008; 112:843-850; Ma L. Zhonghua Bing Li Xue Za Zhi. 2005 December; 34(12):785-7; Dobrzycka B. Ann Oncol. 2011 May; 22(5):1133-40; Kuhlmann J D. BMC Cancer. 2012 Jul. 31; 12:325).

The methods and devices described herein may be used to detect cancer such as hepatocellular carcinoma (HCC). Markers associated with hepatocellular carcinoma in some embodiments include high levels of ccfDNA, LINE-1 hypomethylation, mutation in TP53 at codon 249 (Ser-249, considered a hallmark of mutagenesis by aflatoxin) and in CTNNB1 (gene encoding beta-catenin), hypermethylation of RASSF1A, aberrant methylation of p16, higher levels of RASSF1A, and microsatellite instability and loss of heterozygosity of D8S277, D8S298, and D8S1771 at chromosome 8p (Ren N. World J Gastroenterol. 2006 Jun. 28; 12(24):3911-4; Tangkijvanich P. Clin Chim Acta. 2007 April; 379(1-2):127-33; Iizuka N. Anticancer Res. 2006 November-December; 26(6C):4713-9; Lida M. Oncol Rep. 2008 October; 20(4):761-5; Hosny G. Cancer Lett. 2008 Jun. 18; 264(2):201-8; Hosny G. Cancer Lett. 2008 Jun. 18; 264(2):201-8; Pang J Z. Zhonghua Yi Xue Za Zhi. 2006 Jun. 27; 86(24):1662-5; Chan K C. Clin Chem. 2008 September; 54(9):1528-36; Zhou J. Semin Oncol. 2012 August; 39(4):440-8).

The methods and devices described herein may be used to detect cancer such as pancreatic carcinoma. Markers associated with pancreatic carcinoma in some embodiments include methylation profiles of circulating plasma DNA, and free serum DNA (Melnikov A A. J Surg Oncol. 2009 Feb. 1; 99(2):119-22; Gornik I. Clin Biochem. 2009 January; 42(1-2):38-43; Sawabu N. Pancreas. 2004 April; 28(3):263-7; Liggett T. Cancer. 2010 Apr. 1; 116(7):1674-80).

The methods and devices described herein may be used to detect cancer such as those of the gastrointestinal tract. In some embodiments, the gastrointestinal tract cancer comprises esophageal tumors. Markers associated with esophageal tumors in some embodiments include methylated DAPK (Death-associated protein kinase) and APC (adenomatous polyposis coli gene) promoter DNA (Tomita H. Anticancer Res. 2007 July-August; 27(4C):2737-41; Hoffmann A C. J Cancer Res Clin Oncol. 2009 September; 135(9):1231-7). In some embodiments, the gastrointestinal tract cancer comprises Stoch tumors. Markers associated with esophageal tumors in some embodiments include higher level of ccfDNA, RUNX3, MGMT, p15, and hMLH1 hypermethylation, and methylation status of CEA, P16, E-cadherin, RARbeta and CDH4 genes (Kolesnikova E V. Ann N Y Acad Sci. 2008 August; 1137:226-31; Tani N. 2006; 33:1720-1722; Sai S. Anticancer Res. 2007 July-August; 27(4C):2747-51; Sakakura C. Anticancer Res. 2009 July; 29(7):2619-25). In some embodiments, the gastrointestinal tract cancer comprises colorectal tumors. Markers associated with colorectal tumors in some embodiments include mutated circulating DNA, aberrant methylation status of specific genes such as SEPT9, HPP 1 and/or HLTF, KRAS mutant clones, serum DNA integrity, microsatellite instability, BRAF, SMAD4, abnormal promoter methylation including TMEFF2, NGFR, and p16 (Schwarzenbach H. Ann N Y Acad Sci. 2008 August; 11370:190-6; da Silva Filho B F. J Clin Pathol. 2013 September; 66(9):775-8; Lofton-Day C. Clin. Chem. 2008; 54:414-423; Toth K. Ory Hetil. 2009 May 24; 150(21):969-77; deVos T. Ory Hetil. 2009 May 24; 150(21):969-77; deVos T. Clin Chem. 2009 July; 55(7):1337-46; Wallner M. Clin Cancer Res. 2006 Dec. 15; 12(24):7347-52; Misale S. Nature. 2012 Jun. 28; 486(7404):532-6; Trevisiol C. Int J Biol Markers. 2006 October-December; 21(4):223-8; Umetani N. Clin Chem. 2006 June; 52(6):1062-9; Morgan S R. J Clin Pathol. 2013 September; 66(9):775-8; Mouliere F. Transl Oncol. 2013 June; 6(3):319-28; Trevisiol C. Int J Biol Markers. 2006 October-December; 21(4):223-8; Nakayama G. Anticancer Res. 2007; 27:1459-1463.

The methods and devices described herein may be used to detect cancer such as those of the head and neck. In some embodiments, head and neck cancers comprise nasopharyngeal carcinoma. Markers associated with nasopharyngeal carcinoma in some embodiments include aberrant hypermethylated promoter DNA of at least one of the five following genes: CDH1, p16, DAPK1, p15, and RASSF1A, hypermethylation of the promoter DNA of at least one in three genes (CDH1, DAPK1, and p16), and EBV-DNA (Chan K C. Clin Cancer Res. 2008 Jul. 1; 14(13):4141-5. Jiang W W. Int J Cancer. 2006 Dec. 1; 119(11):2673-6. Chan S L. BMC Cancer. 2006 Oct. 31; 6:259. Chan K C. Semin Cancer Biol. 2002 December; 12(6):489-96). In some embodiments, head and neck cancers comprise thyroid tumors. Markers associated with thyroid tumors in some embodiments include BRAF/DNA (Chuang T C. Head Neck. 2010 February; 32(2):229-34).

The methods and devices described herein may be used to detect cancer such as lymphoma or leukemia. Markers associated with lymphoma or leukemia in some embodiments include higher levels of ccfDNA, rearranged immunoglobulin heavy chain DNA, and MGMT promoter hypermethylation along with p53 mutation (Hohaus S. Ann Oncol. 2009 August; 20(8):1408-13; Jiang Y. 2012 February; 20(1): 53-6).

The methods and devices described herein may be used to detect cancer such as lung cancer. Lung cancer in some embodiments includes non-small cell lung carcinoma (NSCLC). Markers associated with NSCLC in some embodiments include increased plasma DNA levels, lack of mutations, methylation status of 14-3-3 sigma of serum DNA, P16M in pleural lavage, hypermethylation of RASSF1A, p14 (ARF) and APC, K-RAS mutations, and epidermal growth factor receptor (EGFR) mutations (Cheng C. Cancer Sci. 2009 February; 100(2):303-9; Xie G S. Chin Med. J. 2004; 117:1485-1488; Yoon K A. J Mol Diagn. 2009 May; 11(3):182-5; Lee S M. Mol Cells. 2012 August; 34(2):171-6; Ponomaryova A A. Lung Cancer. 2013 September; 81(3):397-403; Nakamura T. J Thorac Oncol. 2012 September; 7(9):1369-81). Lung cancer in some embodiments includes small cell lung carcinoma (SCLC). Markers associated with SCLC in some embodiments include microsatellite markers and LOH (Board R E. Ann. N. Y. Acad. Sci. 2008; 1137:98-107; Tamkovich S N. Ann N Y Acad Sci. 2008 August; 1137:214-7).

The methods and devices described herein may be used to detect cancer such as cancer of the male genital tract. Cancer of the male genital tract in some embodiments comprises testicular tumors. Markers associated with testicular tumors in some embodiments include increased ccfDNA and cell-free serum mtDNA (79-bp (mtDNA-79) and 220 bp (mtDNA-220)), hypermethylation of ccfDNA APC, GSTP1, PTGS2, p14 (ARF), p16 (INK) and RASSF1A (Ellinger J. J Urol. 2009 January; 181(1):363-71; Ellinger J. J Urol. 2009 July; 182(1):324-9).

The methods and devices described herein may be used to detect cancer such as cancer of the urinary system. Cancer of the urinary system in some embodiments comprises kidney tumors. Markers associated with the urinary system in some embodiments include tumor DNA in urine samples, promoter hypermethylation of ccfDNA for VHL, p16/CDKN2a, p14ARF, APC, RASSF1A, and Timp-3 (Goessl C. Eur Urol. 2002 June; 41(6):668-76; Cairns P. Ann N Y Acad Sci. 2004 June; 1022:40-3). Cancer of the urinary system in some embodiments comprises prostate carcinoma (PCa). Markers associated with prostate carcinoma in some embodiments include ccfDNA, DNA load and promoter methylation status, LOH and genetic aberrations such as allelic imbalance (AI) and epigenetic changes of promoter hypermethylation (methylation of RASSF1, RARB2, and GSTP1), LOH and increasing Gleason scores for the marker combinations of D6S1631, D8S286, D9S171, D8S286 and D9S171, methylation of the GSTP1 gene, and apoptotic PTGS2 fragments (Delgado P O. Tumour Biol. 2013 April; 34(2):983-6; Chun F K. BJU Int. 2006 September; 98(3): 544-8; Papadopoulou E. Ann N Y Acad Sci. 2006 September; 1075:235-43; Müller I. Clin Chem. 2008 April; 54(4): 688-96; Ellinger J. Int J Cancer. 2008 Jan. 1; 122(1):138-43; Cortese R. Hum Mol Genet. 2012 Aug. 15; 21(16):3619-31.

The methods and devices described herein may be used to detect cancer such as skin cancer. Skin cancer in some embodiments comprises malignant melanoma. Markers associated with malignant melanoma in some embodiments include ccfDNA, LOH at microsatellite markers D1S243, D6S311, D9S161 and D19S246 in the plasma, and TFPI2-methylated DNA in the serum (Daniotti M. Int J Cancer. 2007 Jun. 1; 120(11):2439-44; Nakamoto D. Bull Tokyo Dent Coll. 2008 May; 49(2):77-87; Lo Nigro C. J Invest Dermatol. 2013 May; 133(5):1278-85). Skin cancer in some embodiments comprises squamous cell carcinoma. Markers associated with squamous cell carcinoma in some embodiments include microsatellite alteration in serum DNA (Kakimoto Y. Oncol Rep. 2008 November; 20(5):1195-200).

EMBODIMENTS

In one aspect, disclosed herein are devices for capturing analytes comprising: a) an electrode configured to generate an electrokinetic field region; and b) a layer in contact with at least a portion of the electrode, wherein the layer comprises a dielectric material and is less than 100 angstroms in thickness. In some embodiments, the electrode is energized with AC. In some embodiments, the electrode is energized with DC. In some embodiments, the electrokinetic field comprises a dielectrophoretic field, an electrothermal field, an electroosmotic field, or a combination thereof. In some embodiments, the layer is about 5 angstroms to about 25 angstroms in thickness. In some embodiments, the layer is about 13 angstroms to about 19 angstroms in thickness. In some embodiments, the layer is about 16 angstroms in thickness. In some embodiments, the layer is no more than 50 angstroms in thickness. In some embodiments, the dielectric material comprises a metalloid oxide, metalloid nitride, metalloid carbide, metalloid silicide, or combination thereof. In some embodiments, the metalloid is selected from the group consisting of boron, silicon, germanium, arsenic, antimony, tellurium, and combinations thereof. In some embodiments, the dielectric material comprises a non-metal, and at least one of boron, silicon, germanium, arsenic, antimony, tellurium, or any combination thereof. In some embodiments, the non-metal is selected from the group consisting of oxygen, carbon, silicon, selenium, nitrogen, and combinations thereof. In some embodiments, the dielectric material further comprises a metal. In some embodiments, the metal is selected from the group consisting of platinum, ruthenium, rhodium, iridium, manganese, magnesium, tungsten, zirconium, chromium, gold, iron, aluminum, tantalum, gallium, copper, silver, brass, zinc, tin, nickel, palladium, titanium, titanium, indium, bismuth, lead, lanthanum, hafnium, yttrium, and combinations thereof. In some embodiments, the metal is selected from the group consisting of calcium, magnesium, strontium, barium, and combinations thereof. In some embodiments, the metal is selected from the group consisting aluminum, zinc, gallium, indium, cadmium, mercury, thallium, lead, bismuth, antimony, germanium, and combinations thereof. In some embodiments, the metal is selected from the group consisting of platinum, ruthenium, rhodium, iridium, manganese, tungsten, zirconium, chromium, gold, iron, tantalum, copper, silver, brass, zinc, tin, nickel, palladium, titanium, titanium, lead, lanthanum, hafnium, yttrium, and combinations thereof. In some embodiments, the dielectric material comprises an organic or inorganic polymer. In some embodiments, the polymer is fluorinated. In some embodiments, the dielectric material comprises a ceramic. In some embodiments, the dielectric material comprises a high-κ dielectric material. In some embodiments, the dielectric material comprises a low-κ dielectric material. In some embodiments, the dielectric material comprises a material having a dielectric constant of no more than 3. In some embodiments, the dielectric material has a dielectric constant of no more than 4. In some embodiments, the dielectric material has a dielectric constant of no more than 10. In some embodiments, the dielectric material has a dielectric constant of at least 4. In some embodiments, the dielectric material has a dielectric constant of about 2 to about 10. In some embodiments, the dielectric material has a dielectric constant of at least 10. In some embodiments, the layer comprises a material selected from the group consisting of silicon, silicon oxide, silicon nitride, silicon carbide, titanium oxide, germanium, polytetrafluoroethylene, neoprene, polyvinylidene fluoride, silicon dioxide, titanium dioxide, fluorosilicate glass, polyimide, fluorinated polyimide, methylsilsesquioxane, polyarylene ether, polyethylene, polystyrene, calcium carbonate, and combinations thereof. In some embodiments, the dielectric material has a resistivity of about $10^{-5}$ Ω·m to about $10^{25}$ Ω·m. In some embodiments, the dielectric material has a resistivity of about $10^{-2}$ Ω·m to about $10^{20}$ Ω·m. In some embodiments, the dielectric material has a resistivity of about 10 Ω·m to about $10^{15}$ Ω·m. In some embodiments, the dielectric material has a resistivity of about $10^{3}$ Ω·m to about $10^{12}$ Ω·m. In some embodiments, the dielectric material has a resistivity of about $10^{-5}$ Ω·m to about $10^{6}$ Ω·m. In some embodiments, the dielectric material has a resistivity of about $10^{-4}$ Ω·m to about $10^{7}$ Ω·m. In some embodiments, the electrode comprises a conductive material. In some embodiments, the conductive material has a resistivity of about $10^{-8}$ Ω·m to about $10^{-2}$ Ω·m. In some embodiments, the conductive material has a resistivity of about $10^{-8}$ Ω·m to about $10^{-5}$ Ω·m. In some embodiments, the conductive material has a resistivity of about $10^{-4}$ Ω·m to about $10^{-2}$ Ω·m. In some embodiments, the ratio of dielectric to conductive material is about 0.01:2 to about 99:1. In some embodiments, the ratio of dielectric to conductive material is about 0.1:2 to about 0.7:2. In some embodiments, the ratio of dielectric to conductive material is about 0.3:2. In some embodiments, the conductive material comprises at least one of the group consisting of platinum, gold, aluminum, tantalum, gallium arsenide, copper, silver, brass, zinc, tin, nickel, silicon, palladium, titanium, graphite, carbon, and combinations thereof. In some embodiments, the electrode comprises a metal. In some embodiments, the electrode comprises a mixed-metal oxide. In some embodiments, the mixed-metal oxide is selected from the group consisting of platinum oxide, titanium oxide, zirconium oxide, niobium oxide, tantalum oxide, tungsten oxide, and combinations thereof. In some embodiments, the electrode comprises a mixed-metal carbide. In some embodiments, the mixed-metal carbide is selected from the group consisting of platinum carbide, titanium carbide, zirconium carbide, niobium carbide, tantalum carbide, tungsten carbide, and combinations thereof. In some embodiments, the electrode comprises a mixed-metal nitride. In some embodiments, the mixed-metal nitride is selected from the group consisting of platinum nitride, titanium nitride, zirconium nitride, niobium nitride, tantalum nitride, tungsten nitride, and combinations thereof. In some embodiments, the electrode has a resistivity of about $10^{-8}$ Ω·m to about $10^{-2}$ Ω·m. In some embodiments, the electrode has a resistivity of about $10^{-6}$ Ω·m to about $10^{-4}$ Ω·m. In some embodiments, the electrode has a resistivity of about $10^{-6}$ Ω·m to about $10^{-3}$ Ω·m. In some embodiments, the composition comprises a plurality of electrodes. In some embodiments, the conductive material is substantially absent from the center of the individual electrodes. In some embodiments, the plurality of electrodes is configured in an array. In some embodiments, the plurality of electrodes is configured in three-dimensions. In some embodiments, the conductive material is configured as discontinuous, curved lines in an open disk shape, a wavy line shape, a hollow tube shape, a hollow triangular tube, or a hollow ring with an extruded center. In some embodiments, the electrode is about 40 μm to about 1000 μm in its largest dimension. In some embodiments, the electrode is about 40 μm to about 500 μm in its largest dimension. In some embodiments, the electrode is about 40 μm to about 100 μm in its largest dimension. In some embodiments, the electrode is about 100 nm to about 500 nm in thickness. In some embodiments, the electrode is about 50 nm to about 200 nm in thickness. In some embodiments, the electrode is about 100 nm to about 1 μm in thickness. In some embodiments, the electrode is coated with a polymer layer. In some embodiments, the polymer layer is porous. In some embodiments, the polymer layer further comprises a dielectric material. In some embodiments, the polymer layer comprises a copolymer. In some embodiments, the polymer layer comprises polymethyl methacrylate, nylon 6,6, polyether ether ketone, polyether sulfone, polystyrene, polyisoprene, polyethylene terephthalate, or any combination thereof. In some embodiments, the polymer layer comprises polyhydroxyethylmethacrylate. In some embodiments, the polymer layer comprises a hydrogel. In some embodiments, the hydrogel has a thickness between about 0.01 microns and 1 micron. In some embodiments, the presence of the layer results in about a 0.01% to about a 99.99% reduction in the conductivity of the device when compared to the device without the layer. In some embodiments, the presence of the layer results in about 0.01% to about 50% reduction in the conductivity of the device when compared to the device without the layer. In some embodiments, the presence of the layer results in about 50% to about 99.99% reduction in the conductivity of the device when compared to the device without the layer. In some embodiments, the presence of the layer results in about 25% to about 75% reduction in the conductivity of the device when compared to the device without the layer. In some embodiments, the presence of the layer results in about 1% to about 25% reduction in the conductivity of the device when compared to the device without the layer. In some embodiments, the presence of the layer results in about 0.01% to about 10% reduction in the conductivity of the device when compared to the device without the layer.

Additionally provided herein are devices for capturing analytes comprising: a) an electrode configured to generate an electrokinetic field region; and b) a layer in contact with at least a portion of the electrode, wherein the layer comprises a dielectric material and is 100 angstroms to about 10,000 angstroms in thickness. In some embodiments, the electrode is energized with AC. In some embodiments, the electrode is energized with DC. In some embodiments, the electrokinetic field comprises a dielectrophoretic field, an electrothermal field, an electroosmotic field, or a combination thereof. In some embodiments, the dielectric material comprises a metalloid oxide, metalloid nitride, metalloid carbide, metalloid silicide, or combination thereof. In some embodiments, the metalloid is selected from the group consisting of boron, silicon, germanium, arsenic, antimony, tellurium, and combinations thereof. In some embodiments, the dielectric material comprises a non-metal, and at least one of boron, silicon, germanium, arsenic, antimony, tellurium, or any combination thereof. In some embodiments, the non-metal is selected from the group consisting of oxygen, carbon, silicon, selenium, nitrogen, and combinations thereof. In some embodiments, the dielectric material further comprises a metal. In some embodiments, the metal is selected from the group consisting of platinum, ruthenium, rhodium, iridium, manganese, magnesium, tungsten, zirconium, chromium, gold, iron, aluminum, tantalum, gallium, copper, silver, brass, zinc, tin, nickel, palladium, titanium, titanium, indium, bismuth, lead, lanthanum, hafnium, yttrium, and combinations thereof. In some embodiments, the metal is selected from the group consisting of calcium, magnesium, strontium, barium, and combinations thereof. In some embodiments, the metal is selected from the group consisting aluminum, zinc, gallium, indium, cadmium, mercury, thallium, lead, bismuth, antimony, germanium, and combinations thereof. In some embodiments, the metal is selected from the group consisting of platinum, ruthenium, rhodium, iridium, manganese, tungsten, zirconium, chromium, gold, iron, tantalum, copper, silver, brass, zinc, tin, nickel, palladium, titanium, titanium, lead, lanthanum, hafnium, yttrium, and combinations thereof. In some embodiments, the dielectric material comprises an organic or inorganic polymer. In some embodiments, the polymer is fluorinated. In some embodiments, the dielectric material comprises a ceramic. In some embodiments, the dielectric material comprises a high-κ dielectric material. In some embodiments, the dielectric material comprises a low-κ dielectric material. In some embodiments, the dielectric material comprises a material having a dielectric constant of no more than 3. In some embodiments, the dielectric material has a dielectric constant of no more than 4. In some embodiments, the dielectric material has a dielectric constant of no more than 10. In some embodiments, the dielectric material has a dielectric constant of at least 4. In some embodiments, the dielectric material has a dielectric constant of about 2 to about 10. In some embodiments, the dielectric material has a dielectric constant of at least 10. In some embodiments, the layer comprises a material selected from the group consisting of silicon, silicon oxide, silicon nitride, silicon carbide, titanium oxide, germanium, polytetrafluoroethylene, neoprene, polyvinylidene fluoride, silicon dioxide, titanium dioxide, fluorosilicate glass, polyimide, fluorinated polyimide, methylsilsesquioxane, polyarylene ether, polyethylene, polystyrene, calcium carbonate, and combinations thereof. In some embodiments, the dielectric material has a resistivity of about $10^{-5}$ $\Omega\cdot$m to about $10^{25}$ $\Omega\cdot$m. In some embodiments, the dielectric material has a resistivity of about $10^{-2}$ $\Omega\cdot$m to about $10^{20}$ $\Omega\cdot$m. In some embodiments, the dielectric material has a resistivity of about $10$ $\Omega\cdot$m to about $10^{15}$ $\Omega\cdot$m. In some embodiments, the dielectric material has a resistivity of about $10^{3}$ $\Omega\cdot$m to about $10^{12}$ $\Omega\cdot$m. In some embodiments, the dielectric material has a resistivity of about $10^{-5}$ $\Omega\cdot$m to about $10^{6}$ $\Omega\cdot$m. In some embodiments, the dielectric material has a resistivity of about $10^{-4}$ $\Omega\cdot$m to about $10^{7}$ $\Omega\cdot$m. In some embodiments, the electrode comprises a conductive material. In some embodiments, the conductive material has a resistivity of about $10^{-8}$ $\Omega\cdot$m to about $10^{-2}$ $\Omega\cdot$m. In some embodiments, the conductive material has a resistivity of about $10^{-8}$ $\Omega\cdot$m to about $10^{-5}$ $\Omega\cdot$m. In some embodiments, the conductive material has a resistivity of about $10^{-4}$ $\Omega\cdot$m to about $10^{-2}$ $\Omega\cdot$m. In some embodiments, the ratio of dielectric to conductive material is about 0.01:2 to about 99:1. In some embodiments, the ratio of dielectric to conductive material is about 0.1:2 to about 0.7:2. In some embodiments, the ratio of dielectric to conductive material is about 0.3:2. In some embodiments, the conductive material comprises at least one of the group consisting of platinum, gold, aluminum, tantalum, gallium arsenide, copper, silver, brass, zinc, tin, nickel, silicon, palladium, titanium, graphite, carbon, and combinations thereof. In some embodiments, the electrode comprises a metal. In some embodiments, the electrode comprises a mixed-metal oxide. In some embodiments, the mixed-metal oxide is selected from the group consisting of platinum oxide, titanium oxide, zirconium oxide, niobium oxide, tantalum oxide, tungsten oxide, and combinations thereof. In some embodiments, the electrode comprises a mixed-metal carbide. In some embodiments, the mixed-metal carbide is selected from the group consisting of platinum carbide, titanium carbide, zirconium carbide, niobium carbide, tantalum carbide, tungsten carbide, and combinations thereof. In some embodiments, the electrode comprises a mixed-metal nitride. In some embodiments, the mixed-metal nitride is selected from the group consisting of platinum nitride, titanium nitride, zirconium nitride, niobium nitride, tantalum nitride, tungsten nitride, and combinations thereof. In some embodiments, the electrode has a resistivity of about $10^{-8}$ $\Omega\cdot$m to about $10^{-2}$ $\Omega\cdot$m. In some embodiments, the electrode has a resistivity of about $10^{-6}$ $\Omega\cdot$m to about $10^{-}$$\Omega\cdot$m. In some embodiments, the electrode has a resistivity of about $10^{-6}$ $\Omega\cdot$m to about $10^{-3}$ $\Omega\cdot$m. In some embodiments, the composition comprises a plurality of electrodes. In some embodiments, the conductive material is substantially absent from the center of the individual electrodes. In some embodiments, the plurality of electrodes is configured in an array. In some embodiments, the plurality of electrodes is configured in three-dimensions. In some embodiments, the conductive material is configured as discontinuous, curved lines in an open disk shape, a wavy line shape, a hollow tube shape, a hollow triangular tube, or a hollow ring with an extruded center. In some embodiments, the electrode is about 40 μm to about 1000 μm in its largest dimension. In some embodiments, the electrode is about 40 μm to about 500 μm in its largest dimension. In some embodiments, the electrode is about 40 µm to about 100 µm in its largest dimension. In some embodiments, the electrode is about 100 nm to about 500 nm in thickness. In some embodiments, the electrode is about 50 nm to about 200 nm in thickness. In some embodiments, the electrode is about 100 nm to about 1 µm in thickness. In some embodiments, the electrode is coated with a polymer layer. In some embodiments, the polymer layer is porous. In some embodiments, the polymer layer further comprises a dielectric material. In some embodiments, the polymer layer comprises a copolymer. In some embodiments, the polymer layer comprises polymethyl methacrylate, nylon 6,6, polyether ether ketone, polyether sulfone, polystyrene, polyisoprene, polyethylene terephthalate, or any combination thereof. In some embodiments, the polymer layer comprises polyhydroxyethylmethacrylate. In some embodiments, the polymer layer comprises a hydrogel. In some embodiments, the hydrogel has a thickness between about 0.01 microns and 1 micron. In some embodiments, the presence of the layer results in about a 0.01% to about a 99.99% reduction in the conductivity of the device when compared to the device without the layer. In some embodiments, the presence of the layer results in about 0.01% to about 50% reduction in the conductivity of the device when compared to the device without the layer. In some embodiments, the presence of the layer results in about 50% to about 99.99% reduction in the conductivity of the device when compared to the device without the layer. In some embodiments, the presence of the layer results in about 25% to about 75% reduction in the conductivity of the device when compared to the device without the layer. In some embodiments, the presence of the layer results in about 1% to about 25% reduction in the conductivity of the device when compared to the device without the layer. In some embodiments, the presence of the layer results in about 0.01% to about 10% reduction in the conductivity of the device when compared to the device without the layer.

Also provided herein are devices for capturing analytes comprising an electrode comprising platinum, wherein the electrode is configured to generate an AC dielectrophoretic field region; and a layer in contact with a portion of the electrode, wherein the layer is less than 100 angstroms in thickness; comprises a dielectric material and a conductive material, wherein the ratio of semi-conductive to conductive material is about 0.3/2; and the presence of the layer results in a 30% reduction in conductivity of the device.

Additionally provided herein are methods for isolating an analyte in a sample, the method comprising: applying the sample to the device of the devices provided herein; producing at least one AC dielectrophoretic and/or AC electrokinetic field region; and isolating the analyte in the AC dielectrophoretic and/or AC electrokinetic field region. In some embodiments, the presence of the layer results in an increase in analyte capture on the surface when compared to the device without the layer. In some embodiments, the presence of the layer results in at least a 5 fold increase in analyte capture on the surface when compared to the device without the layer. In some embodiments, the presence of the layer results in at least a 50 fold increase in analyte capture on the surface when compared to the device without the layer. In some embodiments, the presence of the layer results in at least a 100 fold increase in analyte capture on the surface when compared to the device without the layer. In some embodiments, the presence of the layer results in at least a 200 fold increase in analyte capture on the surface when compared to the device without the layer. In some embodiments, the presence of the layer results in at least a 500 fold increase in analyte capture on the surface when compared to the device without the layer. In some embodiments, the analyte comprises a biomolecule. In some embodiments, the analyte comprises nucleic acid, nucleosomes, exosomes, extracellular vesicles, aggregated proteins, viruses, prokaryotic cells, cell membrane fragments, mitochondria, cellular vesicles, or any combination thereof. In some embodiments, the analyte comprises a virus. In some embodiments, the analyte comprises cell-free materials. In some embodiments, the analyte comprises cell-free nucleic acid. In some embodiments, the sample comprises a fluid. In some embodiments, the fluid comprises a cell. In some embodiments, the cell comprises a prokaryotic cell. In some embodiments, the cell comprises a eukaryotic cell. In some embodiments, the fluid has a conductivity of 100 mS/m or more. In some embodiments, the fluid has a conductivity of less than 100 mS/m. In some embodiments, the analyte is no more than 1 micrometer in its largest dimension. In some embodiments, the analyte is no more than 0.1 micrometers in its largest dimension. In some embodiments, the analyte is no more than 50 nanometers in its largest dimension. In some embodiments, the analyte has a mass of no more than 1 nanogram. In some embodiments, the analyte has a mass of no more than 1 picogram. In some embodiments, the analyte has a molecular weight of no more than $10^9$ grams per mol. In some embodiments, the analyte has a molecular weight of no more than $10^6$ grams per mol. In some embodiments, the analyte has a molecular weight of no more than $10^3$ grams per mol. In some embodiments, the analyte has a dielectric constant of about 1 to about 100. In some embodiments, the analyte has a dielectric constant of about 1 to about 20. In some embodiments, the analyte has a dielectric constant of about 6 to about 11.

Further provided herein are methods for manufacturing any of the devices described herein comprising depositing the layer on the electrode using at least one deposition technique. In some embodiments, the deposition technique is selected from the group consisting of e-beam deposition, electrode sputtering deposition, atomic layer deposition, plasma-enhanced chemical vapor deposition (PECVD), pulsed-laser deposition, and chemical vapor deposition. In some embodiments, the deposition technique comprises sputtering deposition. In some embodiments, the sputtering deposition comprises ion-beam, reactive, ion-assisted, high-target utilization, high-power impulse magnetron, or gas flow sputtering.

Additionally provided herein are methods of diagnosing or monitoring a disease or condition in a patient comprising applying a sample to any one of the devices described herein.

Definitions and Abbreviations

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

Throughout this application, various embodiments may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

As used in the specification and claims, the singular forms "a", "an" and "the" include plural references unless the context clearly dictates otherwise. For example, the term "a sample" includes a plurality of samples, including mixtures thereof.

The terms "determining," "measuring," "evaluating," "assessing," "assaying," and "analyzing" are often used interchangeably herein to refer to forms of measurement. The terms include determining if an element is present or not (for example, detection). These terms can include quantitative, qualitative or quantitative and qualitative determinations. Assessing can be relative or absolute. "Detecting the presence of" can include determining the amount of something present in addition to determining whether it is present or absent depending on the context.

The terms "subject," "individual," or "patient" are often used interchangeably herein. A "subject" can be a biological entity containing expressed genetic materials. The biological entity can be a plant, animal, or microorganism, including, for example, bacteria, viruses, fungi, and protozoa. The subject can be tissues, cells and their progeny of a biological entity obtained in vivo or cultured in vitro. The subject can be a mammal. The mammal can be a human. The subject may be diagnosed or suspected of being at high risk for a disease. In some cases, the subject is not necessarily diagnosed or suspected of being at high risk for the disease.

The term "in vivo" is used to describe an event that takes place in a subject's body.

The term "ex vivo" is used to describe an event that takes place outside of a subject's body. An ex vivo assay is not performed on a subject. Rather, it is performed upon a sample separate from a subject. An example of an ex vivo assay performed on a sample is an "in vitro" assay.

The term "in vitro" is used to describe an event that takes places contained in a container for holding laboratory reagent such that it is separated from the biological source from which the material is obtained. In vitro assays can encompass cell-based assays in which living or dead cells are employed. In vitro assays can also encompass a cell-free assay in which no intact cells are employed.

As used herein, the term "about" a number refers to that number plus or minus 10% of that number. The term "about" a range refers to that range minus 10% of its lowest value and plus 10% of its greatest value.

As used herein, the terms "treatment" or "treating" are used in reference to a pharmaceutical or other intervention regimen for obtaining beneficial or desired results in the recipient. Beneficial or desired results include but are not limited to a therapeutic benefit and/or a prophylactic benefit. A therapeutic benefit may refer to eradication or amelioration of symptoms or of an underlying disorder being treated. Also, a therapeutic benefit can be achieved with the eradication or amelioration of one or more of the physiological symptoms associated with the underlying disorder such that an improvement is observed in the subject, notwithstanding that the subject may still be afflicted with the underlying disorder. A prophylactic effect includes delaying, preventing, or eliminating the appearance of a disease or condition, delaying or eliminating the onset of symptoms of a disease or condition, slowing, halting, or reversing the progression of a disease or condition, or any combination thereof. For prophylactic benefit, a subject at risk of developing a particular disease, or to a subject reporting one or more of the physiological symptoms of a disease may undergo treatment, even though a diagnosis of this disease may not have been made.

The section headings used herein are for organizational purposes only and are not to be construed as limiting the subject matter described.

As used herein, the term "Vp-p" is the peak-to-peak voltage.

As used herein, the term "TBE" is a buffer solution containing a mixture of Tris base, boric acid and EDTA.

As used herein, the term "TE" is a buffer solution containing a mixture of Tris base and EDTA.

As used herein, the term "L-Histidine buffer" is a solution containing L-histidine.

As used herein, the term "DEP" is an abbreviation for dielectrophoresis.

As used herein, the term "ACE" is Alternating Current Electrokinetics.

EXAMPLES

Example 1: Isolation of Nucleic Acids with Prior Art Electrodes

A chip for comprising a microelectrode array was fabricated. A 45×20 electrode array, custom 80 μm diameter circular platinum microelectrode array on a 200 μm center-center pitch was fabricated based upon previous results (see references 1-3, below). All 900 microelectrodes are activated together and AC biased to form a checkerboard field geometry. The positive DEP regions occur directly over microelectrodes, and negative low field regions occur between microelectrodes. The array was enclosed in a microfluidic cartridge, forming a 50 μL sample chamber covered with an acrylic window (FIG. 1). Electrical connections to microelectrodes were accessed from Molex connectors from the PCB board in the flow cell. A function generator (HP 3245A) provided sinusoidal electrical signal at 10 KHz and 10-14V peak-peak, depending on solution conductivity. Images were captured with a fluorescent microscope (Leica) and an EGFP cube (485 nm emission and 525 nm excitation bandpass filters). The excitation source was a PhotoFluor II 200 W Hg arc lamp.

[1] R. Krishnan, B. D. Sullivan, R. L. Mifflin, S. C. Esener, and M. J. Heller, "Alternating current electrokinetic separation and detection of DNA nanoparticles in high-conductance solutions." Electrophoresis, vol. 29, pages 1765-1774, 2008.

[2] R. Krishnan and M. J. Heller, "An AC electrokinetic method for enhanced detection of DNA nanoparticles." J. Biophotonics, vol. 2, pages 253-261, 2009.

[3] R. Krishnan, D. A. Dehlinger, G. J. Gemmen, R. L. Mifflin, S. C. Esener, and M. J. Heller, "Interaction of nanoparticles at the DEP microelectrode interface under high conductance conditions" Electrochem. Comm., vol. 11, pages 1661-1666, 2009.

A sample comprising nucleic acids was diluted in DI water to the following concentrations: 50 nanograms, 5 nanograms, 1 nanogram, and 50 picograms. The nucleic acid sample was stained using 1×SYBR Green I green fluorescent double stranded DNA dye purchased from Invitrogen (Life Technologies, Carlsbad, Calif.). This mixture was then inserted into the microelectrode arrays and run at 14 Volts peak to peak (Vp-p), at 10 kHz sine wave for 1 minute. At the conclusion of 1 minute, a picture of the microelectrode pads was taken using a CCD camera with a 10× objective on a microscope using green fluorescence filters (FITC) so that the nucleic acids could be visualized.

Example 2: Isolation of a Nucleic Acids with a Dielectric Device

A chip was fabricated using the general methods of Example 1 with modification: a dielectric layer was coated onto electrodes present on the chip surface. A dielectric material was deposited in various thicknesses (about 0, 8, 16, 24 or 48 angstroms) on the surface of the electrodes using e-beam deposition. A sample comprising nucleic acids was inserted into the microelectrode arrays and then run using the general method of Example 1. The chip having about a 0, 8, 16, 24, or 48 angstrom thick dielectric layer produced a fluorescence of about $5\times10^4$, $7\times10^5$, $1\times10^7$, $5\times10^5$, or $5\times10^4$ fluorescent units, respectively (FIG. 7). This example demonstrates that a dielectric layer of optimal thickness results in an increase in fluorescence signal, and indicates an increase in the amount of captured nucleic acid relative to a device without a dielectric layer.

Example 3: Evaluation of Surface Characteristics of a Dielectric Device

Figure 6:
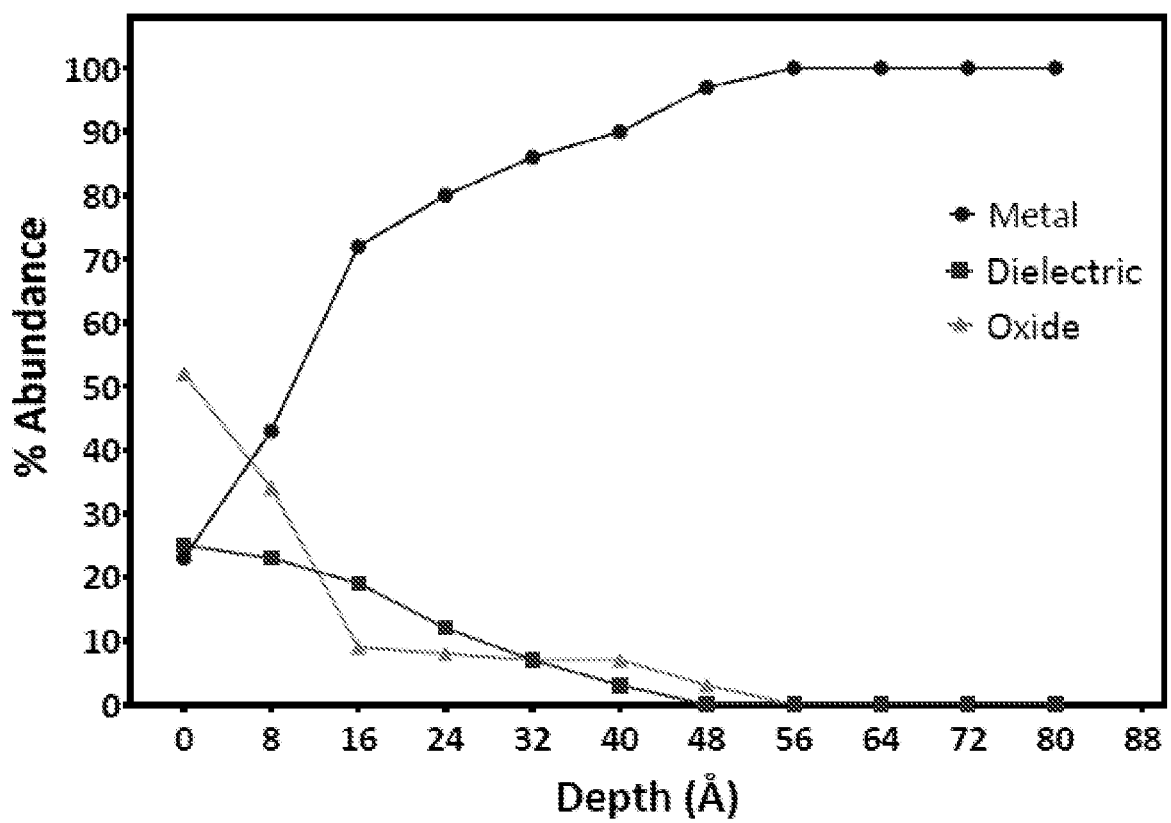
FIG. 6 exemplifies depth profiles obtained via auger spectroscopy for the top 80 angstroms of a dielectric coated metal conductive electrode. The X axis depicts the depth in angstroms from 0 to 88. The Y axis depicts the percent abundance from 0 to 100%.

The physical properties of a device fabricated in Example 2 were evaluated. An SEM image of the surface was obtained (FIG. 5), and a depth profile of the upper 80 angstroms of the coated electrode chip was obtained using auger spectroscopy. The results show the composition of the electrode chips (dielectric material and metal) at various depths (FIG. 6). This example demonstrates that a dielectric layer of approximately 48 angstroms in thickness was fabricated on the device.

Example 4: Isolation of Human Genomic DNA with a Dielectric Device

A researcher is interested in isolating human genomic DNA from a sample. Human genomic DNA (gDNA) of 20-40 kbp is isolated from a sample. The gDNA is diluted in DI water to the following concentrations: 50 nanograms, 5 nanograms, 1 nanogram, and 50 picograms. The gDNA is stained using 1×SYBR Green I green fluorescent double stranded DNA dye purchased from Invitrogen (Life Technologies, Carlsbad, Calif.). This mixture is then inserted into the dielectric-coated microelectrode arrays fabricated using the general procedure of Example 2 and run at 14 Volts peak to peak (Vp-p), at 10 kHz sine wave for 1 minute. At the conclusion of 1 minute, a picture of the microelectrode pads is taken using a CCD camera with a 10× objective on a microscope using green fluorescence filters (FITC) so that the gDNA can be visualized. A device with a dielectric layer results in an increase in fluorescence signal, and indicates an increase in the amount of captured gDNA relative to a device without a dielectric layer.

Example 5: Isolation of DNA from E. coli with a Dielectric Device

A researcher is interested in isolated bacterial DNA from a sample. Using a chip fabricated using the general method of Example 2, approximately 5000 green fluorescent E. coli cells in 50 µL of fluid is inserted into a dielectric-coated chip. The E. coli are lysed using a 100 milli-second 100V DC pulse using the HP 3245A function generator. The lysed particulates are then gathered on the electrode surface using 10 kHz, 10 Vp-p and the Illumina Nextera Protocol is used for library prep for sequencing while the DNA is on the chip (by inserting the appropriate buffers at the appropriate times onto the chip) to tag the DNA for sequencing. The DNA is then eluted in 50 µL of 1×TBE Buffer and then PCR amplified for 9-12 cycles (using the Nextera Protocol) on a Bio-Rad PCR machine. A device with a dielectric layer results in an increase in fluorescence signal, and indicates an increase in the amount of captured bacterial DNA relative to a device without a dielectric layer.

Example 6: Isolation of Cell Free Biomarkers with a Dielectric Device

Using ACE microfluidic cartridges, relative concentration of cell free biomarkers is determined in an unknown sample (sample can be whole blood, serum, plasma). The ACE microfluidic cartridge may be designed using the general methods of Example 1 with one or more chambers for known standards and one or more chambers for the unknown sample.

An ACE field at 10 Vp-p and 10 kHz is applied to select microfluidic cartridge chambers comprising chips designed using the general methods of Example 2, and cell-free target biomarkers of interest are captured on dielectric-coated or embedded electrodes. A fluidic wash solution (water+osmolytes) is applied to wash away unwanted sample, i.e. particles and other components that are not captured on the electrodes. This fluidic wash is compatible with polymerase chain reaction (PCR) and next-generation sequencing thus allowing for secondary analysis post-elution.

Target biomarkers include proteins, lipids, antibodies, high molecular weight DNA (greater than 300 bp), tumor cells, exosomes, nucleosomes, nanosomes. For the fluorescent detection/quantification of such biomarkers specific dyes use such as YOYO®-1, SYBR®Green, CBQCA protein quantitation kit, SYTO® RNASelect™. A device with a dielectric layer results in an increase in fluorescence signal, and indicates an increase in the amount of captured cell free biomarkers relative to a device without a dielectric layer.

Example 7: On-Chip Quantification Using Labeling and Fluorescence Microscopy with a Dielectric Device Using ACE microfluidic cartridges, relative concentration of cell free biomarkers were determined in an unknown sample (sample can be whole blood, serum, plasma). The ACE microfluidic cartridge may be designed using the general methods of Example 1 with one or more chambers for known standards and one or more chambers for the unknown sample.

An ACE field at 10 Vp-p and 10 kHz is applied to select microfluidic cartridge chambers comprising chips designed using the general methods of Example 2, and cell-free target biomarkers of interest are captured on dielectric-coated or embedded electrodes. A fluidic wash solution (water+osmolytes) is applied to wash away unwanted sample, i.e. particles and other components that are not captured on the electrodes. This fluidic wash is compatible with polymerase chain reaction (PCR) and next-generation sequencing thus allowing for secondary analysis post-elution.

Target biomarkers include proteins, lipids, antibodies, high molecular weight DNA (greater than 300 bp), tumor cells, exosomes, nucleosomes, nanosomes. For the fluorescent detection/quantification of such biomarkers specific dyes use such as YOYO®-1, SYBR Green, CBQCA protein quantitation kit, SYTO® RNASelect™.

Once excess unwanted sample is washed away, a CCD/CMOS/PMT detector is used in conjunction with fluorescence microscopy (with appropriate excitation/emission filters) to enable direct detection (binary) and/or quantification (concentration) of unknown analytes using a Region-of-Interest (ROI) image segmentation algorithm that compared pixel intensity between two regions in the electrodes). Fluorescent quantification from both the known and unknown chambers is determined and the data is then compared using a linear fit calibration curve to create a relative ratio of intensity between the known chamber and the unknown chamber. Because the analytes in the known chamber have known specific concentrations of the cell free target biomarkers and the fluorescence labels are specific for the target analytes, using an algebraic relationship between intensities of the known chamber and the unknown chamber enable and the linear calibration curve the determination of analyte concentration from the unknown chamber. A device with a dielectric layer results in an increase in accuracy and precision relative to a device without the dielectric layer.

Example 8: Off-Chip Quantification Using Q-PCR, RT-PCR and Sequencing Using a Dielectric Device Using ACE microfluidic cartridges, relative concentrations of cell-free biomarkers are determined in an unknown sample. The sample may be whole blood, serum, plasma or other biological sample/fluid. The ACE microfluidic cartridge may be designed using the general methods of Example 1 with one or more chambers for known standards and one or more chambers for the unknown sample.

An ACE field at 10 Vp-p and 10 kHz is applied to the chamber and cell-free target biomarkers of interest are captured on the dielectric coated electrodes comprising chips designed using the general methods of Example 2. A fluidic wash (water+osmolytes) is applied using a peristaltic pump while the ACE field is still on in order to remove all unwanted sample. This fluidic wash is compatible with polymerase chain reaction (PCR) and next-generation sequencing thus allowing for secondary analysis post-elution.

The ACE field is turned off and the captured particles are released into the PCR/Sequencing compatible solution. The unknown sample is eluted from the electrodes, and the sample used in PCR or next-gen sequencing analysis to determine specific gene sequences, alterations or deletions that may be present in the eluted dsDNA or RNA. A PCR technique for the detection of PCR mutations for DNA samples from the cell lines H1975, RKO, OCI-AML3 and HEL 92.1.7 diluted in either $H_2O$ or ACE fluidic wash solution are used as positive controls for EGFR T790, BRAF V600, NPM1a and JAK2 617V assays. A device with a dielectric layer results in an increase in accuracy and precision relative to a device without the dielectric layer.

Example 9: Device Comprising DC Electrodes

The device of Example 2 further comprises a second array of dielectric-coated addressable electrodes. During analyte separation following the general methods of Example 2, the second array of electrodes is charged with direct current. DC is optionally continuous or pulsed to facilitate electrophoretic movement of analytes or other sample components over the surface of the AC electrodes, or through the device. Use of coated DC electrodes in this manner provides for additional separation of analytes (such as different molecular weights of nucleic acids) independently or in concert with AC electrodes. A device comprising DC electrodes with a dielectric layer results in an increase in purity and yield of nucleic acids relative to a device with non-dielectric coated DC electrodes.

Example 10: Isolation of a Nucleic Acids with Various Dielectrics

Chips are fabricated using the general methods of Example 1 with modification: a dielectric layer is coated onto electrodes present on each chip surface. One type of dielectric material 1-11 from Table 1 is deposited in various thicknesses (about 0, 8, 16, 24 or 48 angstroms) on the surface of the electrodes of each chip. A sample comprising nucleic acids is inserted into the microelectrode arrays and then run using the general method of Example 1. The amount of captured nucleic acid relative to a device without a dielectric layer is measured.

TABLE 1

Exemplary Binary Dielectric Materials

| # | Element A | Element B |
|---|---|---|
| 1 | Barium | Titanate |
| 2 | Barium Strontium | Titanate |
| 3 | Hafnium | Oxide |
| 4 | Lanthanum | Aluminate |
| 5 | Lead | Titanate |
| 6 | Silicon | Oxide |
| 7 | Silicon | Oxycarbide |
| 8 | Silicon | Oxynitride |
| 9 | Tantalum | Oxide |
| 10 | Titanium | Oxide |
| 11 | Zirconium | Oxide |

Example 11: Isolation of a Nucleic Acids with Aluminum Oxide Dielectric Layer

A chip is fabricated using the general methods of Example 1 with modification: a dielectric layer was coated onto electrodes present on the chip surface. Aluminum oxide was deposited in various thicknesses (about 0, 8, 16, 24 or 48 angstroms) on the surface of the electrodes. A sample comprising nucleic acids was inserted into the microelectrode arrays and then run using the general method of Example 1. The presence of the dielectric layer did not lead to an increase in captured nucleic acid relative to a device without a dielectric layer.

Example 12: Formation of a Hydrogel Comprising a Dielectric

Hydrogels comprising dielectrics are layered onto the chip surface via vapor deposition. Hydrogel compositions comprising a mixture of pHEMA and a dielectric material from Table 1 are deposited in various thickness (100, 200, 300, 400 nm) and crosslinking (5, 25, 40%) density on electrode chips is performed. The hydrogel films are tested using a standard ACE protocol (no pretreatment, 7 Vp-p, 10 KHz, 2 minutes, 0.5×PBS, 500 ng/ml gDNA labeled with Sybr Green 1). Fluorescence on the electrodes is captured by imaging, and the amount of captured nucleic acid relative to a device without a dielectric layer is measured.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A device for capturing analytes comprising:
   a) an electrode configured to generate an electrokinetic field region; and
   b) a layer in contact with at least a portion of the electrode, wherein the layer comprises a dielectric material of about 5 angstroms to about 25 angstroms in thickness, wherein the device increases the total yield of analyte capture as compared to a device that lacks a layer or has a layer that is more than 25 angstroms in thickness.

2. The device of claim 1, wherein the electrokinetic field comprises a dielectrophoretic field, an electrothermal field, an electroosmotic field, or a combination thereof.

3. The device of claim 1, wherein the dielectric material comprises a metalloid oxide, metalloid nitride, metalloid carbide, metalloid silicide, or combination thereof.

4. The device of claim 3, wherein the metalloid is selected from the group consisting of boron, silicon, germanium, arsenic, antimony, tellurium, and combinations thereof.

5. The device of claim 1, wherein the dielectric material further comprises a metal.

6. The device of claim 5, wherein the metal is selected from the group consisting of platinum, ruthenium, rhodium, iridium, manganese, magnesium, tungsten, zirconium, chromium, gold, iron, aluminum, tantalum, gallium, copper, silver, brass, zinc, tin, nickel, palladium, titanium, cobalt, indium, bismuth, lead, lanthanum, hafnium, yttrium, calcium, strontium, barium, cadmium, mercury, thallium, antimony, germanium, and combinations thereof.

7. The device of claim 1, wherein the dielectric material comprises an organic or inorganic polymer.

8. The device of claim 1, wherein the dielectric material comprises a ceramic.

9. The device of claim 1, wherein the dielectric material has a dielectric constant of about 2 to about 10.

10. The device of claim 1, wherein the layer comprises a material selected from the group consisting of silicon, silicon oxide, silicon nitride, silicon carbide, titanium oxide, germanium, polytetrafluoroethylene, neoprene, polyvinylidene fluoride, silicon dioxide, titanium dioxide, fluorosilicate glass, polyimide, fluorinated polyimide, methylsilsesquioxane, polyarylene ether, polyethylene, polystyrene, calcium carbonate, and combinations thereof.

11. The device of claim 1, wherein the electrode comprises a conductive material.

12. The device of claim 11, wherein the mole ratio of dielectric to conductive material is about 0.01:2 to about 99:1.

13. The device of claim 11, wherein the mole ratio of dielectric to conductive material is about 0.3:2.

14. The device of claim 11, wherein the conductive material comprises at least one of the group consisting of platinum, gold, aluminum, tantalum, gallium arsenide, copper, silver, brass, zinc, tin, nickel, silicon, palladium, titanium, graphite, carbon, and combinations thereof.

15. A method for manufacturing the device of claim 1 comprising depositing the layer on the electrode using at least one deposition technique.

16. A method for isolating an analyte in a sample, the method comprising:
   (a) applying the sample to a device comprising an electrode configured to generate an electrokinetic field region and a layer in contact with at least a portion of the electrode, wherein the layer comprises a dielectric material of about 5 angstroms to about 25 angstroms in thickness, wherein the device increases the total yield of analyte capture as compared to a device that lacks a layer or has a layer that is more than 25 angstroms in thickness;
   (b) producing at least one AC dielectrophoretic and/or AC electrokinetic field region; and
   (c) isolating the analyte in the AC dielectrophoretic and/or AC electrokinetic field region.

17. The method of claim 16, wherein the presence of the layer results in at least a 5 fold increase in analyte capture on the surface when compared to a device without the layer.

* * * * *